(12) United States Patent
Berini

(10) Patent No.: US 6,614,960 B2
(45) Date of Patent: Sep. 2, 2003

(54) OPTICAL WAVEGUIDE STRUCTURES

(75) Inventor: Pierre Simon Joseph Berini, Ottawa (CA)

(73) Assignee: Speotalis Corp., Ottawa (CA)

( * ) Notice: Subject to any disclaimer, the term of this patent is extended or adjusted under 35 U.S.C. 154(b) by 128 days.

(21) Appl. No.: 09/742,422

(22) Filed: Dec. 22, 2000

(65) Prior Publication Data

US 2002/0131667 A1 Sep. 19, 2002

Related U.S. Application Data

(60) Provisional application No. 60/171,606, filed on Dec. 23, 1999.

(30) Foreign Application Priority Data

Sep. 20, 2000 (CA) .......................................... 2,319,949

(51) Int. Cl.[7] .............................. G02B 6/26; G02B 6/10; G11B 7/24; H04B 10/12
(52) U.S. Cl. .................... 385/39; 372/102; 359/173; 369/275.1; 385/31; 385/130; 385/2
(58) Field of Search ............................. 385/130, 31, 39, 385/40, 42, 50, 129, 1, 2, 3, 4, 11, 15; 372/102, 6, 72, 90; 359/240, 241, 273, 284, 276, 254, 173, 124, 133, 181; 369/275.1, 275.2; 428/64.4, 64.1, 64.2, 64.9

(56) References Cited

U.S. PATENT DOCUMENTS

| 4,249,796 A | 2/1981 | Sincerbox et al. |
|---|---|---|
| 4,432,614 A | 2/1984 | McNeill et al. |
| 4,451,123 A | 5/1984 | McNeill et al. |
| 4,583,818 A | 4/1986 | Chen et al. |
| 4,806,885 A | 2/1989 | Morimoto |
| 4,915,482 A | 4/1990 | Collins et al. |
| 4,948,225 A | 8/1990 | Rider et al. |
| 4,971,426 A | 11/1990 | Schildkraut et al. |
| 5,067,788 A | 11/1991 | Jansson et al. |
| 5,075,796 A | 12/1991 | Schildkraut et al. |

(List continued on next page.)

FOREIGN PATENT DOCUMENTS

| DE | 4240707 C1 | 2/1994 |
|---|---|---|
| EP | 0810454 A1 | 12/1997 |

OTHER PUBLICATIONS

Glytsisen et al "High–Spatial–Frequency Binary and Multivelvel Stairstep Gratings: Polarization–Selective Mirrors and Broadband Antireflection Surfaces" Applied Optics, Optical Society of America, washingtom US vol. 31 No. 22 (No date).

(List continued on next page.)

*Primary Examiner*—Akm E. Ullah
(74) *Attorney, Agent, or Firm*—Thomas Adams

(57) ABSTRACT

Waveguide structures comprising a thin lossy metal film of finite width embedded in an infinite homogeneous dielectric support purely bound electromagnetic modes of propagation low mode power attenuation in the neighbourhood of 10 to 0.1 dB/cm is achievable at optical communications wavelengths, with even lower values being possible. Carefully selecting the film's thickness and width can make this mode the only long-ranging one supported. In addition, the mode can have a field distribution that renders it excitable using an end-fire approach. The finite-width metal film waveguide may be used for applications requiring short propagation distances and 2-D field confinement in the transverse plane, enabling various devices to be constructed, such as couplers, splitters, modulators, interferometers, switches and periodic structures. Under certain conditions, an asymmetric structure can support a long-ranging mode having a field distribution that is suitable to excitation using an end-fire technique.

66 Claims, 57 Drawing Sheets

U.S. PATENT DOCUMENTS

| | | | |
|---|---|---|---|
| 5,155,617 A | | 10/1992 | Solgaard et al. |
| 5,157,541 A | | 10/1992 | Schildkraut et al. |
| 5,359,681 A | * | 10/1994 | Jorgenson et al. ............ 385/12 |
| 5,615,289 A | | 3/1997 | Duck et al. |
| 5,625,729 A | | 4/1997 | Brown |
| 6,034,809 A | | 3/2000 | Anemoglannis |
| 6,064,685 A | | 5/2000 | Bissessur et al. |
| 6,072,926 A | | 6/2000 | Cole et al. |
| 6,282,005 B1 | * | 8/2001 | Thompson et al. ......... 359/173 |
| 6,285,652 B1 | * | 9/2001 | Tsai et al. ................ 369/275.1 |

OTHER PUBLICATIONS

Liu J. et al. "Infrared Quarter–Wave Reflector Retarders Designed with High–Spatial–Frequency Dielectric Surface–Relief Gratings on Goldsubstrate at Oblique Incidence" Applied Opticsa, Optical Society of America, Washington US vol. 35, No. 28 (No date).

Charbonneau, R. Berini, P. et al, "Long–Range Plasmon–Polariton Wave Propagation in Thin Metal Films of Finite–Width Excited Using an End–Fire Technique", Proceedings of SPIE, vol. 4087, p. 534, 2000 (No date).

Loh W H et al "Sampled Fiber Grating Based–Dispersion Slope Compensator" IEEE Photonics Technology Letters, IEEE Inc. New York, US, vol. 11, No. 10, Oct. 1999 (No date).

Tredicucci , A et al Single–mode Surface–plasmon Laser:, Applied Physics Letters, vol. 76, No. 16, p 2164, 2000 (No date).

Yeh, Pochi "Optical Waves in Layered Media", Wiley, 1988 (No date).

Vinogtadox, A V "X–ray and Far UV Multilayer Mirrors: Principles and Possibilities", Applied Optics, vol. 16, No. 1, p 89, 1977 (No date).

American Institute of Physics Handbook, third edition. Mc–Graw Hill Book Company, 1972 (No date).

Handbook of Optics. McGraw–Hill Book Company, 1978. (No dated).

"Surface Plasmon–Polariton Study of the Optical Dielectric Function of Silver", Nash, D.J., Sambles, J.R., Journal of Modern Optics, vol. 43, No. 1 (1996), pp. 81–91 (No dated).

"Electromagnetic Surface Modes". Boardman, A.D., Wiley Interscience, 1982 (No date).

"Surface Plasmons in Thin Films", Economou, E.N., Physical Review, vol. 182, No. 2 (Jun. 1969), pp. 539–554 (No date).

"Surface–Polariton–Like Waves Guided by Thin, Lossy Metal Films", Burke, J.J., Stegeman, G.I. Tamir, T., Physical Review B, vol. 33, No. 8 (Apr. 1986), pp. 5186–5201 (No date).

"Long–Range Surface Plasmon–Polaritons in Asymmetric Layer Structures", Wendler, L., Haupt, R., Journal of Applied Physics, vol. 59, No. 9 (May 1986), pp. 3289–3291 (No dated).

"Guided Optical Waves in Planar Heterostructures with Negative Dielectric Constant" Prade, B., Vinet, J.Y., Mysyrowicz, A., Physical Review B, vol. 44, No. 24 (Dec. 1991), pp. 13556–13572 (No date).

"Negative Group Velocities in Metal–Film Optical Waveguides", Tournois, P., Laude, V., Optics Communications, Apr. 1997, pp. 41–45. (No date).

"Surface Plasmon Polaritons in Thin Metal Films and Their Role in Fiber Optic Polarizing Devices", Johnstone, W., Stewart, G., Hart, T., Culshaw B., Journal of Lightwave Technology, vol. 8, No. 4 (Apr. 1990), pp. 538–544. (No date).

"Characterization of Metal–Clade TE/TM Mode Splitters Using the Finite Element Method", Rajarajan, M., Themistos, C., Rahman, B.M.A., Grattan, K.T.V., Journal of Lightwave Technology, vol. 15, No. 12 (Dec. 1997), pp. 2264–2269 (No date).

"Plasmon–Polariton Modes Guided by a Metal Film of Finite Width", Berini, P., Optics Letters, vol. 24, No. 15 (Aug. 1999), pp. 1011–1013. (No date).

"The Method of Lines",Numerical Techniques for Microwave and Millimeter–Wave Passive Structures, Pregla, R., Pascher, W., Wiley Interscience, 1989, T. Itoh, Editor. (No date).

"Modeling Lossy Anisotropic Dielectric Waveguides With The Method of Lines", Berini, P., Wu, K., IEEE Transactions on Microwave Theory and Techniques, vol. MTT–44, No. 5 (May 1996), pp. 749–759. (No date).

"Normal Mode Analysis and Characterization of an InGaAs/GaAs MQW Field–Induced Optical Waveguide Including Electrode Effects", Berini, P., Stohr, A., Wu, K. Jager, D., Journal of Lightwave Technology, vol. 14, No. 10 (Oct. 1996), pp. 2422–2435. (No date).

"The Use of Extrapolation Techniques with Electrical Network Analogue Solutions", Culver, R., British Journal of Applied Physics, vol. 3 (Dec. 1952) pp. 376–378. (No date).

"Computation Methods for Electromagnetics and Microwaves", Boonton, R.C., Wiley Interscience, 1992. (No date).

"Excitation of Surface Polaritons by End–Fire Coupling", Stegeman, G.I., Wallis, R.F., Maradudin, A.A., Optics Letters, vol. 8, No. 7 (Jul. 1983), pp. 386–388. (No date).

"Plasmon–Polariton Waves Guided by Thin Lossy Metal Films of Finite Width: Bound Modes of Symmetric Stuctures", Berini, P., Physical Review B, vol. 61, No. 15, (2000), pp 10484–10503 (No date).

Kraus, et al., Electromagnetics, second edition. McGraw–Hill (No date).

"Experimental Observation of Plasmon–Polariton Waves Supported by a Thin Metal Film of Finite Width", Charbonneau, R., Berini, P., Berolo, E., Lisicka–Skrzek, E., Optics Letters, vol. 25, No. 11, pp. 844–846, Jun. 2000. (No date).

"Measurement of The Electrically Induced Refractive Index Change in Silicon for Wavelength =1.3 um using a Schottky Diode", Evans, A.F., Hall, D.G., Applied Physics Letters, vol. 56, No. 3, pp. 212–214, Jan., 1990 (No date).

"Integrated Optics Waveguide Modulator Based on Surface Plasmons", Jung, C., Yee, S., Kuhn, K., Journal of Lightwave Technology, vol. 12, No. 10, pp. 1802–1806, Oct. 1994 (No date).

"High Frequency Attenuated Total Internal Reflection Light Modulator", Solgaard, O., Ho, F., Thackara, J.I., Bloom, D.M., Applied Physical Letters, vol. 61, No. 21, pp. 2500–2502, Nov., 1992 (No date).

"Long–range surface plasmon electro–optic modulator", Schidkraut, J.S., Applied Optics, vol. 27, No. 21, pp. 4587–4590, Nov., 1988. (No date).

"Novel Integrated Optic Intensity Modulator Based on Mode Coupling", Driessen, A., Klein Koerkamp, H.M.M., Popma, Th.J.A., Fibre and Integrated optics, vol. 13, pp. 445–461, 1994. (No date).

"A Cost 240 Benchmark Test for Beam Propagation Methods Applied to a Electrooptical Modulator Based on Surface Plasmons", Hoekstra, H.J.W.M.et al, Journal of Lightwave Technology, vol. 16, No. 10, pp. 1921–1926, Oct. 1998. (No date).

"The Proximity Effect of Conductors in Optical Waveguide Devices. Coupling to Plasmon–Polariton Modes", Berini, P., SPIE SD–25 Millimeter–Wave Materials Devices and Components, in print, Jul. 2000. (No date).

"The Almost–Magical wordl of photonic Crystals" J.D. Joannopoulos, Brazilian Jornal of Physics, vol. 26, No. 1, Mar. 1996 pp 58–67 (No date).

"Plasmon–Polariton Modes Guided by a Metal Film of Finite Width Bounded by Different Dielectrics", Berini, P., Optics Express, vol. 7, No. 10, pp. 329–335. (No date).

"Plasmon–Polariton waves guided by thin lossy metal films of finite width: Bound Modes of Asymmetric Structures", Bereini, P., Physical Review B, in Press. Not yet published. (No date).

"A Complete Description of the Dispersion Relation for Thin Metal Film Plasmon–Polaritons", Burton, F.A., Cassidy, S.A., Journal of Lightwave Technology, vol. 8, No. 12 (Dec. 1990), pp. 1843–1849 (No date).

"Optical Properties of Metals", Georg Haas, U.S. Army Engineer Research and Development Laboratories, Colorado State University, Optics (No date).

* cited by examiner

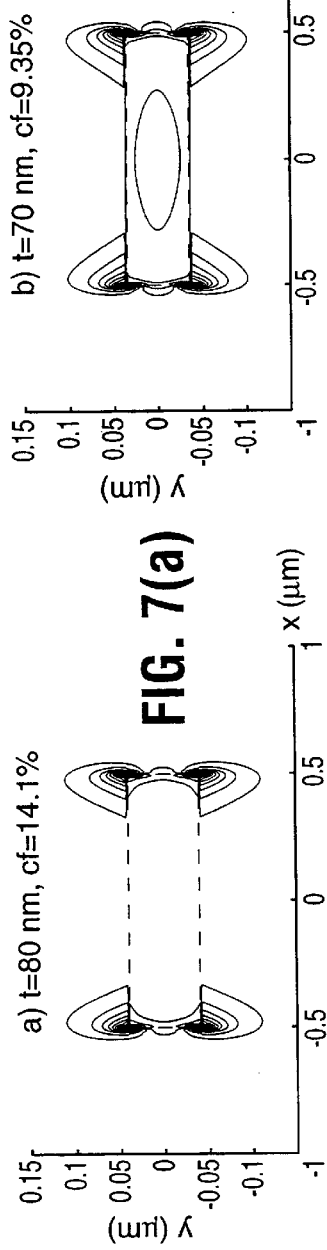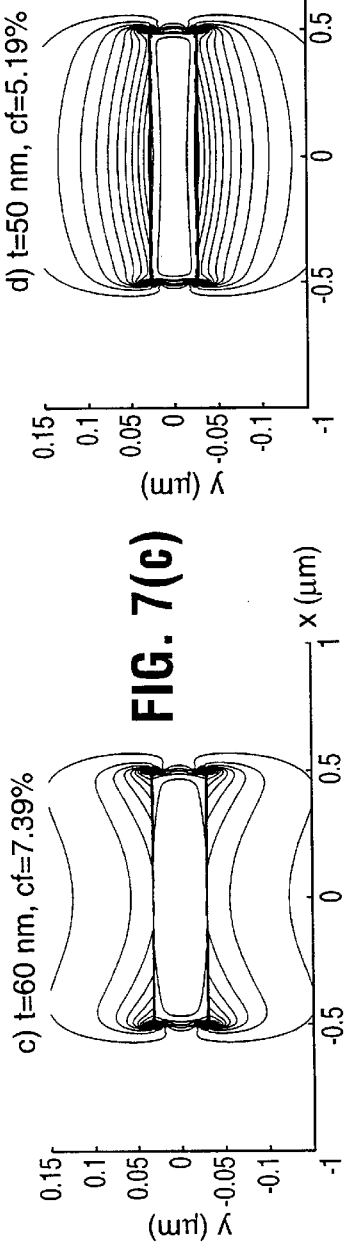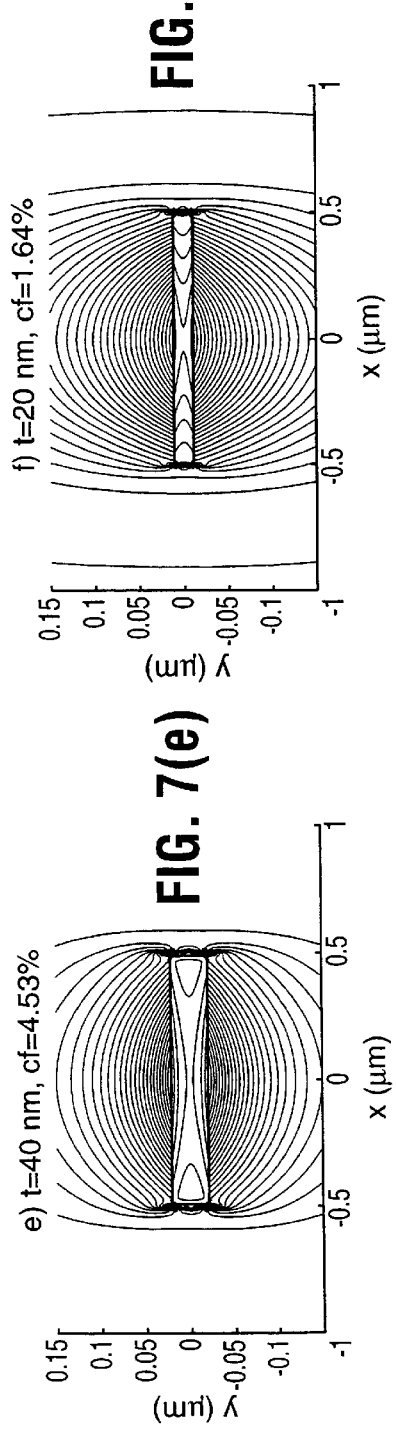
FIG. 7(a) a) t=80 nm, cf=14.1%
FIG. 7(b) b) t=70 nm, cf=9.35%
FIG. 7(c) c) t=60 nm, cf=7.39%
FIG. 7(d) d) t=50 nm, cf=5.19%
FIG. 7(e) e) t=40 nm, cf=4.53%
FIG. 7(f) f) t=20 nm, cf=1.64%

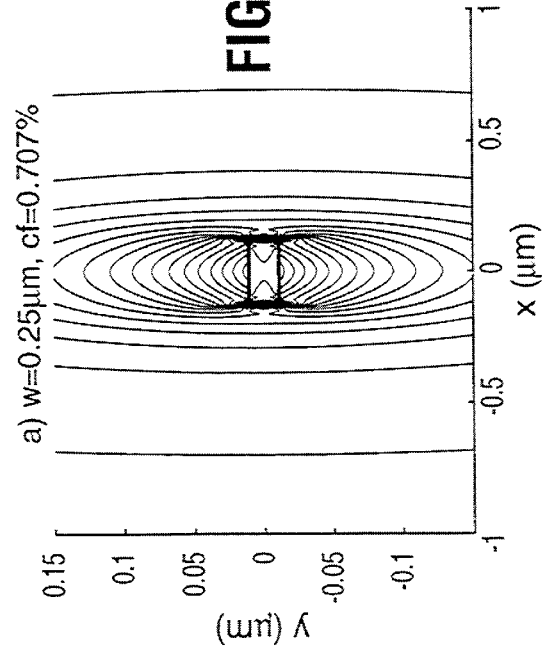
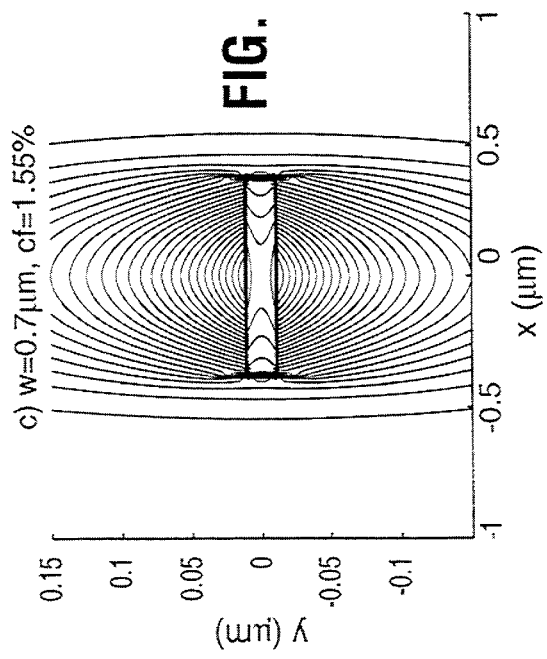
FIG. 12(a)
FIG. 12(b)
FIG. 12(c)
FIG. 12(d)

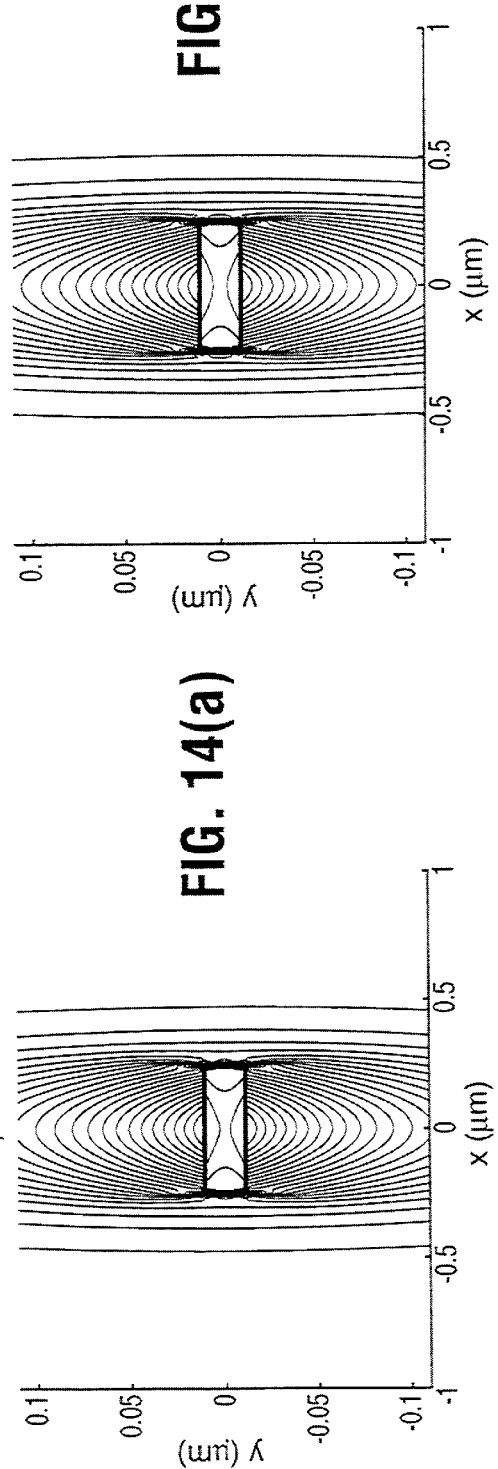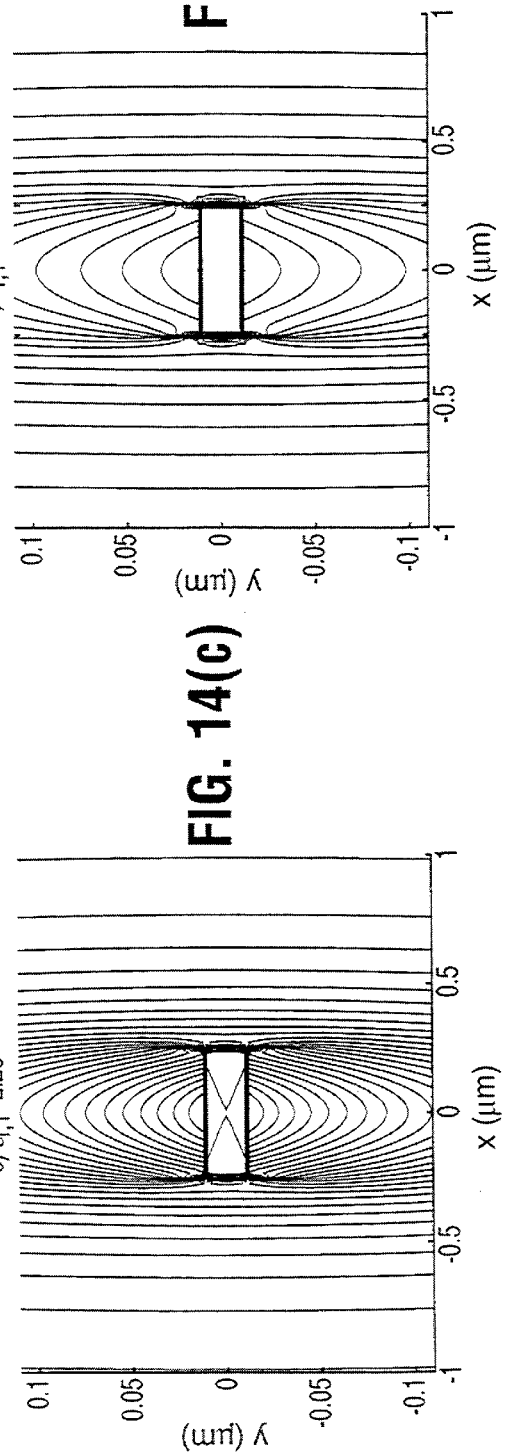
FIG. 14(a)  a) $\varepsilon_{r,1}=4.0$
FIG. 14(b)  b) $\varepsilon_{r,1}=3.61$
FIG. 14(c)  c) $\varepsilon_{r,1}=2.25$
FIG. 14(d)  d) $\varepsilon_{r,1}=1.0$ b) $\lambda_0=0.6\ \mu m,\ w=1.0\ \mu m$ d) $\lambda_0=0.8\ \mu m,\ w=1.0\ \mu m$ f) $\lambda_0=1.2\ \mu m,\ w=1.0\ \mu m$ a) $\lambda_0=0.6\ \mu m,\ w=0.5\ \mu m$ c) $\lambda_0=0.8\ \mu m,\ w=0.5\ \mu m$ e) $\lambda_0=1.2\ \mu m,\ w=0.5\ \mu m$

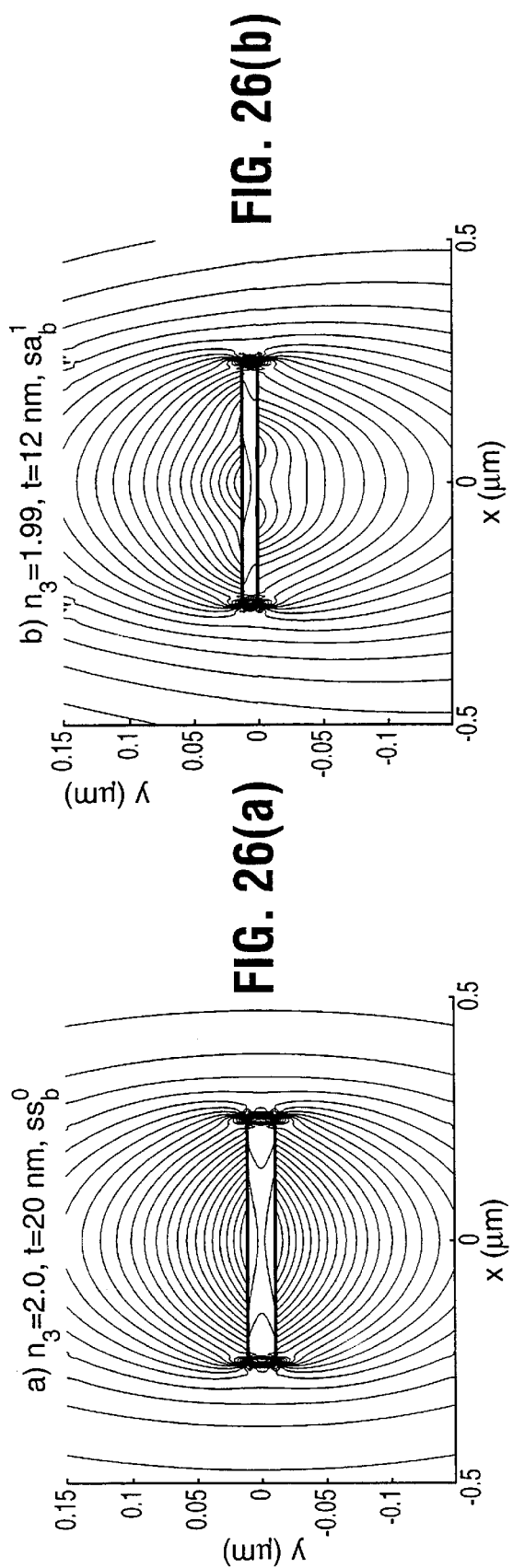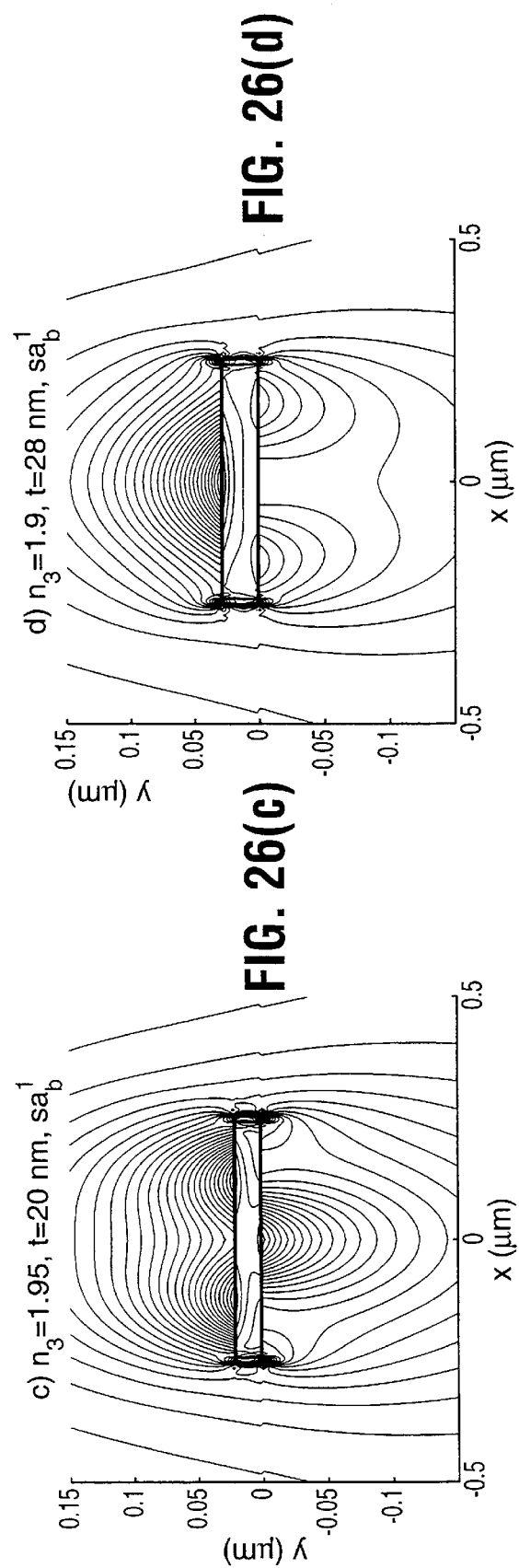
FIG. 26(a) a) $n_3=2.0$, t=20 nm, $ss_b^0$
FIG. 26(b) b) $n_3=1.99$, t=12 nm, $sa_b^1$
FIG. 26(c) c) $n_3=1.95$, t=20 nm, $sa_b^1$
FIG. 26(d) d) $n_3=1.9$, t=28 nm, $sa_b^1$

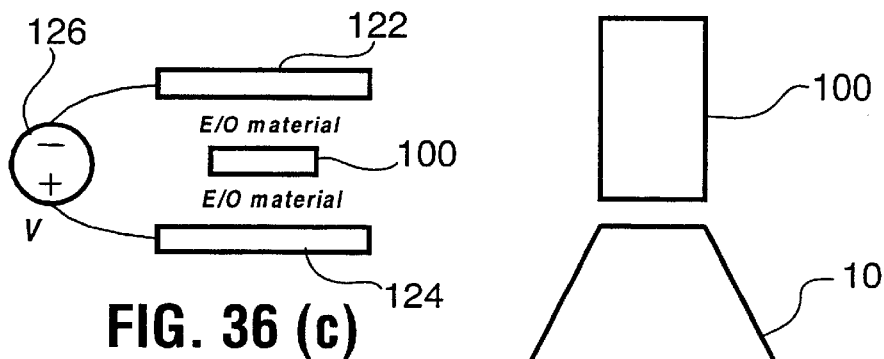
FIG. 36 (c)
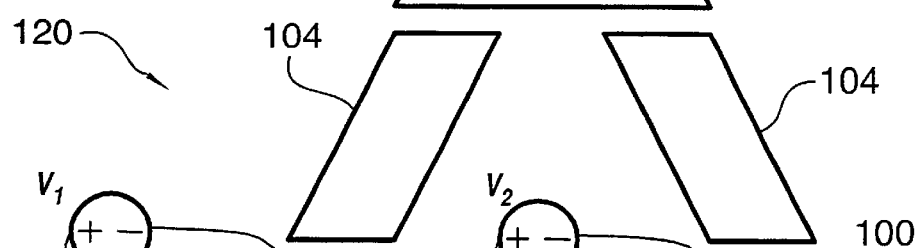
FIG. 36 (b)
FIG. 36 (a)

OPTICAL WAVEGUIDE STRUCTURES

This application claims priority from U.S. Provisional patent application No. 60/171,606 filed Dec. 23, 1999, Canadian patent application number 2,314,723 filed Jul. 31, 2000, Canadian patent application No. 2,319,949 filed Sep. 20, 2000, and is a Continuation-in-Part of U.S. patent application Ser. No. 09/629,816 filed Jul. 31, 2000, now U.S. Pat. No. 6,442,321 issued Aug. 27, 2002.

BACKGROUND OF THE INVENTION

1. Technical Field

The invention relates to optical devices and is especially applicable to waveguide structures and integrated optics.

2. Background Art

This specification refers to several published articles. For convenience, the articles are cited in full in a numbered list at the end of the description and cited by number in the specification itself. The contents of these articles are incorporated herein by reference and the reader is directed to them for reference.

In the context of this patent specification, the term "optical radiation" embraces electromagnetic waves having wavelengths in the infrared, visible and ultraviolet ranges.

The terms "finite" and "infinite" as used herein are used by persons skilled in this art to distinguish between waveguides having "finite" widths in which the actual width is significant to the performance of the waveguide and the physics governing its operation and so-called "infinite" waveguides where the width is so great that it has no significant effect upon the performance and physics or operation.

At optical wavelengths, the electromagnetic properties of some metals closely resemble those of an electron gas, or equivalently of a cold plasma. Metals that resemble an almost ideal plasma are commonly termed "noble metals" and include, among others, gold, silver and copper. Numerous experiments as well as classical electron theory both yield an equivalent negative dielectric constant for many metals when excited by an electromagnetic wave at or near optical wavelengths [1,2]. In a recent experimental study, the dielectric function of silver has been accurately measured over the visible optical spectrum and a very close correlation between the measured dielectric function and that obtained via the electron gas model has been demonstrated [3].

It is well-known that the interface between semi-infinite materials having positive and negative dielectric constants can guide TM (Transverse Magnetic) surface waves. In the case of a metal-dielectric interface at optical wavelengths, these waves are termed plasmon-polariton modes and propagate as electromagnetic fields coupled to surface plasmons (surface plasma oscillations) comprised of conduction electrons in the metal [4].

It is known to use a metal film of a certain thickness bounded by dielectrics above and below as an optical slab (planar, infinitely wide) waveguiding structure, with the core of the waveguide being the metal film. When the film is thin enough, the plasmon-polariton modes guided by the interfaces become coupled due to field tunnelling through the metal, thus creating supermodes that exhibit dispersion with metal thickness. The modes supported by infinitely wide symmetric and asymmetric metal film structures are well-known, as these structures have been studied by numerous researchers; some notable published works include references [4] to [10].

In general, only two purely bound TM modes, each having three field components, are guided by an infinitely wide metal film waveguide. In the plane perpendicular to the direction of wave propagation, the electric field of the modes is comprised of a single component, normal to the interfaces and having either a symmetric or asymmetric spatial distribution across the waveguide. Consequently, these modes are denoted $s_b$ and $a_b$ modes, respectively. The $s_b$ mode can have a small attenuation constant and is often termed a long-range surface plasmon-polariton, The fields related to the $a_b$ mode penetrate further into the metal than in the case of the $s_b$ mode and can be much lossier by comparison. Interest in the modes supported by thin metal films has recently intensified due to their useful application in optical communications devices and components. Metal films are commonly employed in optical polarizing devices [11] while long-range surface plasmon-polaritons can be used for signal transmission [7]. In addition to purely bound modes, leaky modes are also known to be supported by these structures.

Infinitely wide metal film structures, however, are of limited practical interest since they offer one-dimensional (1-D) field confinement only, with confinement occurring along the vertical axis perpendicular to the direction of wave propagation, implying that modes will spread out laterally as they propagate from a point source used as the excitation. Metal films of finite width have recently been proposed in connection with polarizing devices [12], but merely as a cladding, In addition to the lack of lateral confinement, plasmon-polariton waves guided by a metal-dielectric interface are in general quite lossy. Even long-range surface plasmons guided by a metal film can be lossy by comparison with dielectric waveguides. Known devices exploit this high loss associated with surface plasmons for the construction of plasmon-polariton based modulators and switches. Generally, known plasmon-polariton based modulator and switch devices can be classified along two distinct architectures. The first architecture is based on the phenomenon of attenuated total reflection (ATR) and the second architecture is based on mode coupling between a dielectric waveguide and a nearby metal. Both architectures depend on the dissipation of optical power within an interacting metal structure.

ATR based devices depend on the coupling of an optical beam, which is incident upon a dielectric-metal structure placed in optical proximity, to a surface plasmon-polariton mode supported by the metal structure. At a specific angle of incidence, which depends on the materials used and the particular geometry of the device, coupling to a plasmon mode is maximised and a drop in the power reflected from the metal surface is observed. ATR based modulators make use of this attenuated reflection phenomenon along with means for varying electrically or otherwise at least one of the optical parameters of one of the dielectrics bounding the metal structure in order to shift the angle of incidence where maximum coupling to plasmons occurs. Electrically shifting the angle of maximum coupling results in a modulation of the intensity of the reflected light. Examples of devices that are based on this architecture are disclosed in references [23] to [36].

Mode coupling devices are based on the optical coupling of light propagating in a dielectric waveguide to a nearby metal film placed a certain distance away and in parallel with the dielectric waveguide. The coupling coefficient between the optical mode propagating in the waveguide and the plasmon-polariton mode supported by the nearby metal film is adjusted via the materials selected and the geometrical parameters of the device. Means is provided for varying, electrically or otherwise, at least one of the optical parameters of one of the dielectrics bounding the metal. Varying an optical parameter (the index of refraction, say) varies the coupling coefficient between the optical wave propagating in the dielectric waveguide and the lossy plasmon-polariton wave supported by the metal. This results in a modulation in the intensity of the light exiting the dielectric waveguide. References [37] to [40] disclose various device implementations based upon this phenomenon. Reference [41] further discusses the physical phenomenon underlying the operation of these devices.

Reference [42] discusses an application of the ATR phenomenon for realising an optical switch or bistable device, These known modulation and switching devices disadvantageously require relative high control voltages and have limited electrical/optical bandwidth.

SUMMARY OF THE INVENTION

The present invention seeks to eliminate, or at least mitigate, one or more of the disadvantages of the prior art.

According to one aspect of the present invention there is provided a waveguide structure comprising a thin strip having finite width and thickness with dimensions such that optical radiation having a wavelength in a predetermined range couples to the strip and propagates along the length of the strip as a plasmon-polariton wave. The strip may comprise a material having a relatively high free charge carrier density, for example a conductor or certain classes of highly-doped semiconductor. The surrounding material may have a relatively low free charge carrier density, i.e. an insulator or undoped lightly doped semiconductor.

Such a strip of finite width offers two-dimensional (2-D) confinement in the transverse plane, i.e. perpendicular to the direction of propagation, and, since suitable low-loss waveguides can be fabricated from such strip, it may be useful for signal transmission and routing or to construct components such as couplers, power splitters, interferometers, modulators, switches and other typical components of integrated optics. In such devices, different sections of the strip serving different functions, in some cases in combination with additional electrodes. The strip sections may be discrete and concatenated or otherwise interrelated, or sections of one or more continuous strips.

For example, where the optical radiation has a free-space wavelength of 1550 nm, and the waveguide is made of a strip of a noble metal surrounded by a good dielectric, say glass, suitable dimensions for the strip are thickness less than about 0.1 microns, preferably about 20 nm, and width of a few microns, preferably about 4 microns.

The strip could be straight, curved, bent, tapered, and so on.

The dielectric material may be inhomogeneous, for example a combination of slabs, strips, laminae, and so on. The conductive or semiconductive strip may be inhomogeneous, for example a gold layer sandwiched between thin layers of titanium.

The plasmon-polariton wave which propagates along the structure may be excited by an appropriate optical field incident at one of the ends of the waveguide, as in an end-fire configuration, and/or by a different radiation coupling means.

The low free-carrier density material may comprise two distinct portions with the strip extending therebetween, at least one of the two distinct portions having at least one variable electromagnetic property, and the device then may further comprise means for varying the value of said electromagnetic property of said one of the portions so as to vary the propagation characteristics of the waveguide structure and the propagation of the plasmon-polariton wave.

In some embodiments of the invention, for one said value of the electromagnetic property, propagation of the plasmon-polaziton wave is supported and, for another value of said electromagnetic property, propagation of the plasmon-polariton wave is at least inhibited. Such embodiments may comprise modulators or switches.

Different embodiments of the invention may employ different means of varying the electromagnetic property, such as varying the size of at least one of said portions, especially if it comprises a fluid.

The at least one variable electromagnetic property of the material may comprise permittivity, permeability or conductivity.

Where the portion comprises an electrooptic material, the variable electromagnetic property will be permittivity, which may be varied by applying an electric field to the portion, or changing an electric field applied thereto, using suitable means.

Where the portion comprises a magneto-optic material, the variable electromagnetic property will be permittivity which may be varied by applying a magnetic field to the portion or changing a magnetic field applied thereto, using suitable means.

Where the portion comprises a thermo-optic material, the electromagnetic property may be permittivity and be varied by changing the temperature of the material.

Where the portion comprises an acousto-optical (photoelastic) material, the electromagnetic property may be permittivity and be varied by changing mechanical strain in the material.

Where the portion comprises a magnetic material (such as a ferrite), the electromagnetic property will be permeability and may be varied by applying a magnetic field to the material or changing a magnetic field applied thereto, by suitable means.

Where the portion comprises a semiconductor material, the electromagnetic property will be conductivity or permittivity and may be varied by changing free charge carrier density in said portion, using suitable means.

Additionally or alternatively, the propagation of the plasmon-polariton wave may be varied by varying an electromagnetic property of the strip. For example, the permittivity of the strip may be varied by changing the free charge carrier density or by changing or applying a magnetic field through the strip.

Various objects, features, aspects and advantages of the present invention will become more apparent from the following detailed description, taken in conjunction with the accompanying drawings, of a preferred embodiment of the invention.

BRIEF DESCRIPTION OF DRAWINGS

FIGS. 7(a),(b),(c),(d),(e) and (f) are contour plots of Re{$S_z$} associated with the $ss_b^0$ mode for symmetric metal film waveguides of width w=1 μm and various thicknesses. The power confinement factor of is also given in all cases, and is computed via equation (12) with the area of the waveguide core $A_r$ taken as the area of the metal region, In all cases, the outline of the metal film is shown as the rectangular dashed contour;

FIGS. 12(a),(b),(c) and (d) illustrate a contour plot of Re{$S_z$} associated with the $ss_b^0$ mode for symmetric metal film waveguides of thickness t=20 nm and various widths. The power confinement factor cf is also given in all cases, and is computed via equation (12) with the area of the waveguide core $A_c$ taken as the area of the metal region. In all cases, the outline of the metal film is shown as the rectangular dashed contour;

FIGS. 14(a),(b),(c) and (d) illustrates a contour plot of Re{Sz} associated with the $ss_b^0$ mode for a symmetric metal film waveguide of width w=0.5 μm and thickness t=20 nm for various background permittivities $\in_{r,1}$. In all cases, the outline of the metal film is shown as the rectangular dashed contour;

FIGS. 26(a),(b),(c) and (d) illustrate a contour plot of $\Re\{S_z\}$ associated with the long-ranging modes supported by asymmetric metal film waveguides of width w=0.5 μm and having different superstrate permittivities $\epsilon_3$. In all cases, the outline of the metal film is shown as the rectangular dashed contour;

FIG. 36(a) is a schematic plan view of a modulator using the Mach-Zehnder waveguide structure of FIG. 35;

FIGS. 36(b) and 36(c) are inset diagrams illustrating alternative ways of applying a modulation control voltage;

DESCRIPTION OF THE PREFERRED EMBODIMENT

I. Introduction

Figure 1:
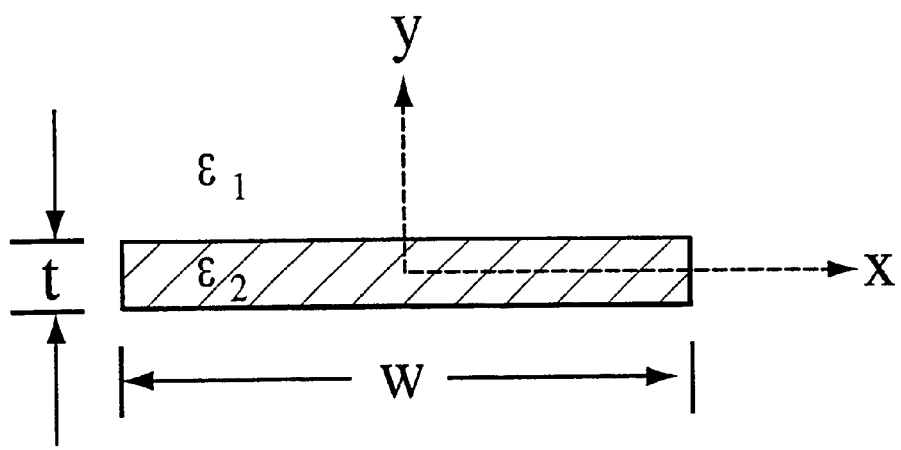
FIGS. 1(a) and 1(b) are a cross-sectional illustration and a plan view, respectively, of a symmetric waveguide structure embodying the present invention in which the core is comprised of a lossy metal film of thickness t, width w, length l and permittivity $\in_2$ embedded in a cladding or background comprising an "infinite" homogeneous dielectric having a permittivity $\in_1$.
Figure 1:
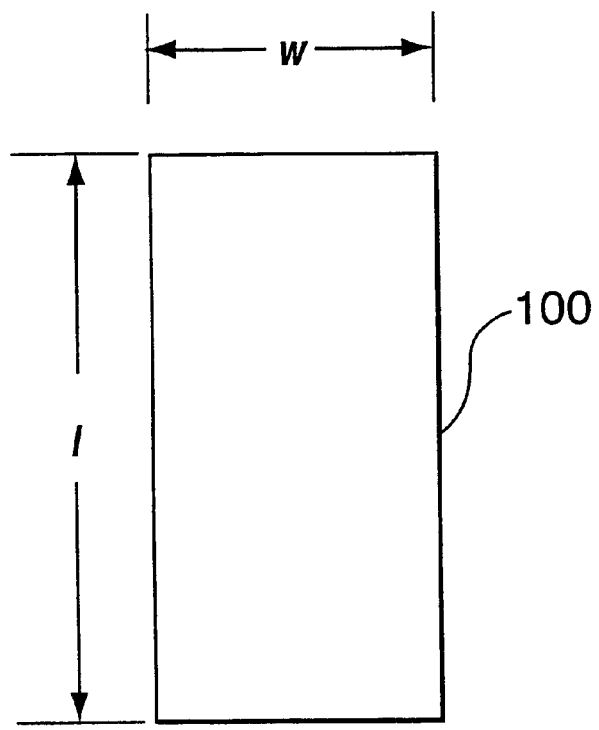

In order to facilitate an understanding of the specific optical devices embodying the invention, their theoretical basis will first be explained with reference to FIGS. 1 to 26(d).

The following is a comprehensive description of the purely bound modes of propagation supported by symmetric and asymmetric waveguide structures comprised of a thin lossy metal film of finite-width as the core. The core can be embedded in an "infinite" homogeneous dielectric medium as shown in FIG. 1(a) or supported by a semi-infinite homogeneous dielectric substrate and covered by a different semi-infinite homogeneous dielectric superstrate as shown in FIG. 17(a). The description is organized as follows. Section II summarizes the physical basis and numerical technique used to analyze the structures of interest. Sections III through VI describe the modes supported by symmetric structures as shown in FIG. 1(a) and sections VII through X describe the modes supported by asymmetric structures as shown in FIG. 17(a). Concluding remarks are given in section XI.

II. Physical Basis and Numerical Technique

A symmetric structure embodying the present invention is shown in FIGS. 1(a) and 1(b). It comprises a lossy metal film of thickness t, width w and equivalent permittivity $\in_2$, surrounded by a cladding or background comprising an infinite homogeneous dielectric of permittivity $\in_1$. FIG. 17(a) shows an asymmetric structure ($\in_1 \neq \in_3$) embodying the present invention. The Cartesian coordinate axes used for the analysis are also shown with propagation taking place along the z axis, which is out of the page.

It is assumed that the metal region shown in FIGS. 1(a) and 17(a) can be modeled as an electron gas over the wavelengths of interest. According to classical or Drude electron theory, the complex relative permittivity of the metal region is given by the well-known plasma frequency dispersion relation [4]:

$$\varepsilon_{r,2} = \left(1 - \frac{\omega_p^2}{\omega^2 + v^2}\right) - j\left(\frac{\omega_p^2 v}{\omega(\omega^2 + v^2)}\right) \quad (1)$$

where $\omega$ is the excitation frequency, $\omega_P$ is the electron plasma frequency and $v$ is the effective electron collision frequency, often expressed as $v=1/\tau$ with $\tau$ defined as the relaxation time of electrons in the metal. When $\omega^2+v^2 < \omega_P^2$ (which is the case for many metals at optical wavelengths) a negative value for the real part $\in_{r,2}$ is obtained, implying that plasmon-polariton modes can be supported at interfaces with normal dielectrics.

Electromagnetic Wave and Field Equations

The modes supported by the structures are obtained by solving a suitably defined boundary value problem based on Maxwell's equations written in the frequency domain for a lossy inhomogeneous isotropic medium. Uncoupling Maxwell's equations yields the following time-harmonic vectorial wave equations for the E and H fields:

$$\nabla \times \nabla \times E - \omega^2 \in(x,y) \mu E = 0 \quad (2)$$

$$\nabla \times \in(x,y)^{-1} \nabla \times H - \omega^2 \mu H = 0 \quad (3)$$

where the permittivity $\in$ is a complex function of cross-sectional space, and describes the waveguide structure. For the structures analyzed in this description, $\mu$ is homogeneous and taken as the permeability of free space $\mu_0$.

Due to the nature of the numerical method used to solve the boundary value problem, the implicit y dependence of the permittivity can be immediately removed since any inhomogeneity along y is treated by dividing the structure into a number of layers that are homogeneous along this direction, and suitable boundary conditions are applied between them.

The two vectorial wave equations (2) and (3) are expanded in each layer into scalar wave equations, some being coupled by virtue of the remaining inhomogeneity in $\in$ along x. Since the structure under consideration is invariant along the propagation axis (taken to be in the +z direction), the mode fields vary along this dimension according to $e^{-\gamma z}$ where $\gamma=\alpha+j\beta$ is the complex propagation constant of the mode, $\alpha$ being its attenuation constant and $\beta$ its phase constant. Substituting this field dependency into the scalar wave equations, and writing them for TE$^x$ ($E_x$=0) and TM$^x$ ($H_x$=0) modes while making use of $\nabla \cdot [\in(x)E]=0$ and $\nabla \cdot H=0$ accordingly, yields simplified and uncoupled scalar wave equations that are readily solved. The $E_y$ component of the TE$^x$ modes must satisfy the Helmholtz wave equation:

$$\frac{\partial^2}{\partial x^2} E_y^{TE} + \frac{\partial^2}{\partial y^2} E_y^{TE} + [\gamma^2 + \omega^2 \mu \epsilon(x)] E_y^{TE} = 0 \quad (4)$$

and the $H_y$ component of the TM$^x$ modes must satisfy the Sturm-Liouville wave equation:

$$\epsilon(x) \frac{\partial}{\partial x}\left[\frac{1}{\epsilon(x)} \frac{\partial}{\partial x} H_y^{TM}\right] + \frac{\partial^2}{\partial y^2} H_y^{TM} + [\gamma^2 = \omega^2 \mu \epsilon(x)] H_y^{TM} = 0 \quad (5)$$

The superposition of the TE$^x$ and TM$^x$ mode families then describes any mode propagating in the structure analyzed. The electric and magnetic field components resulting from this superposition are given by the following equations:

$$E_x = \frac{-1}{j\omega\gamma}\left[\frac{\partial}{\partial x}\left(\frac{1}{\epsilon(x)} \frac{\partial}{\partial x} H_y^{TM}\right) + \omega^2 \mu H_y^{TM}\right] \quad (6)$$

$$E_y = E_y^{TE} - \frac{i}{j\omega\gamma\epsilon(x)} \frac{\partial^2}{\partial x \partial y} H_y^{TM} \quad (7)$$

$$E_z = \frac{1}{\gamma} \frac{\partial}{\partial y} E_y^{TE} + \frac{i}{j\omega\epsilon(x)} \frac{\partial^2}{\partial x} H_y^{TM} \quad (8)$$

$$H_x = \frac{1}{j\omega\gamma}\left[\frac{1}{\mu} \frac{\partial^2}{\partial x^2} E_y^{TE} + \omega^2 \epsilon(x) E_y^{TE}\right] \quad (9)$$

$$H_y = \frac{1}{j\omega\gamma\mu} \frac{\partial^2}{\partial x \partial y} E_y^{TE} + H_y^{TM} \quad (10)$$

$$H_z = -\frac{1}{j\omega\mu} \frac{\partial}{\partial x} E_y^{TE} + \frac{1}{\gamma} \frac{\partial}{\partial y} H_y^{TM} \quad (11)$$

In order to obtain a mode of propagation supported by a waveguiding structure, the Helmholtz and Sturm-Liouville wave equations (4) and (5), along with the field equations (6)–(11), must be solved for the propagation constant $\gamma$ using appropriate boundary conditions applied between layers and at the horizontal and vertical limits.

Poynting Vector and Power Confinement Factor

The power confinement factor is defined as the ratio of mode complex power carried through a portion of a waveguide's cross-section with respect to the mode complex power carried through the entire waveguide cross-section. Formally it is expressed as:

$$cf = \frac{\left|\int\int_{A_c} S_z ds\right|}{\left|\int\int_{A_\infty} S_z ds\right|} \quad (12)$$

where $A_c$ is usually taken as the area of the waveguide core and $A_\infty$ implies integration over the entire waveguide cross-section (which can be all cross-sectional space for an open structure) or the entire cross-sectional computational domain. $S_z$ refers to the z component of the Poynting vector:

$$S_z = 1/2(E_x H_y^* - E_y H_x^*) \quad (13)$$

and $H_{x,y}^*$ denotes the complex conjugate of $H_{x,y}$. The spatial distribution of a component of the Poynting vector is easily computed from the spatial distribution of the relevant electric and magnetic mode field components.

Numerical Solution Approach

The boundary value problem governed by equations (4) to (11) is solved by applying the Method of Lines (MoL). The MoL is a well-known numerical technique and its application to various electromagnetic problems, including optical waveguiding, is well-established [14]. The MoL is rigorous, accurate and flexible. It can handle a wide variety of waveguide geometries, including the structures at hand. The method is not known to generate spurious or non-physical modes. The MoL formulation used herein is based on the formulation reported in [15], but simplified for isotropic media, as prescribed by equations (4)–(11) and reported in [16]. Except for a 1-D spatial discretization, the method is exact.

The main idea behind the MoL is that the differential field equations governing a waveguiding problem are discretized only as far as necessary so that generalized analytic solutions can be applied to derive a homogeneous matrix problem describing all modes supported by the structure. This approach renders the method accurate and computationally efficient since only N−1 dimensions must be discretized to solve an N dimension problem. In the case of a two-dimensional (2-D) waveguiding structure, this means that only one spatial dimension needs to be discretized. The main features of this procedure, as applied to a modal analysis problem, are described below.

- The x axis and the function $\in(x)$ are discretized using two shifted non-equidistant line systems, parallel to the y axis.
- The differential operators $\setminus x$ and $^2/^2x$ in the wave and field equations are replaced by finite difference approximations that include the lateral boundary conditions.
- The discretized wave equations are diagonalized using appropriate transformations matrices.
- The diagonalization procedure yields in the transform domain two systems of uncoupled one-dimensional (1-D) differential equations along the remaining dimension (in this case along the y axis).
- These differential equations are solved analytically and tangential field matching conditions are applied at interfaces between layers along with the top and bottom boundary conditions.
- The last field matching condition, applied near the center of the structure, yields a homogeneous matrix equation of the form $G(\gamma)\bar{e}=0$ which operates on transformed tangential fields.
- The complex propagation constant $\gamma$ of modes is then obtained by searching for values that satisfy $\det[G(\gamma)]=0$.
- Once the propagation constant of a mode has been determined, the spatial distribution of all six field components of the mode are easily generated.
- A mode power confinement factor can be computed by first computing the spatial distribution of $S_z$ which is then integrated according to Equation (12).

The open structures shown in FIGS. 1(a) and 17(a) are discretized along the x axis and the generalized analytic solution applied along the y axis. The physical symmetry of the structures is exploited to increase the accuracy of the results and to reduce the numerical effort required to generate the mode solutions. For the symmetric structure shown in FIG. 1(a), this is achieved by placing either electric wall ($E_{tan}=0$) or magnetic wall ($H_{tan}=0$) boundary conditions along the x and y axes. For the asymmetric structure shown in FIG. 17(a), this is achieved by placing electric wall or magnetic wall boundary conditions along the y axis only. The remaining horizontal boundary conditions are placed at infinity and the remaining lateral boundary condition is either placed far enough from the guide to have a negligible effect on the mode calculation, or a lateral absorbing boundary condition is used to simulate infinite space, depending on the level of confinement observed in the resulting mode. The use of numerical methods to solve differential equations inevitably raises questions regarding the convergence of computed results and their accuracy. The propagation constant of a mode computed using the method of lines converges in a monotonic or smooth manner with a reduction in the discretization interval (which increases the number of lines in the calculation and thus the numerical effort). This suggests that extrapolation can be used to generate a more accurate value for the propagation constant, and this value can then be used to compute the error in values obtained using the coarser discretizations [17]. This anticipated error does not correspond to the actual error in the propagation constant as the latter could only be known if the analytic or exact value were available. The anticipated error, however, still provides a useful measure of accuracy since it must tend toward zero as more accurate results are generated.

The convergence of the computed propagation constant of the modes supported by the structures of interest has been monitored during the entire study. The anticipated error in the results presented herein is estimated as 1% on average and 6% in the worst case. These error values are based on extrapolated propagation constants computed using Richardson's extrapolation formula [18].

III. Mode Characteristics and Evolution with Film Thickness: Symmetric Structures A. Review of Mode Solutions for Metal Film Slab Waveguides The review begins with the reproduction of results for an infinitely wide symmetric metal film waveguide, as shown in FIG. 1(a) with w=∞, taken from the standard work on such structures [6]. In order to remain consistent with their results, the optical free-space wavelength of excitation is set to $\lambda_0=0.633$ $\mu$m and their value for the relative permittivity of the silver film at this wavelength is used: $\in_{r,2}=-19-j0.53$. The relative permittivity of the top and bottom dielectric regions is set $\in_{r,1}=4$.

An infinitely wide structure supports only two purely bound TM ($E_x=H_y=H_z=0$) modes having transverse field components $E_y$ and $H_x$ that exhibit asymmetry or symmetry with respect to the x axis. These modes are created from the coupling of individual plasmon-polariton modes supported by the top and bottom interfaces and they exhibit dispersion with film thickness. The widely accepted nomenclature for identifying them consists in using the letters a or s for asymmetric or symmetric transverse field distributions, respectively, followed by a subscript b or l for bound or leaky modes, respectively. The propagation constants of the $a_b$ and $s_b$ modes have been computed as a function of film thickness and the normalized phase and attenuation constants are plotted in FIGS. 2(a) and 2(b), respectively.

Figure 2:
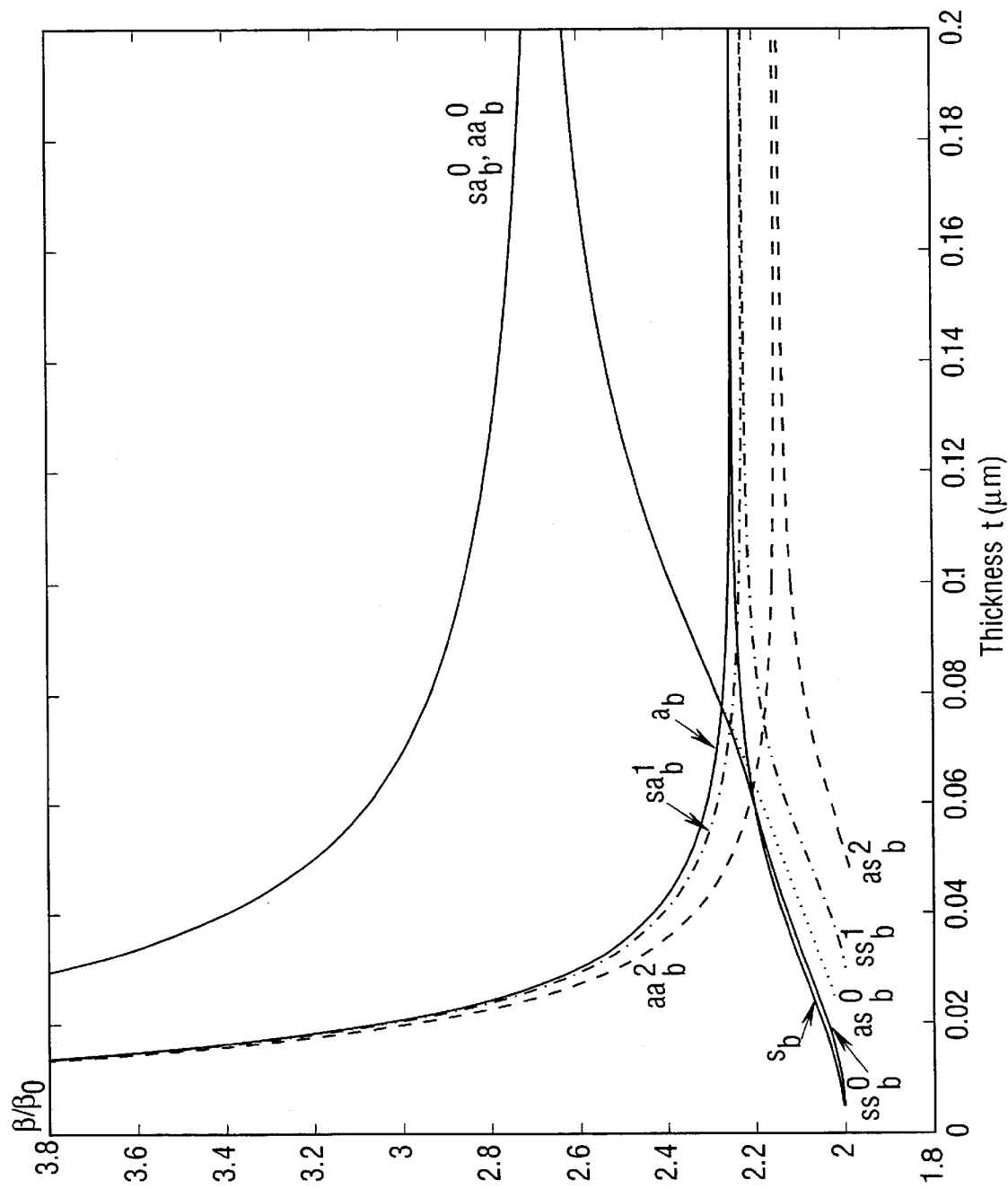
FIGS. 2(a) and 2(b) illustrate dispersion characteristics with thickness of the first eight modes supported by a symmetric metal film waveguide of width w=1 μm. The $a_b$ and $s_b$ modes supported for the case w=∞ are shown for comparison. (a) Normalized phase constant; (b) Normalized attenuation constant.
Figure 2B:
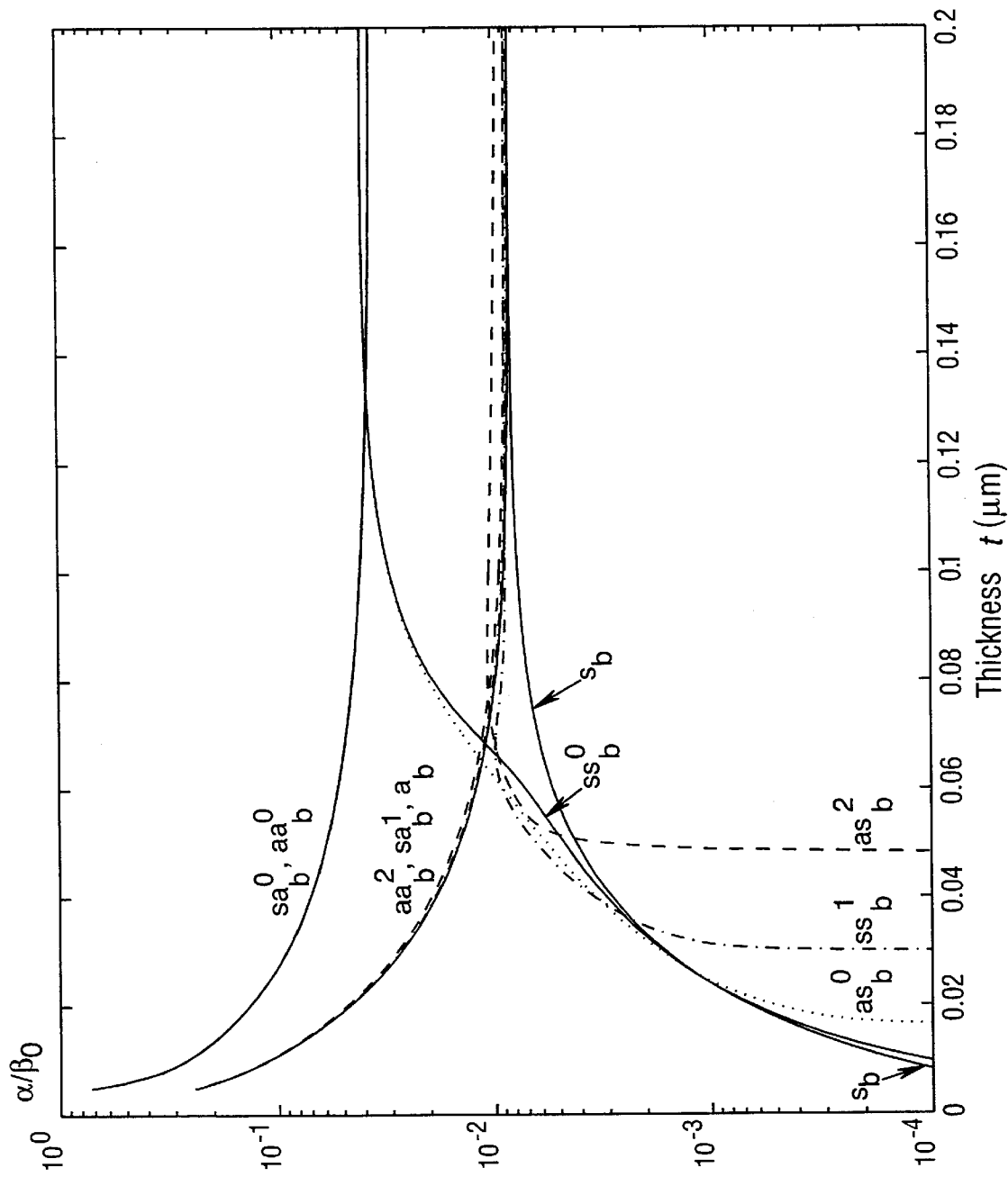
Figure 3A:
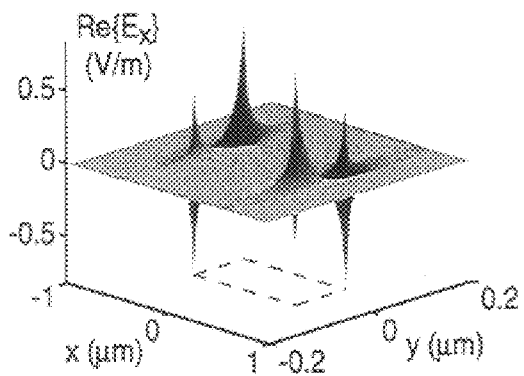
FIGS. 3(a),(b),(c),(d),(e) and (f) illustrate the spatial distribution of the six field components related to the $ss_b^0$ mode supported by a symmetric metal film waveguide of thickness t=100 nm and width w=1 μm. The waveguide cross-section is located in the x-y plane and the metal is bounded by the region −0.5≦x≦0.5 μm and −0.05≦y≦0.05 μm, outlined as the rectangular dashed contour. The field distributions are normalized such that max|Re{$E_y$}|=1.
Figure 3B:
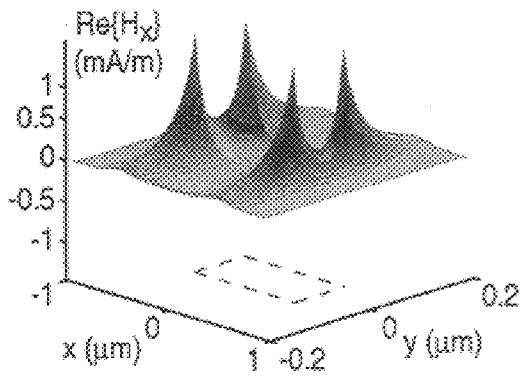
Figure 3C:
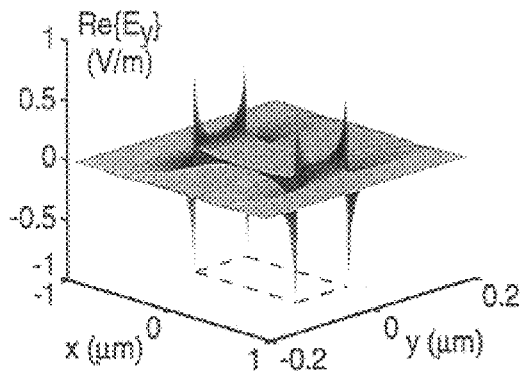
Figure 3D:
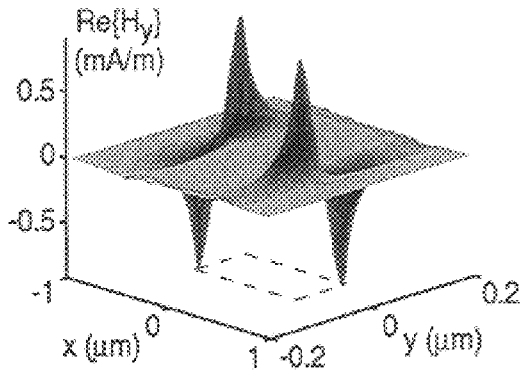
Figure 3E:
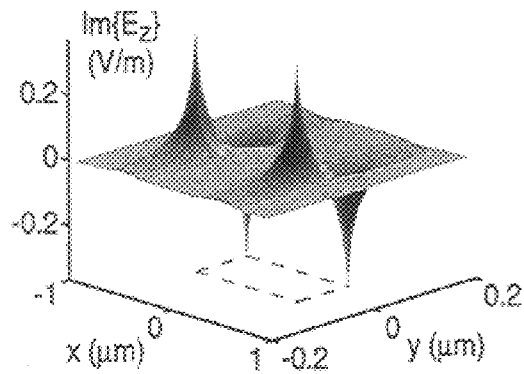
Figure 3F:
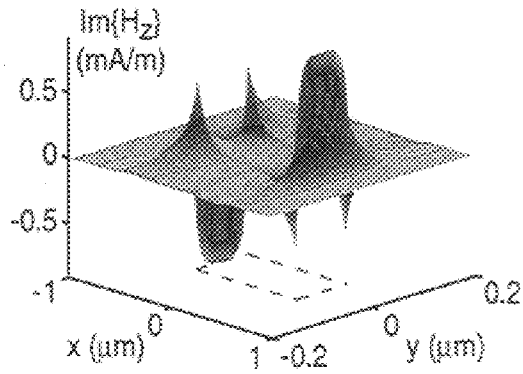
Figure 4A:
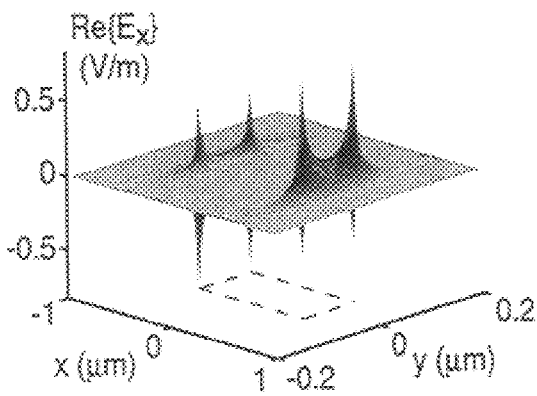
FIGS. 4(a),(b),(c),(d),(e) and (f) illustrate the spatial distribution of the six field components related to the $sa_b^0$ mode supported by a symmetric metal film waveguide of thickness t=100 nm and width w=1 μm. The waveguide cross-section is located in the x-y plane and the metal is bounded by the region −0.5≦x≦0.5 μm and −0.05≦y≦0.05 μm, outlined as the rectangular dashed contour. The field distributions are normalized such that max|Re{$E_y$}|=1.
Figure 4B:
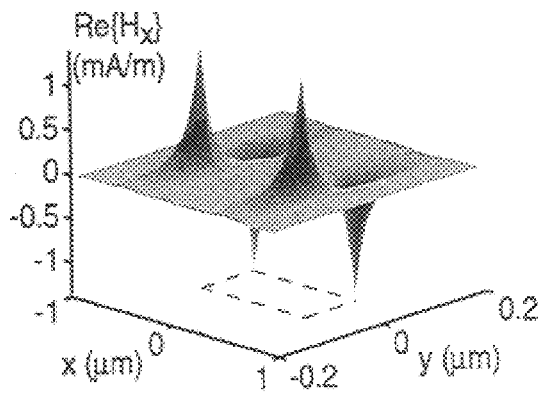
Figure 4C:
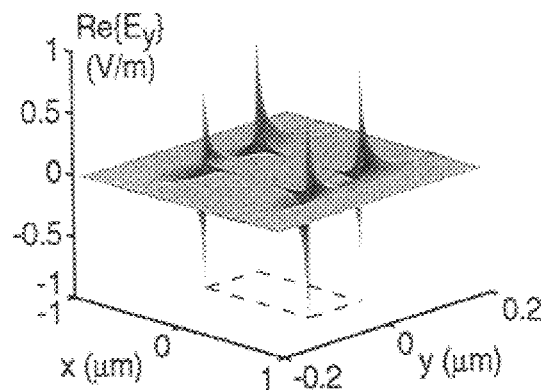
Figure 4D:
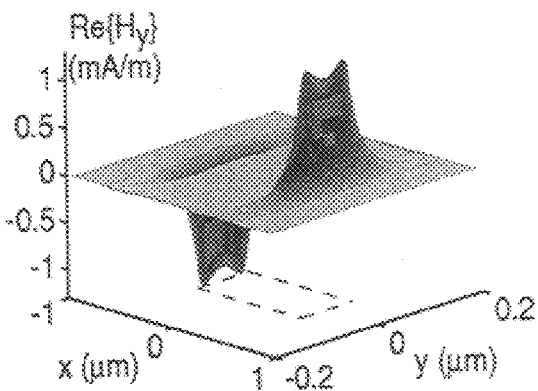
Figure 4E:
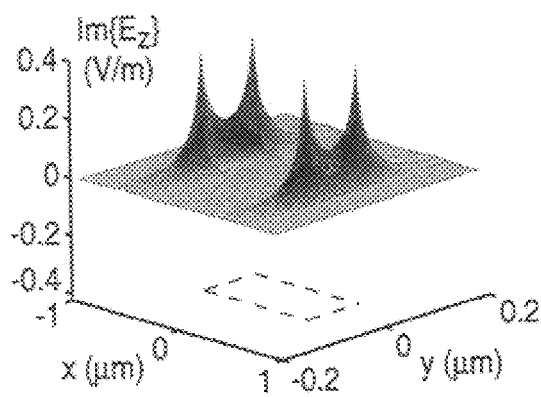
Figure 4F:
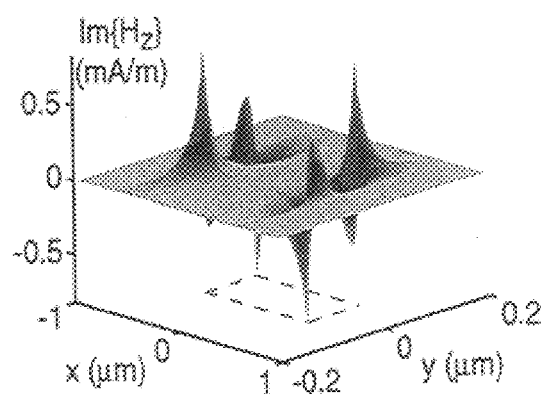
Figure 5A:
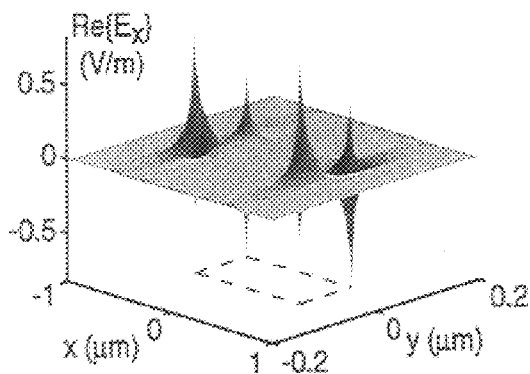
FIGS. 5(a),(b),(c),(d),(e) and (f) illustrate the spatial distribution of the six field components related to the $as_b^0$ mode supported by a symmetric metal film waveguide of thickness t=100 nm and width w=1 μm. The waveguide cross-section is located in the x-y plane and the metal is bounded by the region −0.5≦x≦0.5 μm and −0.05≦y≦0.05 μm, outlined as the rectangular dashed contour. The field distributions are normalized such that max|Re{Ey}|=1.
Figure 5B:
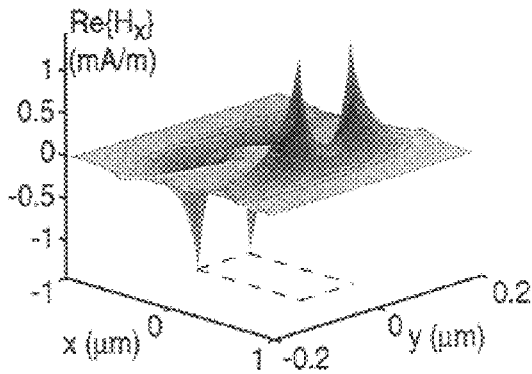
Figure 5C:
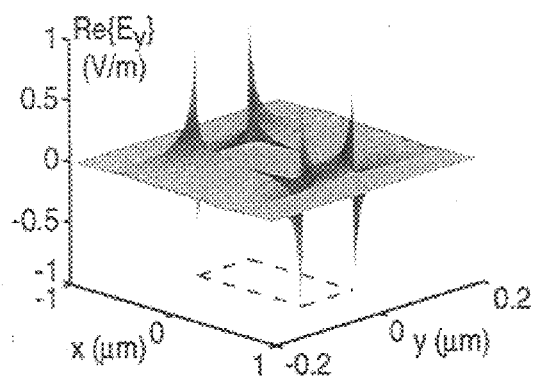
Figure 5D:
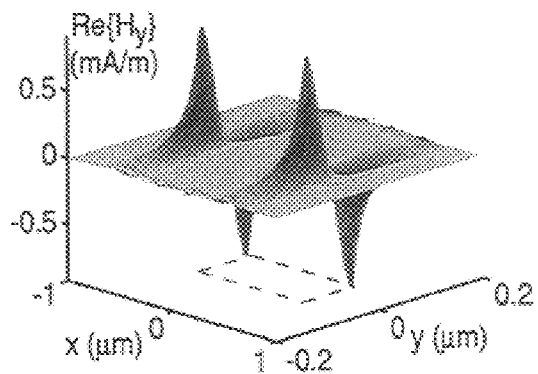
Figure 5E:
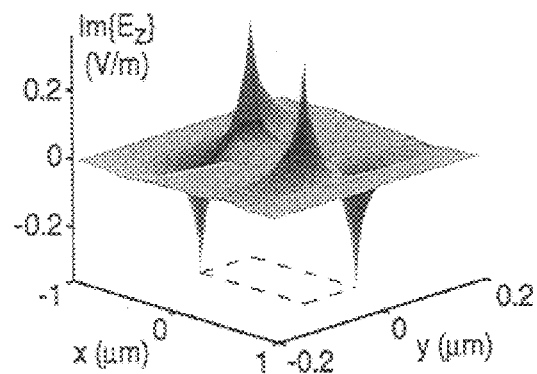
Figure 5F:
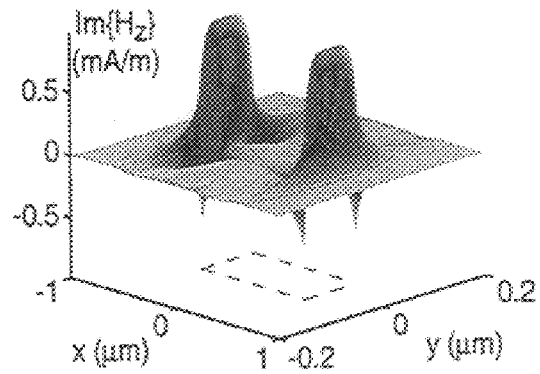
Figure 6A:
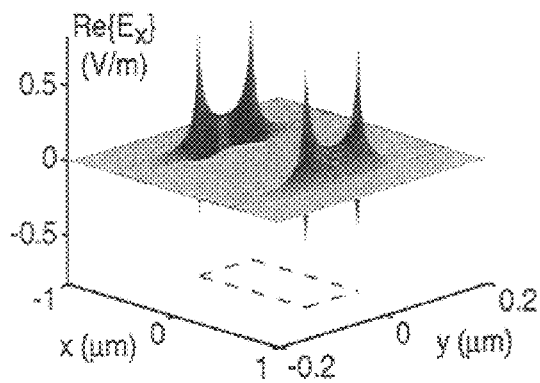
FIGS. 6(a),(b),(c),(d),(e) and (f) illustrate the spatial distribution of the six field components related to the $aa_b^0$ mode supported by a symmetric metal film waveguide of thickness t=100 nm and width w=1 μm. The waveguide cross-section is located in the x-y plane and the metal is bounded by the region −0.5≦x≦0.5 μm and −0.05≦y≦0.05 μm, outlined as the rectangular dashed contour. The field distributions are normalized such that max|Re{$E_y$}|=1.
Figure 6B:
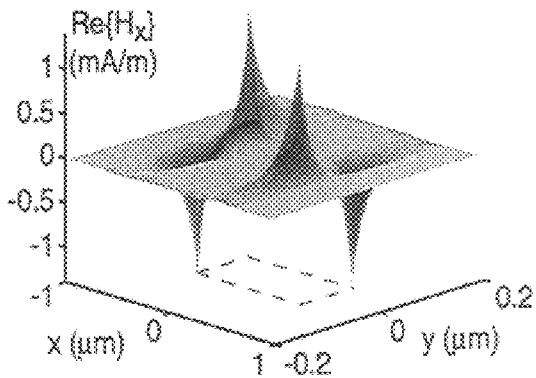
Figure 6C:
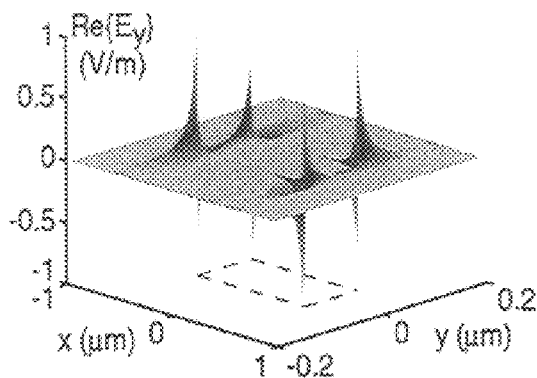
Figure 6D:
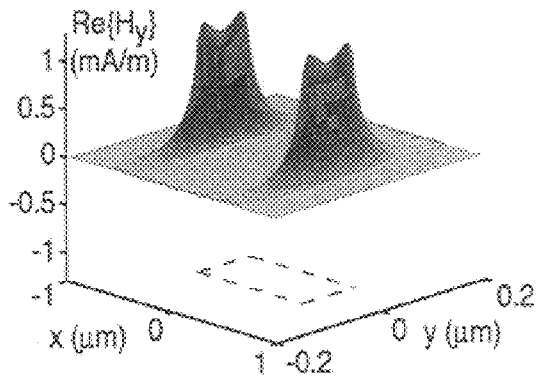
Figure 6E:
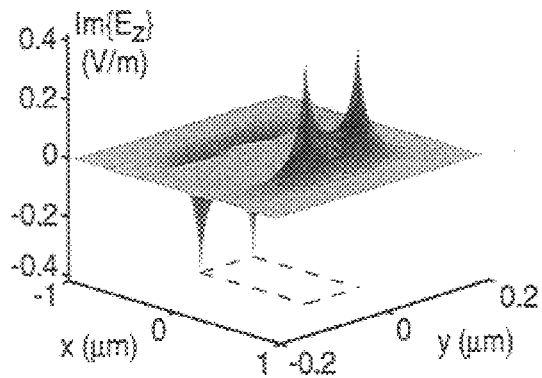
Figure 6F:
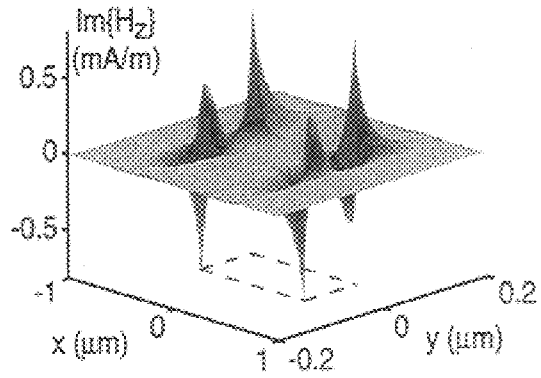

From FIGS. 2(a) and 2(b), it is observed that the $a_b$ and $s_b$ modes become degenerate with increasing film thickness. As the separation between the top and bottom interfaces increases, the $a_b$ and $s_b$ modes begin to split into a pair of uncoupled plasmon-polariton modes localized at the metal-dielectric interfaces. The propagation constants of the $a_b$ and $s_b$ modes thus tend towards that of a plasmon-polariton mode supported by the interface between semi-infinite metallic and dielectric regions, which is given via the following equations [6]:

$$\beta/\beta_0 = -Re\left\{\sqrt{\frac{\epsilon_{r,1}\epsilon_{r,2}}{\epsilon_{r,1}+\epsilon_{r,2}}}\right\} \quad (14)$$

$$\alpha/\beta_0 = -Im\left\{\sqrt{\frac{\epsilon_{r,1}\epsilon_{r,2}}{\epsilon_{r,1}+\epsilon_{r,2}}}\right\} \quad (15)$$

where $\beta_0 = \omega/c_0$ with $c_0$ being the velocity of light in free space, and $\epsilon_{r,1}$ and $\epsilon_{r,2}$ are the complex relative permittivities of the materials used, Using the above equations, values of $\beta/\beta_0 = 2.250646$ and $\alpha/\beta_0 = 0.836247 \times 10^{-2}$ are obtained for $\epsilon_{r,1} = 4$ and $\epsilon_{r,2} = -19 - j\ 0.53$.

As the thickness of the film decreases, the phase and attenuation constants of the $a_b$ mode increase, becoming very large for very thin films. This is due to the fact that the fields of this mode penetrate progressively deeper into the metal as its thickness is reduced. In the case of the $s_b$ mode, a decreasing film thickness causes the opposite effect, that is, the fields penetrate progressively more into the top and bottom dielectric regions and less into the metal. The propagation constant of this mode thus tends asymptotically towards that of a TEM (Transverse ElectroMagnetic) wave propagating in an infinite medium having the same permittivity as the top and bottom dielectric regions. In this case, the attenuation constant decreases asymptotically towards zero since losses were neglected in these regions. The $a_b$ and $s_b$ modes do not have a cutoff thickness.

The fields in an infinitely wide structure do not exhibit any spatial variation along x. Due to the nature of the MoL, and to the fact that the generalized analytical solution is applied along the y dimension, our results do not contain discretization errors and thus are in perfect agreement with those reported in [6].

B. Modes Supported by a Metal Film of Width w=1 μm

Next, the analysis of the structure shown in FIG. 1(a) for the case w=1 μm will be explained. The material parameters and free-space wavelength that were used in the previous case (w=∞) were also used here. The MoL was applied and the discretization adjusted until convergence of the propagation constant was observed. The physical quarter-symmetry of the structure was exploited by placing vertical and horizontal electric or magnetic walls along the y and x axes, respectively, which leads to four possible wall combinations as listed in Table 1. The first two purely bound (non-leaky) modes for each wall combination were found and their dispersion with metal thickness computed. The results for these eight modes are shown in FIGS. 2(a) and 2(b).

TABLE 1

Vertical-Horizontal wall combinations used along the axes of symmetry and proposed mode nomenclature: ew-electric wall, mw-magnetic wall,

| V-H Walls | Mode |
|---|---|
| ew-ew | $as_b^m$ |
| mw-ew | $ss_b^m$ |
| mw-mw | $sa_b^m$ |
| ew-mw | $aa_b^m$ |

Unlike its slab counterpart, pure TM modes are not supported by a metal film of finite width: all six field components are present in all modes, For a symmetric structure having an aspect ratio w/t>1, the Ey field component dominates, The $E_x$ field component increases in magnitude with increasing film thickness and if w/t≤1, then $E_x$ dominates. It is proposed to identify the modes supported by a metal film of finite width, by extending the nomenclature used for metal film slab waveguides. First a pair of letters being a or s identify whether the main transverse electric field component is asymmetric or symmetric with respect to the y and x axes, respectively (in most practical structures w/t>>1 and $E_y$ is the main transverse electric field component). A superscript is then used to track the number of extrema observed in the spatial distribution of this field component along the largest dimension (usually along the x axis) between the corners. A second superscript n could be added to track the extrema along the other dimension (the y axis) if modes exhibiting them are found. Finally, a subscript b or l is used to identify whether the mode is bound or leaky. Leaky modes are known to exist in metal film slab strictures and though a search for them has not been made at this time, their existence is anticipated. Table 1 relates the proposed mode nomenclature to the corresponding vertical and horizontal wall combinations used along the axes of symmetry.

The $ss_b^0$, $sa_b^0$, $as_b^0$ and $aa_b^0$ modes are the first modes generated (one for each of the four possible quarter-symmetries listed in Table 1, and having the largest phase constant) and thus may be considered as the fundamental modes supported by the structure. FIGS. 3 to 6 show the field distributions of these modes over the cross-section of the waveguide for a metal film of thickness t=100 nm. As is observed from these figures, the main transverse electric field component is the $E_y$ component and the symmetries in the spatial distribution of this component are reflected in the mode nomenclature. The outline of the metal is clearly seen in the distribution of the $E_y$ component on all of these plots. As is observed from the figures, very little field tunnels through the metal to couple parallel edges for this case of film thickness and width (very little coupling through the metal between the top and bottom edges and between the left and right edges), though coupling does occur along all edges between adjacent corners (mostly along the left and right ones), and also between perpendicular edges through the corner.

FIGS. 2(a) and 2(b) suggests that the dispersion curves for these first four modes converge with increasing film thickness toward the propagation constant of a plasmon-polariton mode supported by an isolated corner (though pairs of corners in this case remain weakly coupled along the top and bottom edges due to the finite width of the film, even if its thickness goes to infinity). If both the film thickness and width were to increase further, the four fundamental modes would approach degeneracy with their propagation constant tending towards that of a plasmon-polariton mode supported by an isolated corners and their mode fields becoming more localized near the corners of the structure with maxima occurring at all four corners and fields decaying in an exponential-like manner in all directions away from the corners. This is further supported by considering the evolution of the field distributions given in FIGS. 3 to 6 as both the thickness and width increase.

As the thickness of the film decreases, coupling between the top and bottom edges increases and the four modes split into a pair as the upper branch (modes $sa_b^0$ and $aa_b^0$ which have a dominant $E_y$ field component exhibiting asymmetry with respect to the x axis) and a pair as the lower branch (modes $ss^0$ anid $as_b^0$ which have a dominant $E_y$ field component exhibiting symmetry with respect to the x axis), as shown in FIGS. 2(a) and 2(b). The pair on the upper branch remain approximately degenerate for all film thicknesses, though decreasing the film width would eventually break this degeneracy. The upper branch modes do not change in character as the film thickness decreases. Their field distributions remain essentially unchanged from those shown in FIGS. 4 and 6 with the exception that confinement to the metal region is increased thus causing an increase in their attenuation constant. This field behaviour is consistent with that of the $a_b$ mode supported by a metal film slab waveguide.

The modes on the lower branch begin to split at a film thickness of about 80 nm, as shown in FIGS. 2(a) and 2(b). As the film thickness decreases further the $ss_b^0$ mode follows closely the phase and attenuation curves of the $s_b$ mode supported by the metal film slab waveguide. In addition to exhibiting dispersion, the lower branch modes change in character with decreasing thickness, their fields evolving from being concentrated near the corners, to having Gaussian-like distributions along the waveguide width. The $E_y$ field component of the $ss_b^0$ mode develops an extremum near the center of the top and bottom interfaces, while that of the $as_b^0$ mode develops two extrema, one on either side of the center. Since these modes change in character, they should be identified when the film is fairly thick.

Figure 8:
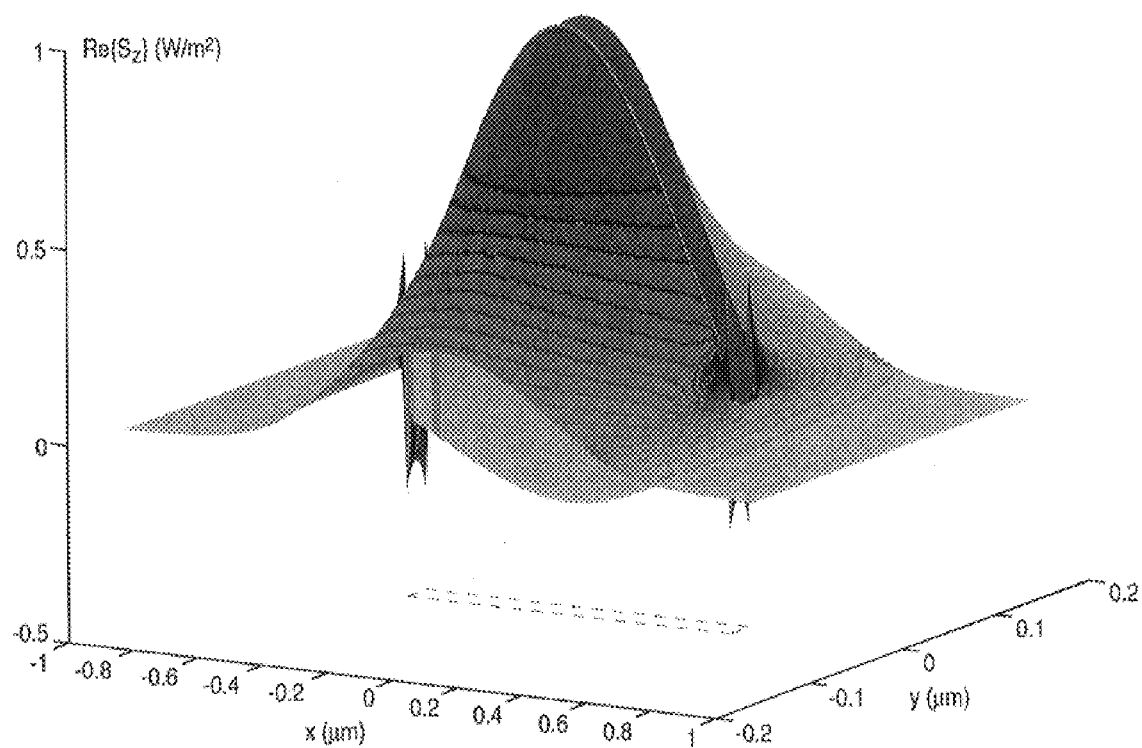
FIG. 8 illustrates a normalized profile of Re{$S_z$} associated with the $ss_b^0$ mode for a symmetric metal film waveguide of width w=1 μm and thickness t=20 nm. The waveguide cross-section is located in the x-y plane and the metal film is bounded by the region −0.5≦x≦0.5 μm and −0.01≦y≦0.01 μm, outlined as the rectangular dashed contour.
Figure 9A:
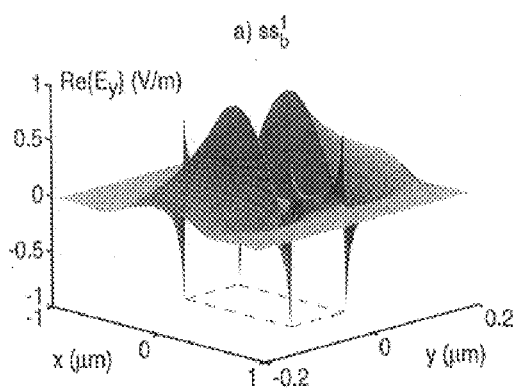
FIGS. 9(a),(b),(c) and (d) illustrate the spatial distribution of the $E_y$ field component related to some higher order modes supported by a symmetric metal film waveguide of thickness t=100 nm and width w=1 μm. In all cases, the waveguide cross-section is located in the x-y plane and the metal film is bounded by the region −0.5≦x≦0.5 μm and −0.05≦y≦0.05 μm, outlined as the rectangular dashed contour.
Figure 9B:
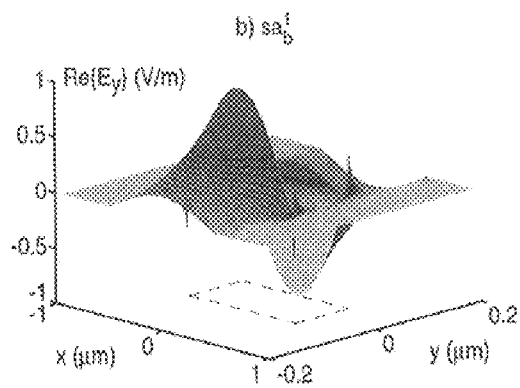
Figure 9C:
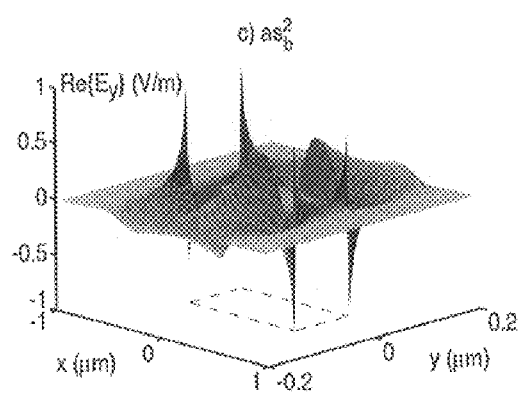
Figure 9D:
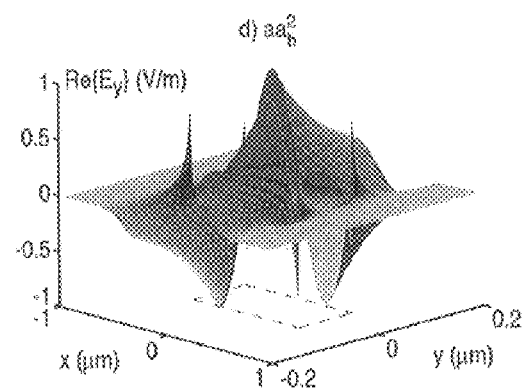

FIGS. 7(a) to 7(f) show the evolution of the $ss_b^0$ mode fields with film thickness via contour plots of $Re\{S_z\}$. $S_x$ is computed from the $ss_b^0$ mode fields using Equation 13 and corresponds to the complex power density carried by the mode. The power confinement factor cf is also given in the figure for all cases, and is computed via equation (12) with the area of the waveguide core $A_c$ taken as the area of the metal region. FIGS. 7(a) to 7(f) clearly show how the mode fields evolve from being confined to the corners of thick films to being distributed in a Gaussian-like manner laterally along the top and bottom edges, as the field coupling between these edges increases due to a reduction in film thickness. The confinement factor becomes smaller as the film thickness decreases, ranging from 14% confinement to 1.6% as the thickness goes from 80 nm to 20 nm. This implies that fields become less confined to the metal, spreading out not only along the vertical dimension but along the horizontal one as well, as is observed by comparing FIGS. 7(a) and 7(b). This reduction in confinement to the lossy metal region explains the reduction in the attenuation constant of the mode with decreasing film thickness, as shown in FIG. 2(b). An examination of all field components related to the $ss_b^0$ mode reveals that the magnitudes of the weak transverse ($E_x$, $H_y$) and longitudinal ($E_z$, $H_z$) components decrease with decreasing film thickness, implying that the mode is evolving towards a TEM mode comprised of the $E_y$ and $H_x$ field components. Indeed, the normalized propagation constant of the $ss_b^0$ mode tends asymptotically towards the value of the normalized propagation constant of a TEM wave propagating in the background material ($\epsilon_{r,1}=4$ with no losses in this case), further supporting this fact. This field behaviour is also consistent with that of the $s_b$ mode supported by a metal film slab waveguide, FIG. 8 shows the profile of $Re\{S_x\}$ of the $ss_b^0$ mode over the cross-section of the guide for the case t=20 nm, providing a different perspective of the same information plotted as contours in FIG. 7(f). FIG. 8 shows that $Re\{S_z\}$ is negative in the metal film, implying that the mode real power is flowing in the direction opposite to the direction of mode propagation (or to the direction of phase velocity) in this region. It is clear however that the overall or net mode real power is flowing along the direction of propagation. It is possible that the net mode real power can be made to flow in the direction opposite to that of phase velocity (as in metal film slab waveguides [10]) for values of $\epsilon_{r,1}$ in the neighbourhood or greater than $|Re\{\epsilon_{r,2}\}|$.

Unlike the metal film slab waveguide, a metal film of finite width can support a number of higher order modes. The dispersion curves of the first four higher order modes (each generated from one of the symmetries listed in Table 1 are shown in FIGS. 2(a) and 2(b), and the spatial distribution of their main transverse electric field component is shown in FIG. 9 for a film of thickness t=100 nm. As is observed from FIGS. 9(a) to 9(d), the symmetries and number of extrema in the distributions of $Re\{E_y\}$ are reflected in the mode nomenclature. It should be noted that the nature of the nomenclature is such that all higher order modes $sa_b^m$ and $ss_b^m$ have an odd m while all higher order modes $aa_b^m$ and $as_b^m$ have an even m. Comparing FIGS. 9(a) to 9(d) with FIGS. 3(c), 4(c), 5(c) and 6(c), respectively, (ie: comparing the $E_y$ component of the $ss_b^1$ mode shown in FIG. 9(a) with the $E_y$ component of the $ss_b^0$ mode shown in FIG. 3(c), etc . . . ) reveals that the fields of a higher order mode are comprised of the fields of the corresponding m=0 mode with additional spatial oscillations or variations along the top and bottom edges of the structure due to the latter's limited width. Making this comparison for all of the field components of the higher order modes found reveals this fact to be true, except for the $H_y$ field component which remains in all cases essentially identical to that of the corresponding m=0 mode; ie: the $H_y$ field component never exhibits oscillations along the width of the structure.

The evolution of the $sa_b^1$ and $aa_b^2$ modes with film thickness is similar to the evolution of the $sa_b^0$ and $aa_b^0$ modes (and the $a_b$ mode supported by the metal film slab waveguide), in that their mode fields become more tightly confined to the metal as the thickness of the latter decreases, thereby causing an increase in the attenuation of the modes, as shown in FIG. 2(b). Furthermore, the $sa_b^1$ and $aa_b^2$ modes do not change in character with film thickness, their field distributions remaining essentially unchanged in appearance from those computed at a thickness of 100 nm.

The $ss_b^1$ and $as_b^2$ modes evolve with thickness in a manner similar to the corresponding m=0 modes (and the $s_b$ mode of the metal film slab waveguide) in the sense that their fields become less confined to the metal region as the thickness of the latter decreases, thereby reducing the attenuation of the modes as shown in FIG. 2(b). As the thickness of the film decreases, the $ss_b^1$ and $as_b^2$ modes change in character in a manner similar to the corresponding m=0 modes, their field components evolving extra variations along the top and bottom edges.

As the thickness of the film increases, the propagation constants of the $sa_b^1$ and $ss_b^1$ modes converge to a single complex value as shown in FIGS. 2(a) and 2(b). This is the propagation constant of uncoupled higher order modes supported by the top and bottom edges of the film. A similar observation holds for the $aa_b^2$ and $as_b^2$ modes. The nature of these 'edge modes' is clear by considering the evolution with increasing film thickness of the distributions shown in FIGS. 9(a) to 9(d). As the thickness of the film tends to infinity, the top edge becomes uncoupled from the bottom edge, forcing the $ss_b^1$ mode to become degenerate with the $sa_b^1$ mode since both have an $E_y$ field component that is symmetric with respect to the y axis and one extremum in its distribution along the top or bottom edge. A similar reasoning explains why the $as_b^2$ mode must become degenerate with the $ss_b^2$ mode. In general, it is expected that the higher order $sa_b^m$ and $ss_b^m$ mode families will form degenerate pairs for a given m, as will the higher order $as_b^m$ and $aa_b^m$ mode families, with increasing film thickness.

The $aa_b{}^m$ and $sa_b{}^m$ mode families do not have mode cutoff thicknesses. This is due to the fact that their confinement to the metal film increases with decreasing film thickness; thus the modes remain guided as t→0. The $as_b{}^m$ and $ss_b{}^m$ mode families have cutoff thicknesses for all modes except the $ss_b{}^m$ mode, which remains guided as t→0, since it evolves into the TEM mode supported by the background. The other modes of these families, including the $as_b{}^0$ mode cannot propagate as t→0 because their mode fields do not evolve into a TEM mode, Rather, the modes maintain extrema in their field distributions and such variations cannot be enforced by an infinite homogeneous medium.

In general, the purely bound modes supported by a metal film of finite width appear to be formed from a coupling of modes supported by each metal-dielectric interface defining the structure. In a metal film of finite width, straight interfaces of finite length (top, bottom, left and right edges) and corner interfaces are present. Since a straight metal-dielectric interface of infinite length can support a bound plasmon-polariton mode then so should an isolated corner interface and a straight interface of finite length bounded by corners (say the edge defined by a metal of finite width having an infinite thickness). A preliminary analysis of an isolated corner has revealed that a plasmon-polariton mode is indeed supported and that the phase and attenuation constants of this mode are greater than those of the mode guided by the corresponding infinite straight interface, as given by Equations (14) and (15). This is due to the fact that fields penetrate more deeply into the metal near the corner, to couple neighbouring perpendicular edges. All six field components are present in such a mode, having their maximum value at the corner and decreasing in an exponential-like manner in all directions away from the corner. A straight interface of finite length bounded by corners should support a discrete spectrum of plasmon-polariton modes with the defining feature in the mode fields being the number of extrema in their spatial distribution along the edge. A mode supported by a metal film of finite width may therefore be seen as being comprised of coupled 'corner modes' and 'finite length edge modes'.

The $ss_b{}^0$ mode could be used for optical signal transmission over short distances. Its losses decrease with decreasing film thickness in a manner similar to the $s_b$ mode supported by the metal film slab waveguide. In a symmetric waveguide structure such as the one studied here, the $ss_b{}^0$ mode does not have a cut-off thickness so losses could be made small enough to render it long-ranging, though a trade-off against confinement is necessary. In addition, when the metal is thin, the $E_y$ field component of the mode has a maximum near the center of the metal-dielectric interfaces, with a symmetric profile similar to that shown in FIG. 8. This suggests that the mode should be excitable using a simple end-fire technique similar to the one employed to excite surface plasmon-polariton modes [19,6]; this technique is based on maximizing the overlap between the incident field and that of the mode to be excited.

In reference [22], the present inventor et al. disclosed that plasmon-polariton waves supported by thin metal films of finite width have recently been observed experimentally at optical communications wavelengths using this method of excitation.

IV. Mode Dispersion with Film Width: Symmetric Structures

Since the modes supported by a metal film waveguide exhibit dispersion with film thickness, it is expected that they also exhibit dispersion with film width, A. Modes Supported by a Metal Film of Width w=0.5 μm The analysis of a metal film waveguide of width w=0.5 βm will now be discussed, using the material parameters and free-space wavelength that were used in the previous section. A film width of 0.5 μm was selected in order to determine the impact of a narrowing film on the modes supported and to demonstrate that the structure can still function as a waveguide though the free-space optical wavelength is greater than both the width and thickness of the film.

As in the previous section, the first eight modes supported by the structure (two for each symmetry listed in Table 1) were sought, but in this case only six modes were found. The dispersion curves with thickness of the modes found are plotted in FIGS. 10(a) and 10(b). The observations made in the previous section regarding the general behaviour of the modes hold for other film widths, including this one.

The $aa_b{}^2$ and $as_b{}^2$ modes, which were the highest order modes found for a film of width w=1 μm, were not found in this case suggesting that the higher order modes (m>0) in general have a cut-off width. Comparing FIG. 10(a) with FIG. 2(a), it is apparent that decreasing the film width causes a decrease in the phase constant of the $ss_b{}^1$ and $sa_b{}^1$ modes, further supporting the existence of a cut-off width for these modes.

Figure 10A:
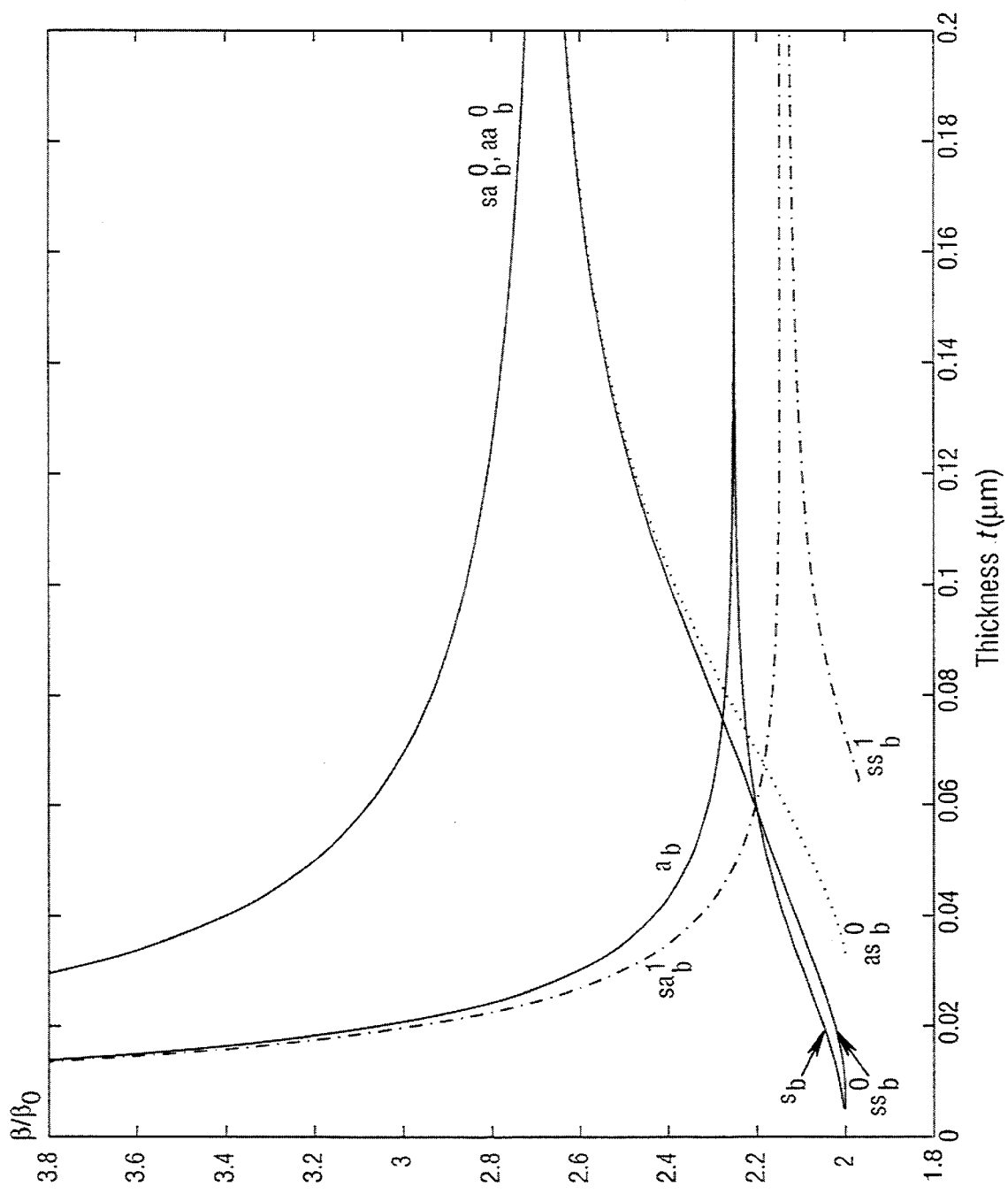
FIGS. 10(a) and (b) illustrate dispersion characteristics with thickness of the first six modes supported by a symmetric metal film waveguide of width w=0.5 μm. The $a_b$ and $s_b$ modes supported for the case w=∞ are shown for comparison. (a) Normalized phase constant; (b) Normalized attenuation constant.
Figure 10:
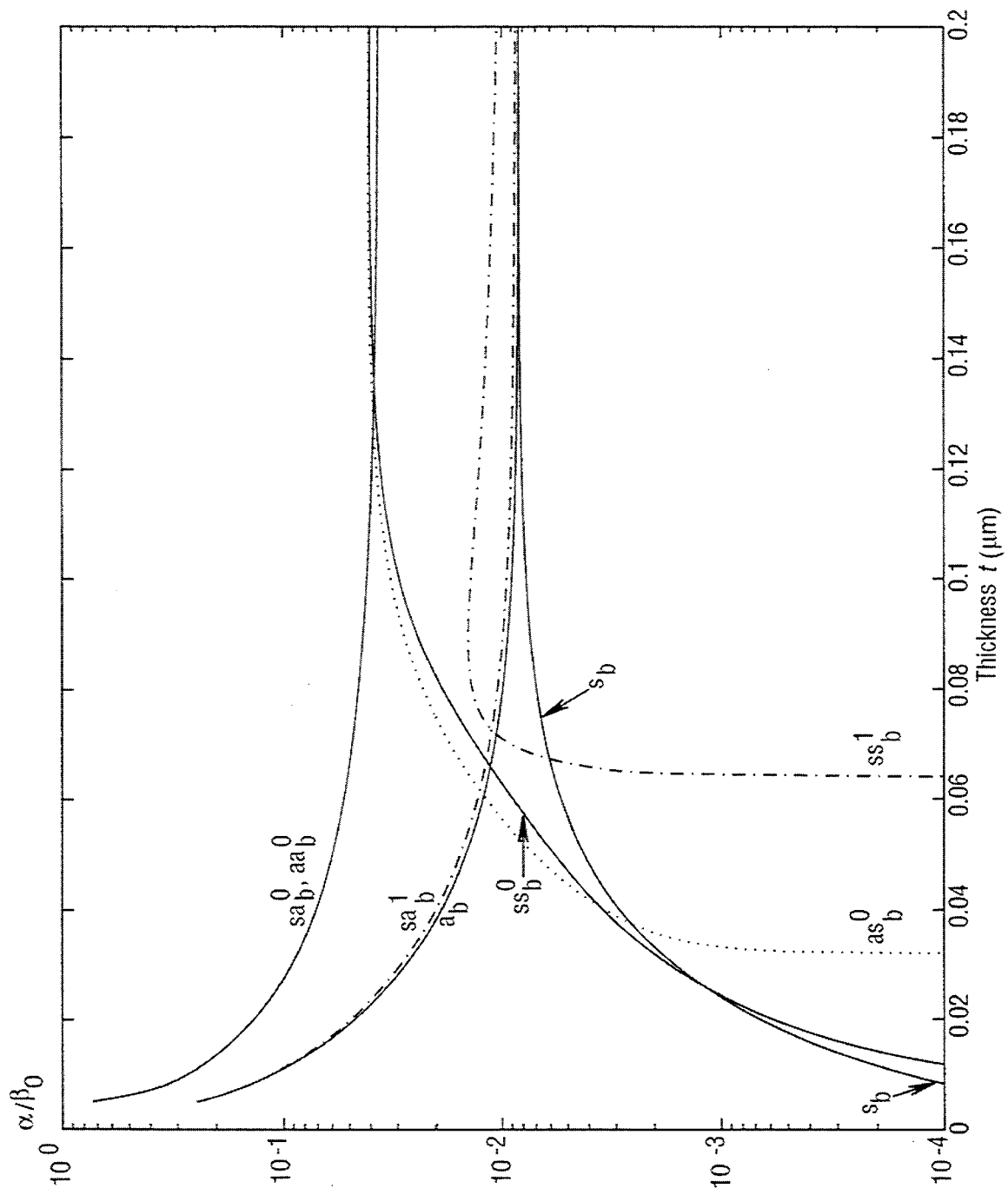
Figure 11:
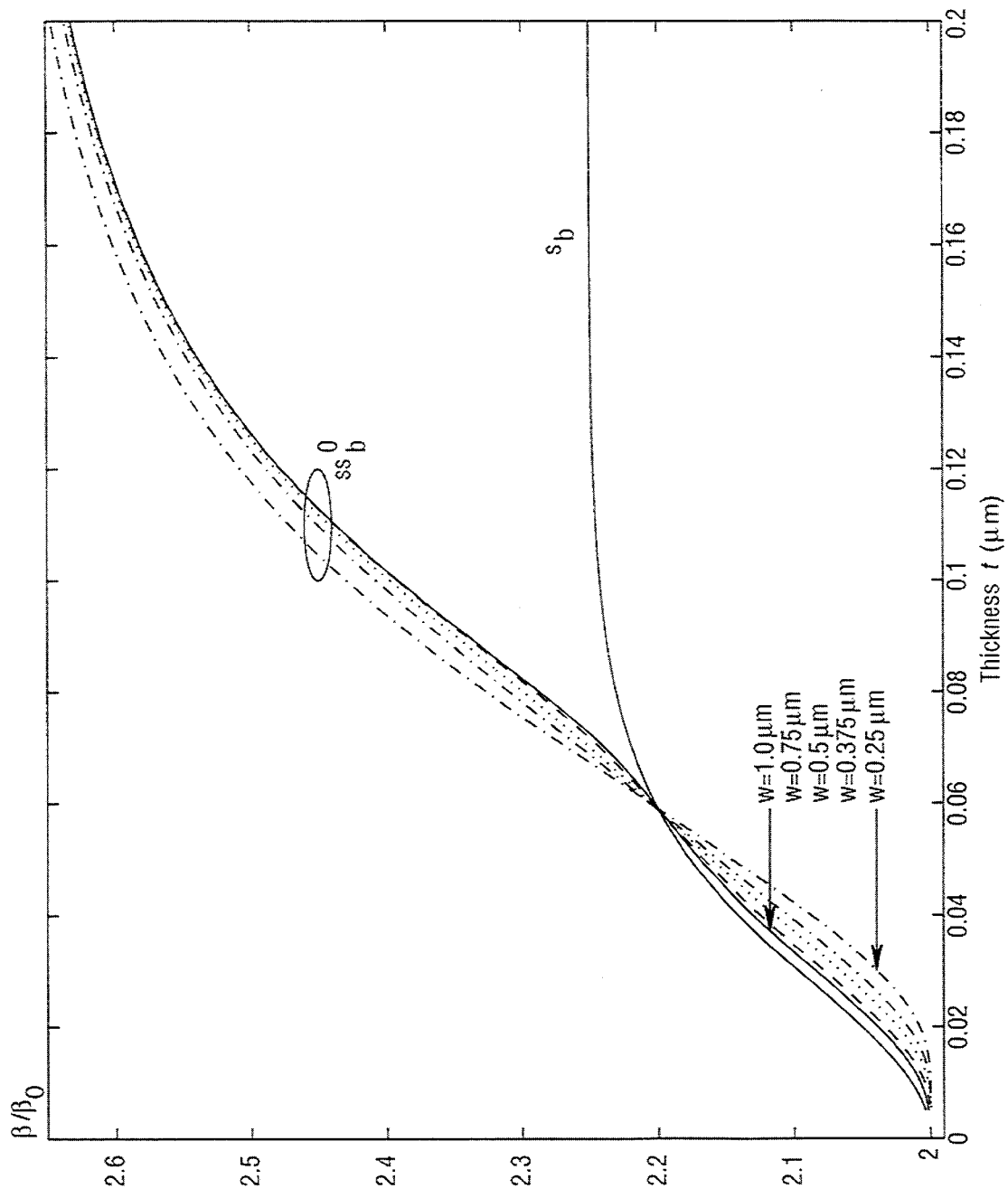
FIGS. 11(a) and (b) illustrate dispersion characteristics with thickness of the $ss_b^0$ mode supported by symmetric metal film waveguides of various widths. The $s_b$ mode supported for the case w=∞ is shown for comparison. (a) Normalized phase constant; (b) Normalized attenuation constant.
Figure 11:
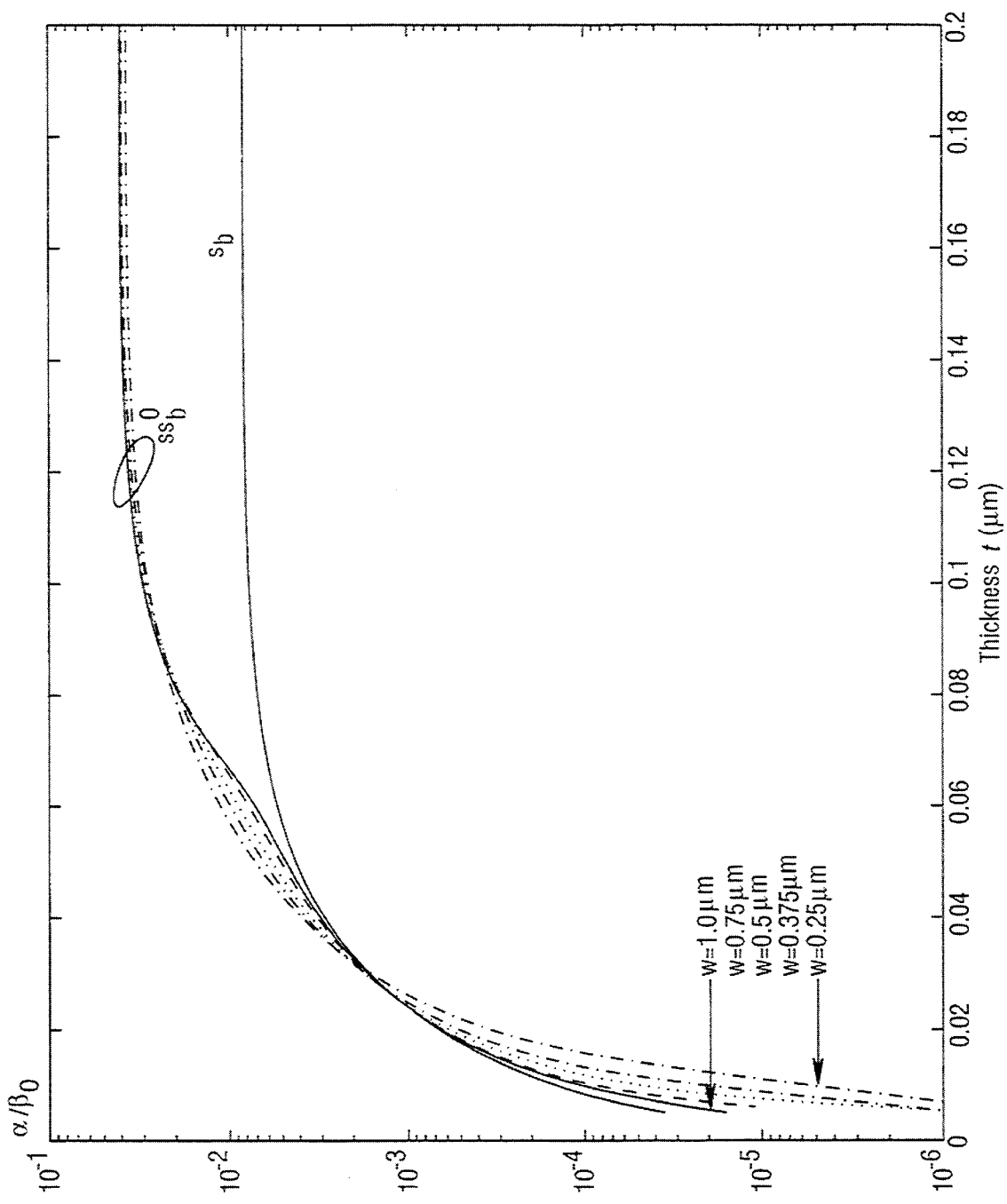

Comparing FIGS. 10(a) and 10(b) with FIGS. 2(a) and 2(b), it is noted that the modes which do exhibit cutoff thicknesses (the $ss_b{}^m$ modes with m>0 and the $as_b{}^m$ modes with m≧0), exhibit them at a larger thickness for a narrower film width. This makes it possible to design a waveguide supporting only one long-ranging mode (the $ss_b{}^0$ mode) by carefully selecting the film width and thickness.

B. Dispersion of the $ss_b{}^0$ Mode with Film Width

The dispersion with thickness of the $ss_b{}^0$ mode is shown in FIGS. 11(a) and 11(b) for numerous film widths in the range 0.25≦w≦1 μm, illustrating the amount of dispersion in the mode properties that can be expected due to a varying film width. In all cases, the $ss_b{}^0$ mode evolves with decreasing film thickness into the TEM wave supported by the background, but this evolution occurs more rapidly for a narrower width. For a film of thickness t=20 nm, for example, from FIG. 11(a), the normalized phase constant of the mode supported by a film of width w=1 μm is about 2.05, while that of the mode supported by a film of width w=0.25 μm is already about 2. This fact is also supported by the results plotted in FIG. 11(b) since the attenuation constant of the mode at a thickness of t=20 nm is closer to zero (the attenuation constant of the background) for narrow film widths compared to wider ones. Indeed, at a thickness of 10 nm, the attenuation of the mode for a width of w=0.25 μm is more than an order of magnitude less than its attenuation at a width of w=1 μm (and more than an order of magnitude less than that of the $s_b$ mode supported by a metal film slab waveguide), indicating that this mode can be made even more long-ranging by reducing both the film thickness and its width.

The dispersion of the mode with increasing film thickness also changes as a function of film width, as seen from FIG. 11(a). This is due to the fact that the amount of coupling between corners along the top and bottom edges increases as the film narrows, implying that the mode does not evolve with increasing thickness towards a plasmon-polariton mode supported by an isolated corner, but rather towards a plasmon-polariton mode supported by the pair of corners coupled via these edges.

FIGS. 12(a) to 12(d) show contour plots of Re{$S_z$} related to the $ss_b{}^0$ mode supported by films of thickness t=20 nm and various widths, The power confinement factor is also given for all cases, with the area of the waveguide core $A_c$ taken as the area of the metal region. FIGS. 12(a) to 12(d) clearly illustrate how the fields become less confined to the lossy metal as its width decreases, explaining the reduction in attenuation shown in FIG. 11(b) at this thickness. In addition, the confinement factor ranges from 1.64% to 0.707% for the widths considered, further corroborating this fact, The fields are also seen to spread out farther, not only along the horizontal dimension but along the vertical one as well, as the film narrows. This indicates that the mode supported by a narrow film is farther along in its evolution into the TEM mode supported by the background, compared to a wider film of the same thickness, It is also clear from FIGS. 12(a) to 12(d) that the trade-off between mode confinement and attenuation must be made by considering not only the film thickness but its width as well.

V. Effects Caused by Varying the Background Permittivity: Symmetric Structures

In this section, the changes in the propagation characteristics of the $ss_b^0$ mode due to variations in the background permittivity of the waveguide. Only the $ss_b^0$ mode is considered since the main effects are in general applicable to all modes. In order to isolate the effects caused by varying the background permittivity, the width of the metal film was fixed to w=0.5 μm and its permittivity as well as the optical freespace wavelength of analysis were set to the values used in the previous sections. The relative permittivity of the background $\epsilon_{r,1}$ was taken as the variable parameter.

Figure 13:
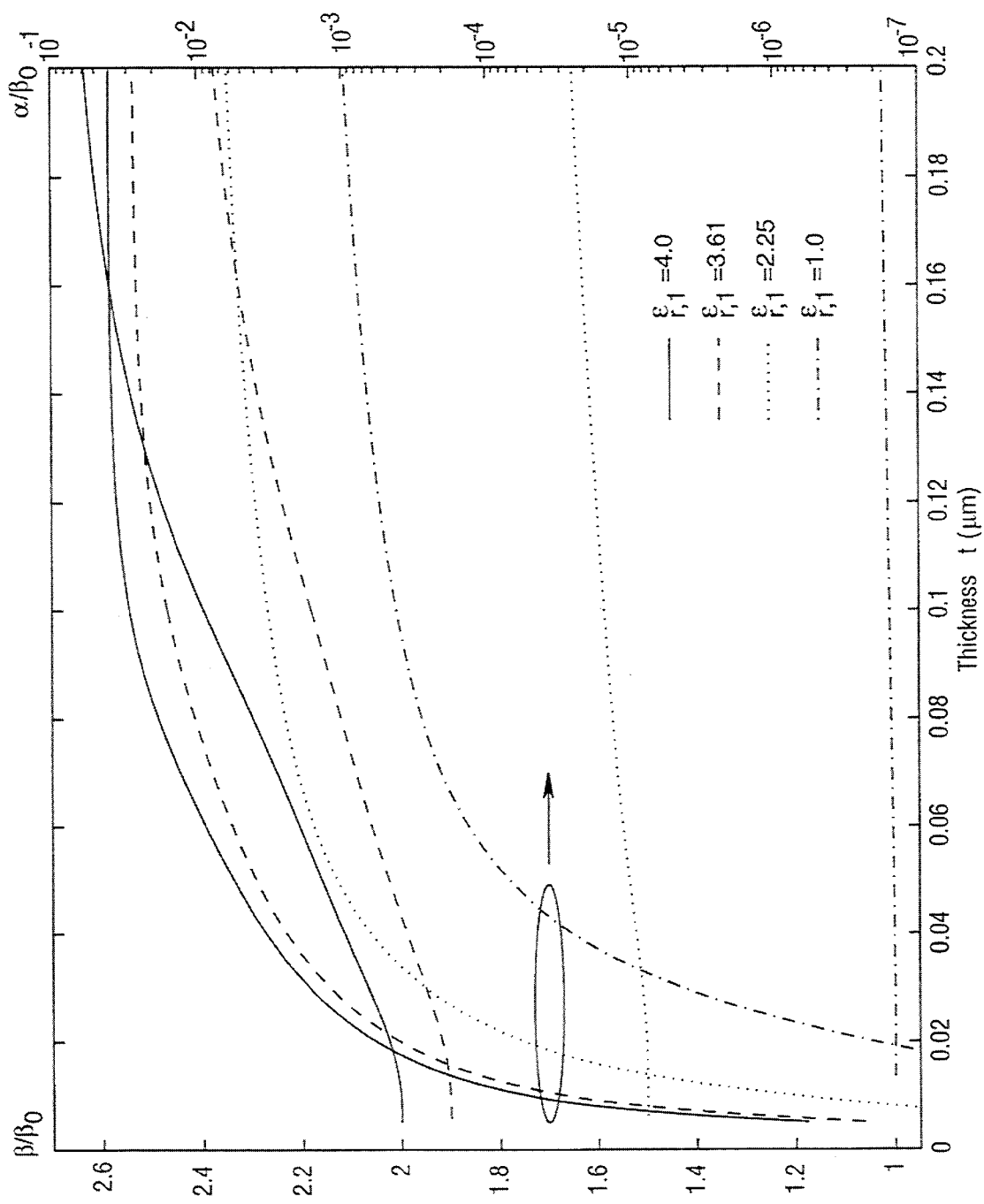
FIG. 13 illustrates dispersion characteristics with thickness of the $ss^0$ mode supported by a symmetric metal film waveguide of width w=0.5 μm for various background permittivities $\in_{r,1}$. The normalized phase constant is plotted on the left axis and the normalized attenuation constant is plotted on the right one.

The dispersion with thickness of the $ss_b^0$ mode is shown in FIG. 13 for some background permittivities in the range $1 \leq \epsilon_{r,1} \leq 4$. FIGS. 14(a) to 14(d) compare contour plots of Re{$S_z$} related to this mode for a film of thickness t=20 nm and for the same set of background permittivities used to generate the curves plotted in FIG. 13. From FIGS. 14(a) to 14(d), it is observed that reducing the value of the background permittivity causes a reduction in field confinement to the metal. This reduction in field confinement within the lossy metal in turn causes a reduction in the attenuation of the mode that can be quite significant, FIG. 13 showing a reduction of almost four orders of magnitude at a film thickness of t=20 nm, as the background relative permittivity ranges from $\epsilon_{r,1}$=4 to 1. It is also noted that the mode exhibits less dispersion with thickness as the background relative permittivity is reduced, since the normalized phase constant curves shown in FIG. 13 flatten out with a reduction in the value of this parameter.

From FIGS. 14(a) to 14(d), it is seen that the mode power is confined to within approximately one free-space wavelength in all directions away from the film in all cases except that shown in FIG. 14(d), where fields are significant up to about two free-space wavelengths. In FIG. 14(c), the background permittivity is roughly that of glass and from FIG. 13 the corresponding normalized attenuation constant of the mode is about $\alpha/\beta_0 = 6.0 \times 10^{-5}$. The associated mode power attenuation in dB/mm, computed using the following formula:

$$Att = \alpha \times \frac{20}{1000} \log_{10}(e) \quad (16)$$

is about 5 dB/mm. This value of attenuation is low enough and field confinement is high enough as shown in FIG. 14(c), to render this particular structure practical at this free-space wavelength for applications requiring short propagation lengths.

The changes in mode properties caused by varying the background permittivity as discussed above are consistent with the changes observed for the modes supported by a metal film slab waveguide and the observations are in general applicable to the other modes supported by a metal film of finite width. In the case of the higher order modes (m>0) and those exhibiting a cutoff thickness (the $as_b^m$ modes for all m and the $ss_b^m$ modes for m>0) additional changes in the mode properties occur. In particular, as the background permittivity is reduced, the cut-off widths of the higher order modes increase as do all relevant cut-off thicknesses.

VI. Frequency Dependency of the $ss_b^0$ Mode Solutions: Symmetric Structures

In order to isolate the frequency dependency of the $ss_b^0$ mode solutions, the geometry of the metal film was held constant and the background relative permittivity was set to $\epsilon_{r,1}$=4. The relative permittivity of the metal film $\epsilon_{r,2}$ was assumed to vary with the frequency of excitation according to Equation (1). In order to remain consistent with [6], the values $\omega_P = 1.29 \times 10^{16}$ rad/s and $1/\nu = \tau = 1.25 \times 10^{-14}$s were adopted, though the latter do not generate exactly $\epsilon_{r,2}$=−19−j0.53 at $\lambda_0$=0.633 μm, which is the value used in the previous sections. This is due to the fact that values of $\omega_P$ and τ are often deduced by fitting Equation (1) to measurements. The values used, however, are in good agreement with recent measurements made for silver [3] and are expected to generate frequency dependent results that are realistic and experimentally verifiable.

The dispersion characteristics of the $ss_b^0$ mode supported by films of width w=0.5 μm and w=1 μm, and thicknesses in the range $10 \leq t \leq 50$ nm are shown in FIGS. 15(a) and 15(b) for frequencies covering the free-space wavelength range $0.5 \leq \lambda_0 \leq 2$ μm. Curves for the $s_b$ mode supported by metal film slab waveguides (w=∞) of the same thicknesses are also shown for comparison, The results given in FIG. 15(a) show that, in all cases, the normalized phase constant of the modes tends asymptotically towards that of the TEM wave supported by the background as the wavelength increases, and that the convergence to this value is steeper as the width of the film decreases (for a given thickness). The curves remain essentially unchanged in character as the thickness changes, but they shift upwards toward the top left of the graph with increasing thickness, as shown. Convergence to the asymptote value with increasing wavelength suggests that the $ss_b^0$ mode evolves into the TEM mode supported by the background. It is noteworthy that the $ss_b^0$ mode can exhibit very little dispersion over a wide bandwidth, depending on the thickness and width of the film, though flat dispersion is also associated with low field confinement to the metal film.

The results plotted in FIG. 15(b) show in all cases a decreasing attenuation with increasing wavelength and the curves show a sharper drop for a narrow film (w=0.5 μm) compared to a wide one (w=∞). The attenuation curves look essentially the same for all of the film thicknesses considered, though the range of attenuation values shifts downwards on the graph with decreasing film thickness.

Figure 15:
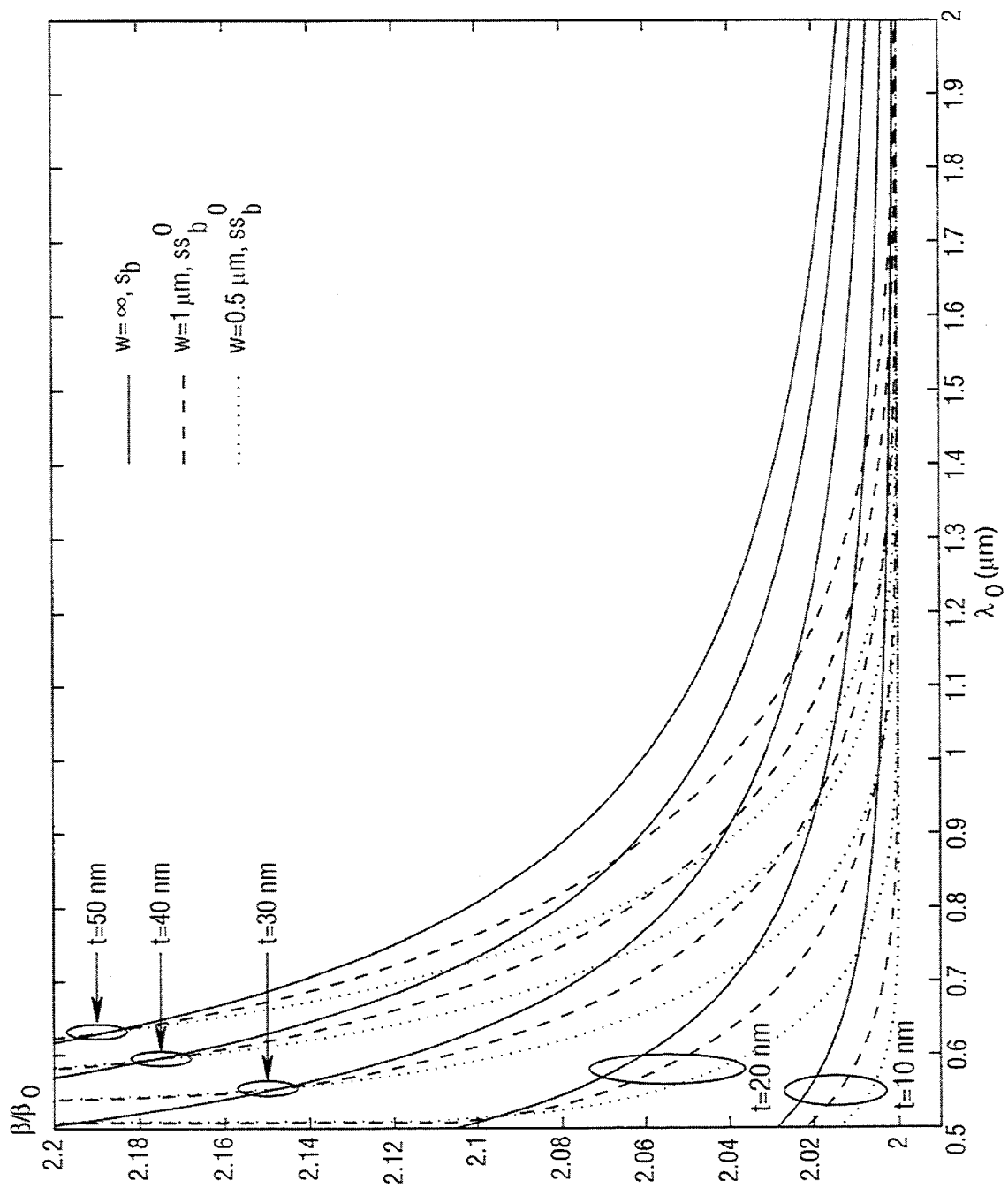
FIGS. 15(a) and (b) illustrate dispersion characteristics with frequency of the $ss_b^0$ mode supported by symmetric metal film waveguides of width w=0.5 μm and w=1 μm and various thicknesses t. The $s_b$ mode supported for the case w=∞ and the thicknesses considered is shown for comparison. (a) Normalized phase constant. (b) Mode power attenuation computed using Equation (16) and scaled to dB/cm.
Figure 15:
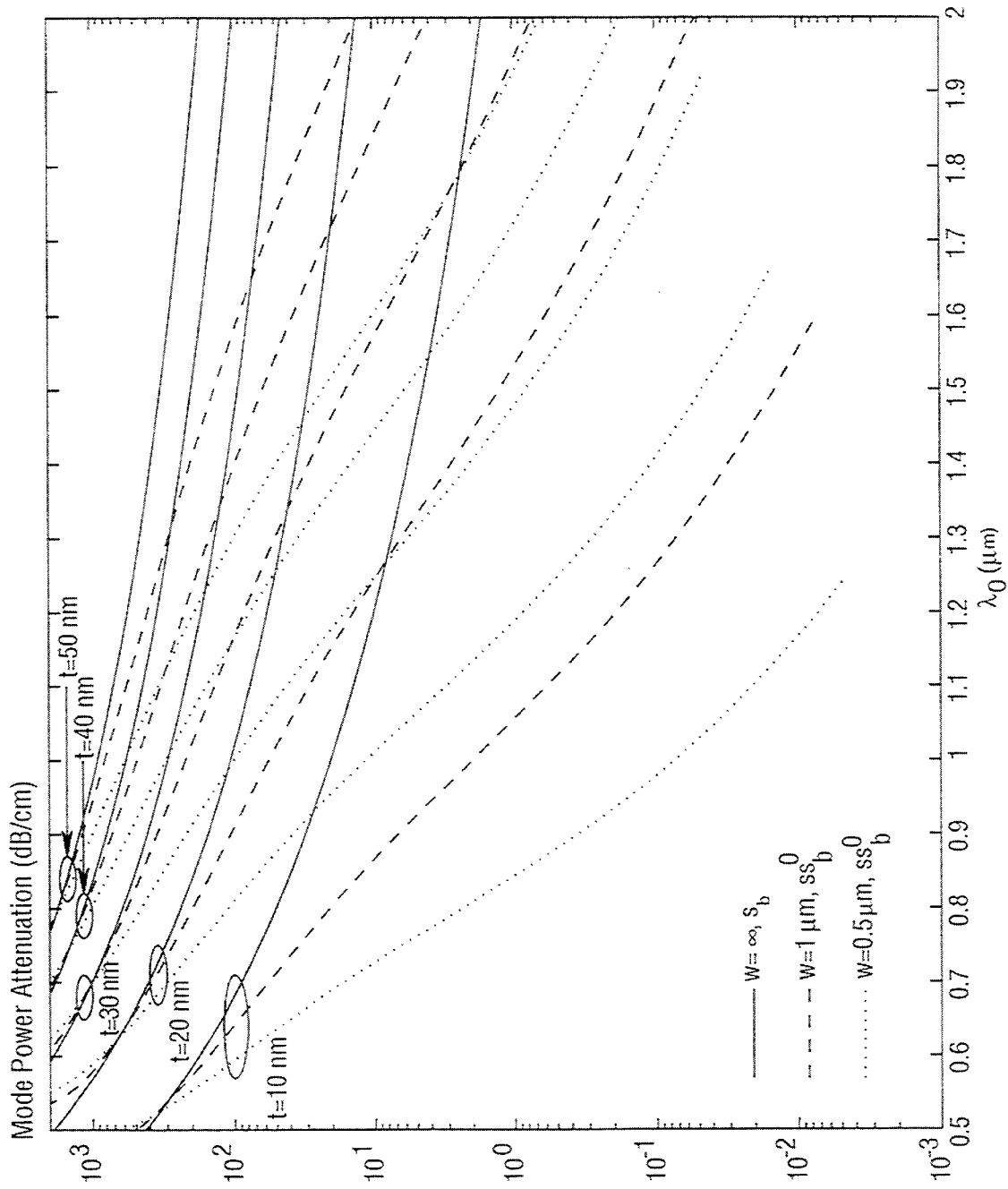
Figure 16B:
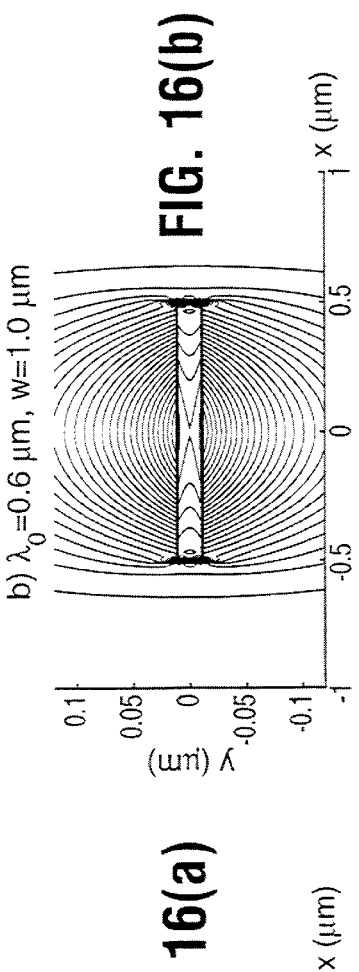
FIGS. 16(a),(b),(c),(d),(e) and (f) illustrate a contour plot of Re{$S_z$} associated with the $ss_b^0$ mode for symmetric metal film waveguides of width w=0.5 μm and w=1 μm, and thickness t=20 nm at various free-space wavelengths of excitation $λ_0$. In all cases, the outline of the metal film is shown as the rectangular dashed contour.
Figure 16D:
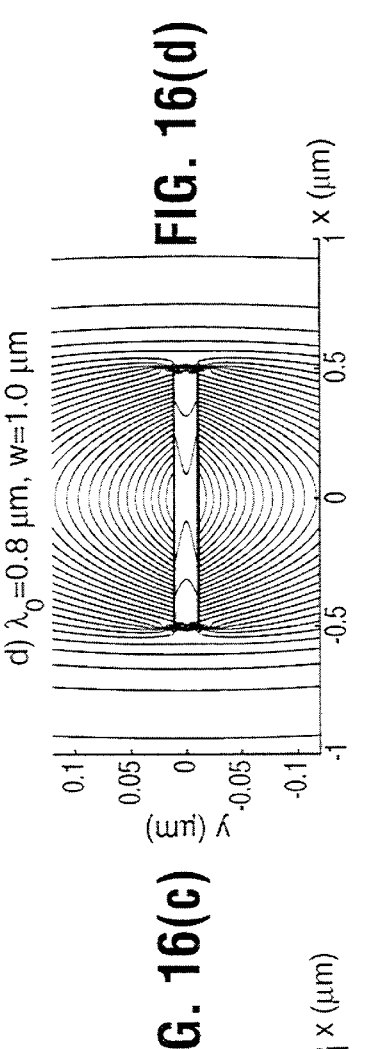
Figure 16F:
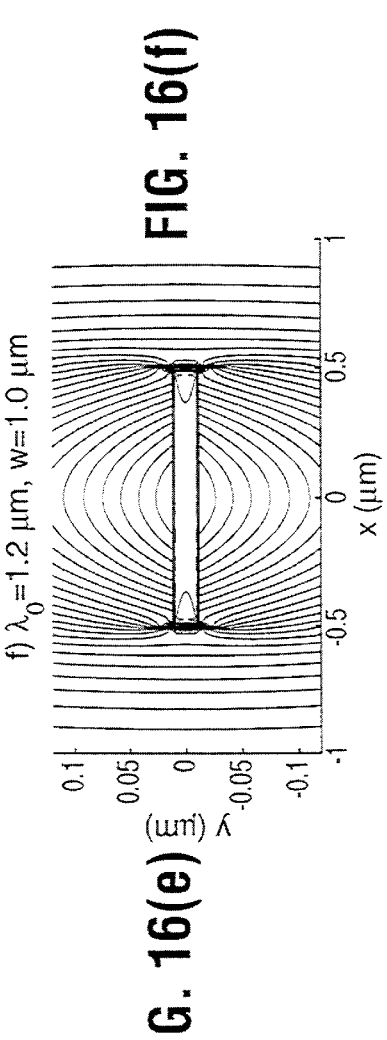
Figure 16A:
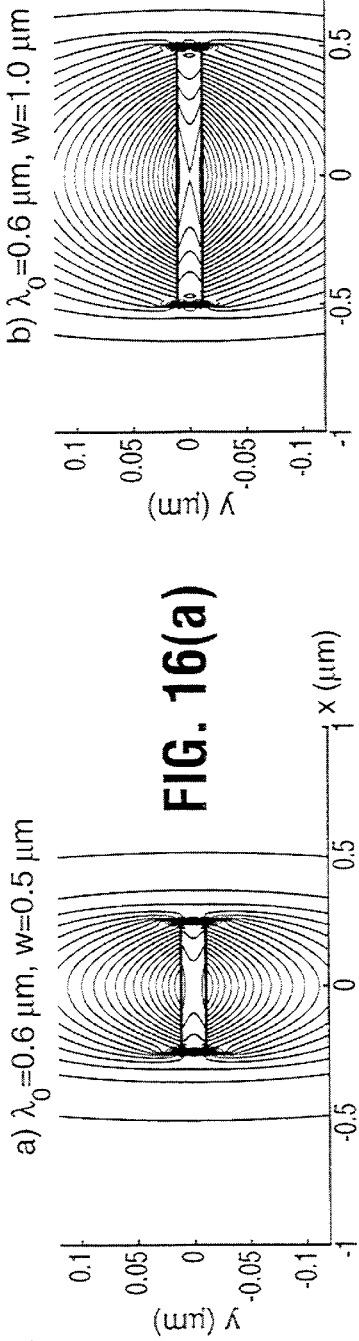
Figure 16C:
Figure 16E:
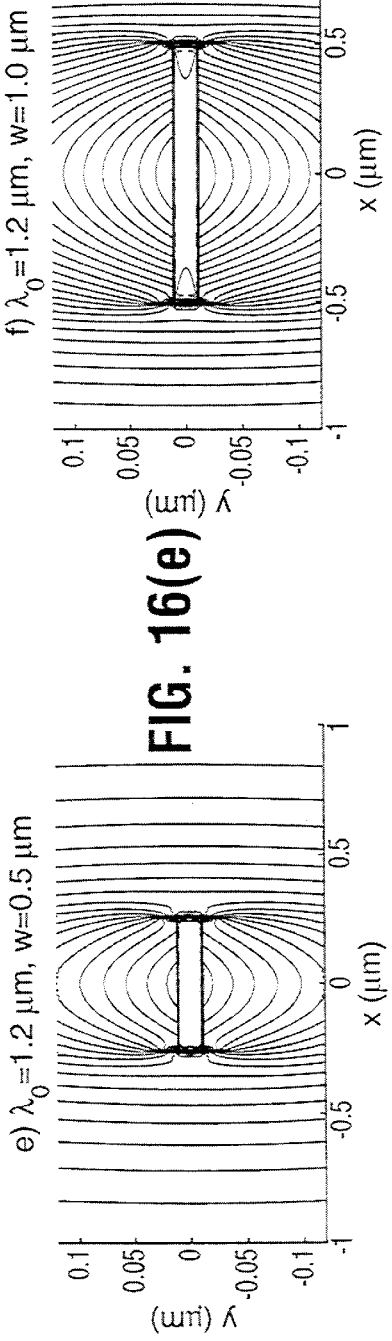

FIGS. 16(a) to 16(f) give contour plots of Re{$S_z$} related to the $ss_b^0$ mode for films of thickness t=20 nm and widths w=0.5 μm and w=1 μm, for three free-space wavelengths of operation: $\lambda_0$=0.6, 0.8 and 1.2 μm. Comparing the contours shown in FIGS. 16(a) to 16(f), explains in part the frequency dependent behaviour plotted in FIGS. 15(a) and 15(b). FIGS. 16(a) to 16(f) show that the mode power contours spread out farther from the film as the wavelength increases, which means that the mode confinement to the metal region decreases, explaining in part the decrease in losses and the evolution of the mode towards the TEM mode of the background, as shown in FIGS. 15(*a*) and 15(*b*). This behaviour is more pronounced for the waveguide of width w=0.5 μm compared to the wider one of width w=1.0 μm.

There are two mechanisms causing changes in the $ss_b^0$ mode as the frequency of operation varies. The first is geometrical dispersion, which changes the optical or apparent size of the film, and the second is material dispersion, which is modeled for the metal region using Equation (1). If no material dispersion is present, then the geometrical dispersion renders the film optically smaller as the free-space wavelength is increased (an effect similar to reducing t and w) so, in the case of the $ss_b^0$ mode, confinement to the film is reduced and the mode spreads. out in all directions away from the latter, Now based on Equation (1), it is clear that the magnitude of the relpart of the film's permittivity $|Re\{\epsilon_{r,2}\}|$ varies approximately in a $1/\omega^2$ or $\lambda_0^2$ fashion while the magnitude of its imaginary part $|Im\{\epsilon_{r,2}\}|$ varies approximately in a $1/\omega^3$ or $\lambda_0^3$ fashion. However, an increase in $|Re\{\epsilon_{r,2}\}|$ reduces the penetration depth of the mode fields into the metal reion and, combined with the geometrical dispersion, causes a net decrease in mode attenuation with increasing wavelength, even though the losses in the film increase in a $\lambda_0^3$ fashion.

FIG. 15(*b*) shows that mode power attenuation values in the range 10 to 0.1 dB/cm are possible near communications wavelengths ($\lambda_0$~1.5 μm) using structures of reasonable dimensions: w~1.0 μm and t~15 nm. Such values of attenuation are low enough to consider the $ss_b^0$ mode as being long-ranging, suggesting that these waveguides are practical for applications requiring propagation over short distances. As shown in the previous section, even lower attenuation values are possible if the background permittivity is lowered. From FIGS. 16(*e*) and 16(*f*), (case $\lambda_0$=1.2 μm, which is near communications wavelengths), it is apparent that the mode power confinement is within one free-space wavelength of the film, which should be tight enough to keep the mode bound to the structure if a reasonable quality metal film of the right geometry can be constructed.

VII. Mode Characteristics and Evolution with Film Thickness: Small Asymmetry

A. Mode Solutions for a Metal Film Slab Waveguide

Effects on waveguiding characteristics of using an asymmetric waveguide structure will now be discussed, beginning with the reproduction of results for an infinitely wide asymmetric metal film waveguide (similar to that shown in FIG. 17(*a*) but with w=∞), taken from the standard work on such structures [6]. In order to remain consistent with their results, the optical free-space wavelength of excitation is set to $\lambda_0$=0.633 μm and the value they used for the relative permittivity of the silver film at this wavelength is used here: $\epsilon_{r,2}$=−19−j0.53. The relative permittivities of the bottom and top dielectric regions are set to $\epsilon_{r,1}$=4 ($n_1$=2) and $\epsilon_{r,3}$=3.61 ($n_3$=1.9); these values create a structure having a small asymmetry with respect to the horizontal dimension.

The dispersion curves of the $s_b$ and $a_b$ modes supported by the infinitely wide structure were computed using the MoL and the results are shown in FIGS. 18(*a*) and 18(*b*). From these figures, it is seen that the propagation constant of the $a_b$ mode tends towards that of the plasmon-polariton mode supported by the bottom interface, given by Equations (14) and (15), as the thickness of the film increases. It is also noted that this mode does not exhibit a cutoff thickness, while it is clear that the $s_b$ mode has one near t=18 nm. The propagation constant of the $s_b$ mode is seen to tend towards the value of a plasmon-polariton mode supported by the top interface as the thickness increases. These results are in perfect agreement with those reported in [6].

B. Modes Supported by a Metal Film of Width w=1 μm

Figure 17:
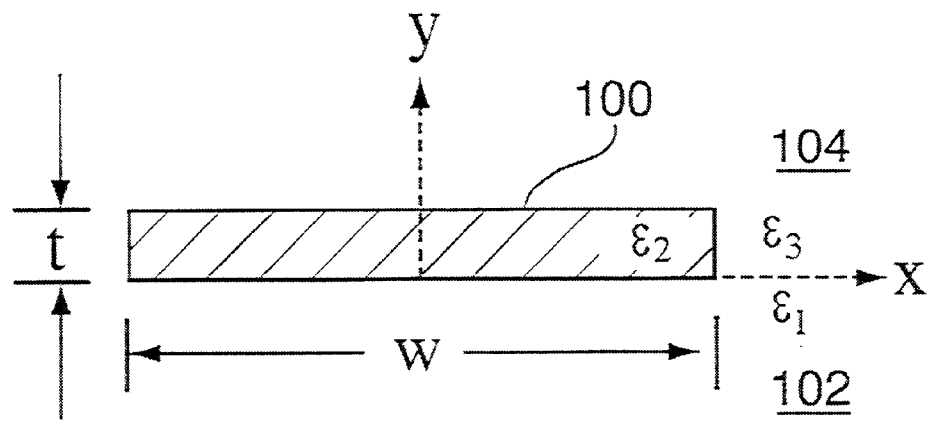
FIGS. 17(a) and 17(b) are a cross-sectional view and a plan view, respectively, of a second embodiment of the invention in the form of an asymmetric waveguide structure formed by a core comprising a lossy metal film of thickness t, width w and permittivity $\in_2$ supported by a homogeneous semi-infinite substrate of permittivity $\in_1$ and with a cover or superstrate comprising a homogeneous semi-infinite dielectric of permittivity $\in_3$.
Figure 17:
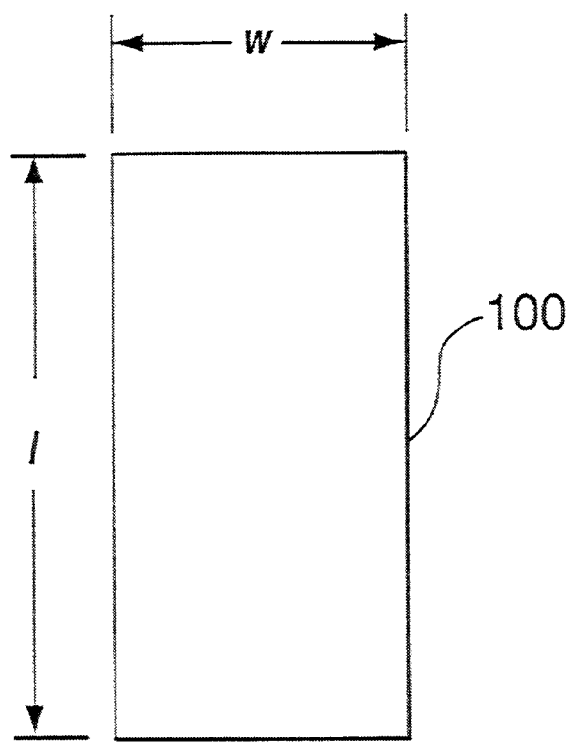

The study proceeds with the analysis of the structure shown in FIG. 17(*a*) for the case w=1 μm. The material parameters and free-space wavelength that were used in the previous case w=∞ were also used here. The dispersion curves for the first seven modes were computed using the MoL and the results are shown in FIGS. 18(*a*) and 18(*b*).

In this asymmetric structure, true field symmetry exists only with respect to the y axis. With respect to the horizontal dimension, the modes have a symmetric-like or asymmetric-like field distribution with field localization along either the bottom or top metal-dielectric interface. The modes that have a symmetric-like distribution with respect to the horizontal dimension are localized along the metal-dielectric interface with the lowest dielectric constant, while modes that have an asymmetric-like distribution with respect to this axis are localized along the metal-dielectric interface with the highest dielectric constant. This behaviour is consistent with that observed for asymmetric metal slab waveguides.

The mode nomenclature adopted for symmetric structures can be used without ambiguity to describe the modes supported by asymmetric structures as long as the modes are identified when the metal film is fairly thick, before significant coupling begins to occur through the metal film, and while the origin of the mode can be identified unambiguously. As the metal film thickness decreases, the modes (and their fields) can evolve and change considerably more in an asymmetric structure compared to a symmetric one. The number of extrema in the main transverse electric field component of the mode is counted along the lateral dimension at the interface where the fields are localized. This number is then used in the mode nomenclature.

It was observed in Section III that the modes supported by symmetric structures are in fact supermodes created from a coupling of "edge" and "corner" modes supported by each metal-dielectric interface defining the structure. As the thickness and width of the metal decrease, the coupling between these interface modes intensifies leading to dispersion and possibly evolution of the supermode. In asymmetric structures, the bound modes are also supermodes created in a similar manner, except that dissimilar interface modes may couple to each other to create the supermode. For instance, a mode having one field extremum along the top interface (along the top edge bounded by the corners) may couple with a mode having three extrema along the bottom interface. The main selection criterion determining which interface modes will couple to create the supermode is similarity in the value of their propagation constants. For all modes supported by an asymmetric structure, an apparent symmetry or asymmetry with respect to the horizontal dimension can still be observed in the corner modes.

The $sa_b^0$, $aa_b^0$, $ss_b^0$ and $as_b^0$ modes are the fundamental modes supported by the structure. The $sa_b^0$ and $aa_b^0$ modes are comprised of coupled corner modes, resembling the corresponding modes in a symmetric structure, except that the fields are localized near the substrate. These two modes do not change in character as the thickness of the film decreases. A narrowing of the metal film would eventually break the degeneracy observed in FIGS. 18(*a*) and 18(*b*).

For a sufficiently large thickness (about 100 nm for the present structure), the $ss_b^0$ and $as_b^0$ modes are comprised of coupled corner modes much like the corresponding modes in a symmetric structure except that the fields are localized near the superstrate. As the thickness of the metal film decreases, both of these modes begin to evolve, changing completely in character for very thin films, FIGS. 19(*a*) to 19(*d*) show the evolution of the $E_y$ field component related to the $ss_b^0$ mode as the thickness of the film ranges from 100 nm (FIG. 19(a)) to 40 nm (FIG. 19(d)). It is clearly seen that the mode evolves from a symmetric-like mode having fields localized near the superstrate to an asymmetric-like mode having fields localized along the substrate-metal interface, A similar evolution is observed for the $as_b^0$ mode. This change in character is also apparent in their dispersion curves: they follow the general behaviour of a symmetric-like mode for large thicknesses but then slowly change to follow the behaviour of an asymmetric-like mode as the thickness decreases. Since the substrate dielectric constant is larger than the superstrate dielectric constant, the mode is "pulled" from a symmetric-like mode to an asymmetric-like mode (having field localization at the substrate-metal interface) as the metal film becomes thinner.

FIGS. 20(a) to 20(d) show the $E_y$ field component related to the $ss_b^1$ and $sa_b^1$ modes for two film thicknesses. From these Figures it is noted that the top and bottom edge modes comprising a supermode are different from each other, In FIG. 20(a), for instance, it is seen that the bottom edge mode has three extrema and is of higher order than the top edge mode which has one extremum. A similar observation holds for FIG. 20(c), where it can be seen that the bottom edge mode has one extremum while the top one has none. In this structure, the substrate has a higher dielectric constant than the superstrate so the phase constant of a particular substrate-metal interface mode will be higher than the phase constant of the same mode at the metal-superstrate interface. Since a supermode is created from a coupling of edge modes having similar propagation constants, it should be expected that, in an asymmetric structure, different edge modes may couple to create a supermode. In general, higher-order modes have smaller values of phase constant compared to lower-order modes, so in structures having $\in_3 < \in_1$, all supermodes are comprised of a bottom edge mode of the same order or higher than the top edge mode, as shown in FIGS. 20(a) to 20(d). If $\in_3 > \in_1$, then the opposite statement is true.

Figure 18A:
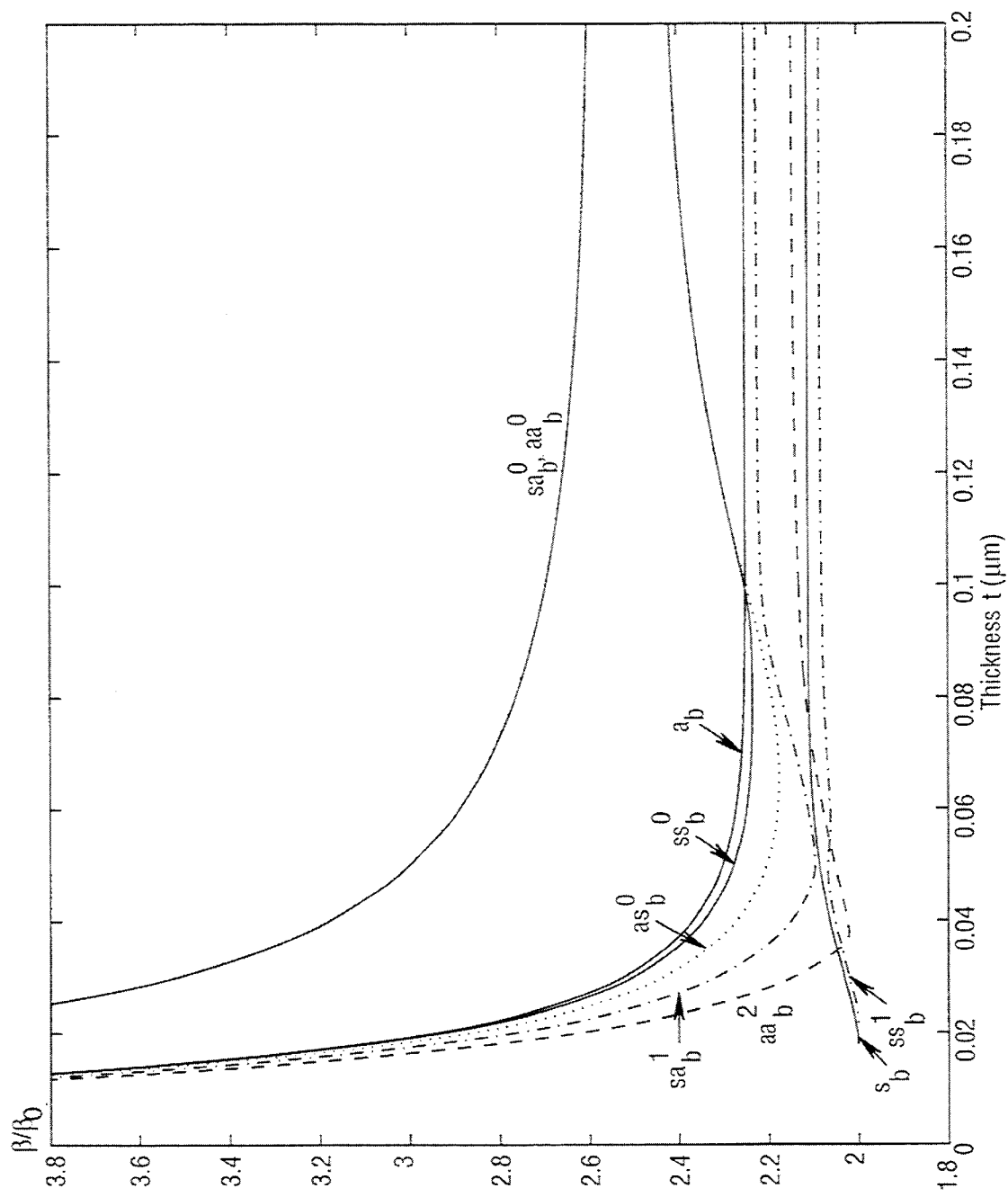
FIGS. 18(a) and 18(b) illustrate dispersion characteristics with thickness of the first seven modes supported by an asymmetric metal film waveguide of width w=1 μm. The $a_b$ and $s_b$ modes supported for the case w=∞ are shown for comparison. (a) Normalized phase constant. (b) Normalized attenuation constant.
Figure 18B:
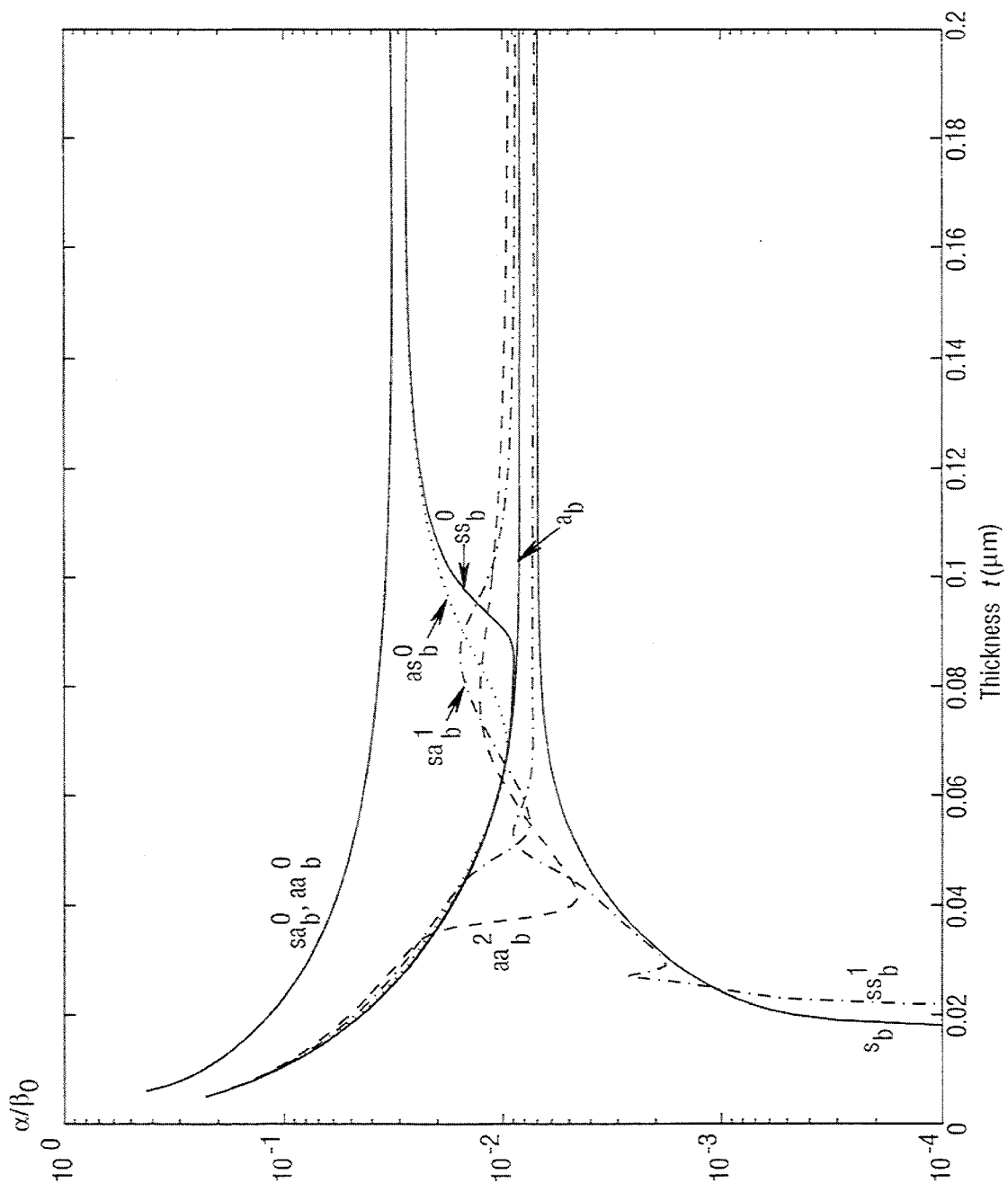
Figure 19A:
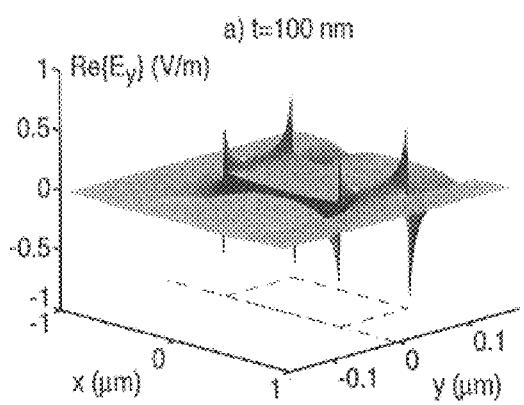
FIGS. 19(a),(b),(c) and (d) illustrate spatial distribution of the $E_y$ field component related to the $ss_b^0$ mode supported by an asymmetric metal film waveguide of width w=1 μm for four film thicknesses. The waveguide cross-section is located in the x-y plane and the metal region is outlined as the rectangular dashed contour. The field distributions are normalized such that max|ℜ{$E_y$}|=1.
Figure 19B:
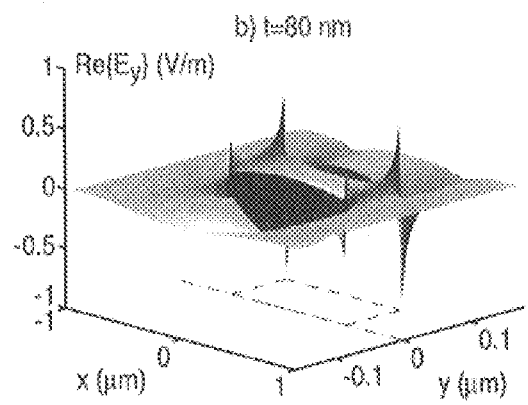
Figure 19C:
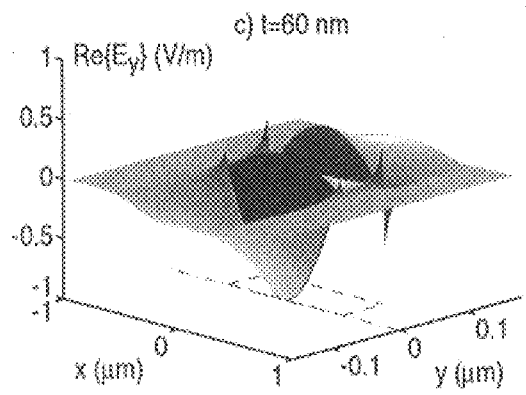
Figure 19D:
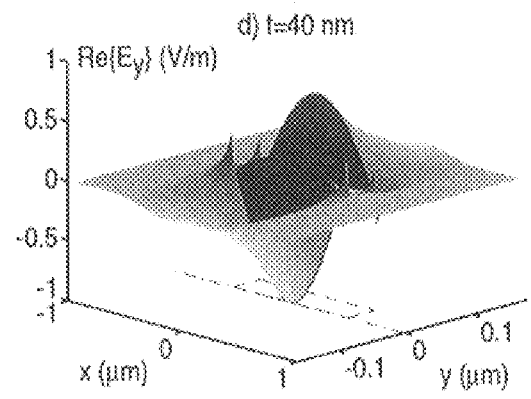
Figure 20A:
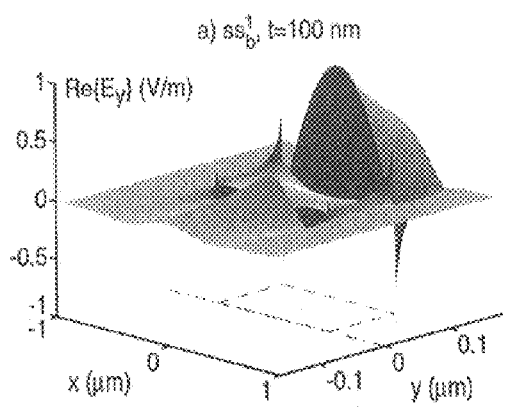
FIGS. 20(a),(b),(c) and (d) illustrate spatial distribution of the $E_y$ field component related to two higher order modes supported by an asymmetric metal film waveguide of width w=1 μm for two film thicknesses. In all cases, the waveguide cross-section is located in the x-y plane and the metal region is outlined as the rectangular dashed contour. The field distributions are normalized such that max|ℜ{$E_y$}|=1.
Figure 20B:
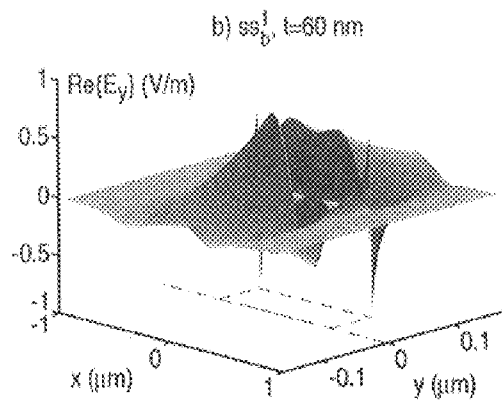
Figure 20C:
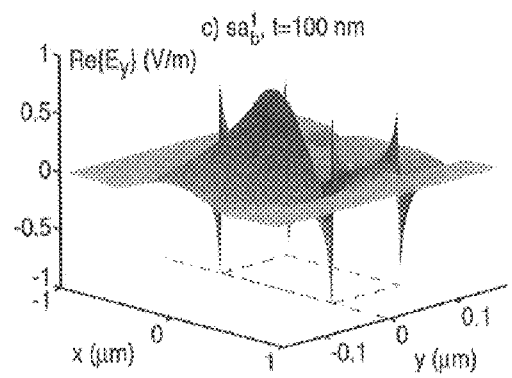
Figure 20D:
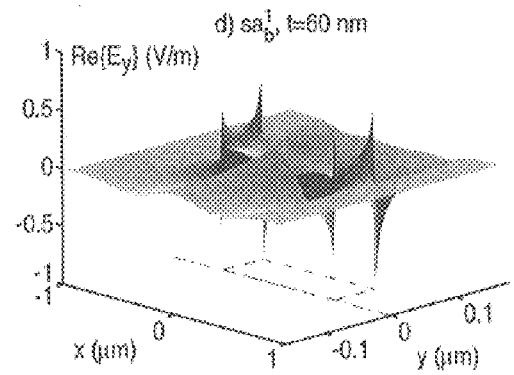

A careful inspection of the fields associated with the $ss_b^1$, $sa_b^1$ and $aa_b^2$ modes reveals that, as the thickness of the film decreases, the mode fields may evolve in a smooth manner similar to that shown in FIGS. 19(a) to 19(d), but, in addition, a change or "switch" of the constituent edge modes may also occur. For instance, from FIG. 20(c), the $sa_b^1$ mode is seen to comprise a substrate-metal interface mode having one extremum for a film thickness of 100 nm, while for a thickness of 60 nm the substrate-metal interface mode has three extrema, as shown in FIG. 20(d). Since higher-order modes have in general lower phase constants than lower-order modes, this change in edge modes causes a reduction in the phase constant of the $sa_b^1$ mode in the neighbourhood of 60 nm, as shown in FIG. 18(a). Another change occurs near 40 nm as the corner modes switch from being symmetric-like (as in FIGS. 20(c) and 20(d)) to being asymmetric-like with respect to the horizontal dimension. This change is again reflected in the dispersion curve of the $sa_b^1$ mode as its phase constant is seen to increase with a further decrease in thickness. In general, the changes in the edge and corner modes are consistent with the directions taken by the dispersion curves as the film thickness decreases, thus explaining the oscillations in the curves seen in FIGS. 18(a) and 18(b).

The only potentially long-ranging mode supported by this structure at the wavelength of analysis is the $ss_b^1$ mode. As shown in FIGS. 18(a) and 18(b), the mode has a cutoff thickness near t=22 nm and although the attenuation drops quickly near this thickness, it should be remembered that the field confinement does so as well. Furthermore, the spatial distribution of the main transverse field component related to this mode evolves with decreasing thickness in the manner shown in FIGS. 20(a) and 20(b), such that near cutoff the spatial distribution has strong extrema along the top and bottom edges. These extrema render the mode less excitable using an end-fire technique, so coupling losses would be higher compared to the fundamental symmetric mode in symmetric waveguides. Also, the fact that the mode would be operated near its cutoff thickness implies that very tight tolerances are required in the fabrication of structures. Nevertheless, it should be possible to observe propagation of this mode in a suitable structure using an end-fire experiment.

VII. Mode Characteristics and Evolution with Film Thickness: Large Asymmetry

A. Mode Solutions for a Metal Film Slab Waveguide

Figure 21A:
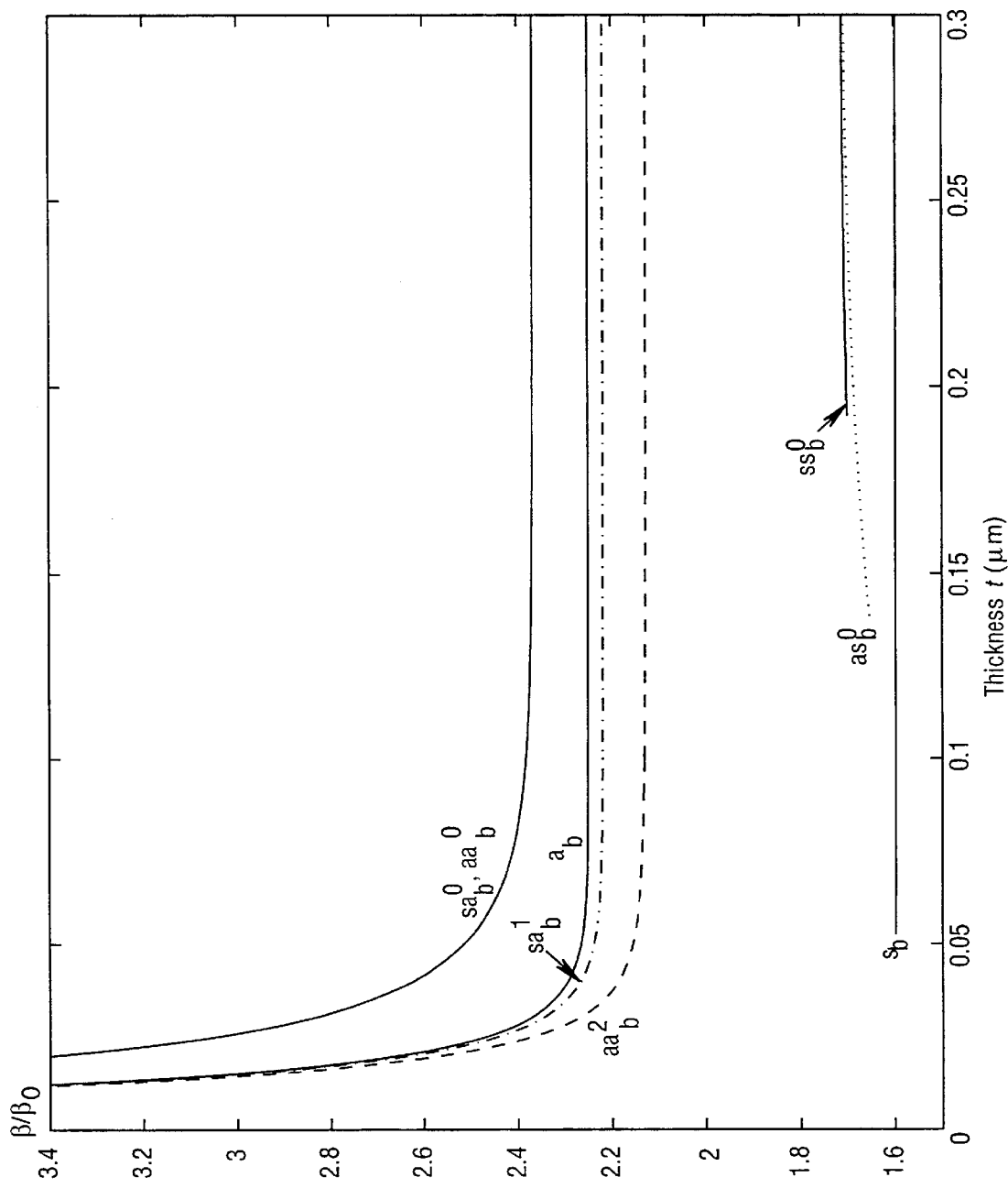
FIGS. 21(a) and (b) illustrate dispersion characteristics with thickness of the first six modes supported by an asymmetric metal film waveguide of width w=1 μm. The $a_b$ and $s_b$ modes supported for the case w=∞ are shown for comparison. (a) Normalized phase constant. (b) Normalized attenuation constant.
Figure 21B:
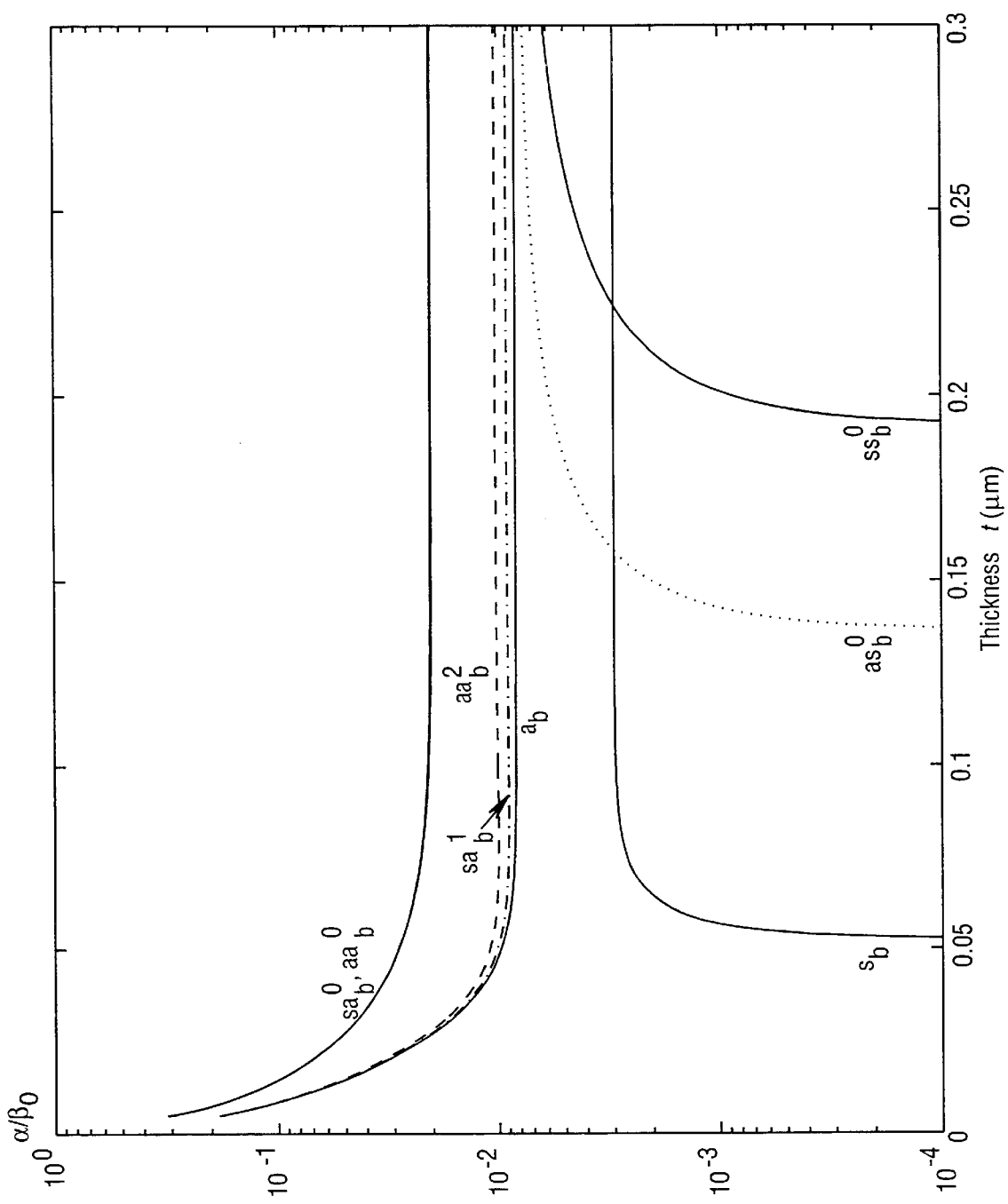
Figure 22A:
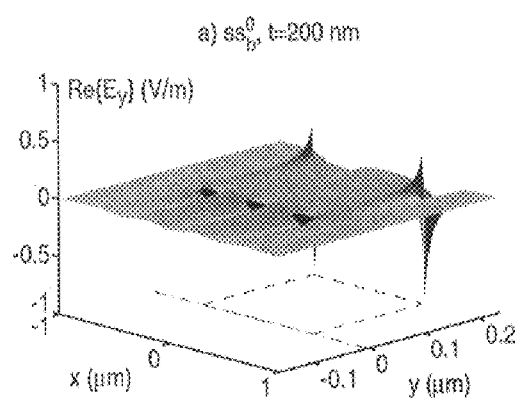
FIGS. 22(a),(b),(c) and (d) illustrate spatial distribution of the $E_y$ field component related to modes supported by an asymmetric metal film waveguide of width w=1 μm. In all cases, the waveguide cross-section is located in the x-y plane and the metal region is outlined as the rectangular dashed contour. The field distributions are normalized such that $\max|\Re\{E_y\}|=1$.
Figure 22B:
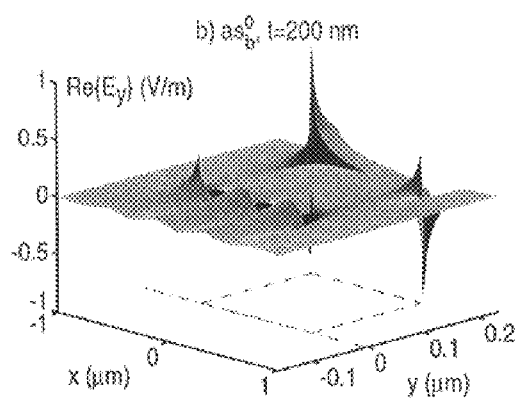
Figure 22C:
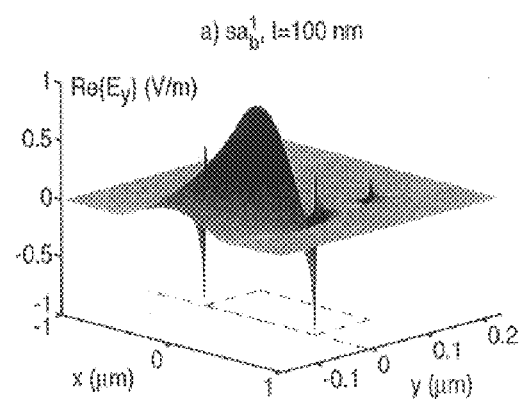
Figure 22D:
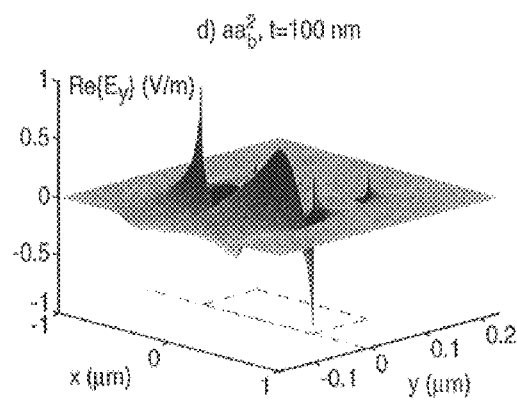

The study proceeds with the analysis of structures having a large difference in the dielectric constants of the substrate and superstrate. With respect to FIG. 17(a), the relative permittivities of the substrate and superstrate are set to $\in_{r,1}=4(n_1=2)$ and $\in_{r,3}=2.25(n_3=1.5)$, respectively, the width of the metal film is set to w=∞, and the dielectric constant of the metal region and the wavelength of analysis are set to the same values as in Section III. The dispersion curves of the $s_b$ and $a_b$ modes supported by this structure can be seen in FIGS. 21(a) and 21(b), Comparing with FIGS. 18(a) and 18(b), it is observed that the $s_b$ mode has a larger cutoff thickness in a structure having a large asymmetry than in a structure having similar substrate and superstrate dielectric constants. The results shown were computed using the MoL and are in perfect agreement with those reported in [6].

B. Modes Supported by a Metal Film of Width w=1 μm

The structure shown in FIG. 17(a) was analyzed using the MoL for w=1 μm and for the same material parameters and free-space wavelength as those given above for w=∞. The dispersion curves of the first six modes supported by the structure are shown in FIGS. 21(a) and 21(b).

An inspection of the mode fields related to the $sa_b^0$ and $aa_b^0$ modes reveals that these modes are again comprised of coupled corner modes with fields localized at the substrate-metal interface. The modes do not change in character as the thickness of the film decreases and a narrowing of the metal film would eventually break the degeneracy observed in FIGS. 21(a) and 21(b).

The spatial distribution of the $E_y$ field component related to the, $ss_b^0$, $as_b^0$, $sa_b^1$ and $aa_b^2$ modes is given in FIGS. 22(a) to 22(d). It is noted from this figure that in all cases the metal-superstrate interface modes are similar: they have fields with no extrema along the interface but rather that are localized near the corners and have either a symmetric or asymmetric distribution with respect to the y axis. These corner modes are in fact the lowest order modes supported by the metal-superstrate interface; they have the largest value of phase constant and thus are most likely to couple with edge modes supported by the substrate-metal interface to form a supermode. From FIGS. 22(a) and 22(b) it is observed that the substrate-metal interface modes comprising the $ss_b^0$ and $as_b^0$ modes are of very high order. This is expected since the substrate dielectric constant is significantly higher than the superstrate dielectric constant and higher order modes have lower values of phase constant. The $ss_b^0$ and $as_b^0$ modes shown in FIGS. 22(a) and 22(b) indeed have fields that are localized along the metal-superstrate interface, while the $sa_b^1$ and $aa_b^2$ modes shown in FIGS. 22(c) and 22(d) have fields that are localized along the substrate-metal interface.

One effect, caused by increasing the difference between the substrate and superstrate dielectric constants, is that the difference between the orders of the top and bottom edge modes comprising a supermode can increase. This effect can be observed by comparing FIG. 19($a$) with FIG. 22($a$). In the former, there is no difference between the orders of the top and bottom edge modes, while in the latter the difference in the orders is 5. Another effect is that the degree of field localization increases near the interface between the metal and the dielectric of higher permittivity, for all modes that are asymmetric-like with respect to the horizontal dimension. This effect can be seen by comparing the fields related to the $sa_b^1$ mode shown in FIGS. 22($c$) and 20($c$). A comparison of the fields related to the $sa_b^0$ and $aa_b^0$ modes reveals that this effect is present in these modes as well.

From the dispersion curves shown in FIG. 21($a$), it is apparent that the normalized phase constant of all modes converge with increasing film thickness to normalized phase constants in the neighbourhood of those supported by plasmon-polariton waves localized along the associated isolated edge. The normalized phase constants of modes having fields localized at the substrate-metal interface, converge with increasing film thickness to normalized phase constants in the neighbourhood of that related to the ab mode, while the normalized phase constants of modes having fields localized along the metal-superstrate interface converge to values near that of the $S_b$ mode. This behaviour is present though less apparent, in structures where the asymmetry is smaller, such as the one analyzed in Section VII.

Comparing FIGS. 18($a$) and 18($b$) with FIGS. 21($a$) and 21($b$), it is noted that the dispersion curves of the modes are much smoother when the difference in the substrate and superstrate dielectric constants is large. This is due to the fact that the edge modes comprising the supermodes are less likely to change or switch as they do in a structure having similar substrate and superstrate dielectric constants. Thus modes that start out being symmetric-like with respect to the horizontal dimension remain so as the thickness of the film decreases. The cutoff thickness of the symmetric-like modes also increases as the difference between the substrate and superstrate dielectric constants increases.

It is apparent that introducing a large asymmetry can hamper the ability of the structure to support useful long-ranging modes. Any mode that is long-ranging would likely have fields with numerous extrema along the width of the interface between the metal film and the dielectric of higher permittivity, as shown in FIGS. 22($a$) and 22($b$).

IX. Mode Dispersion with Film Width: Small Asymmetry

An asymmetric structure comprising the same dielectrics as the structures studied in Section VII, but having a metal film of width w=0.5 $\mu$m, was analyzed at the same free-space wavelength in order to determine the impact of a narrowing film width on the modes supported. The structure was analyzed using the MoL and FIGS. 23($a$) and 23($b$) give the dispersion curves obtained for the first few modes supported.

Figure 23A:
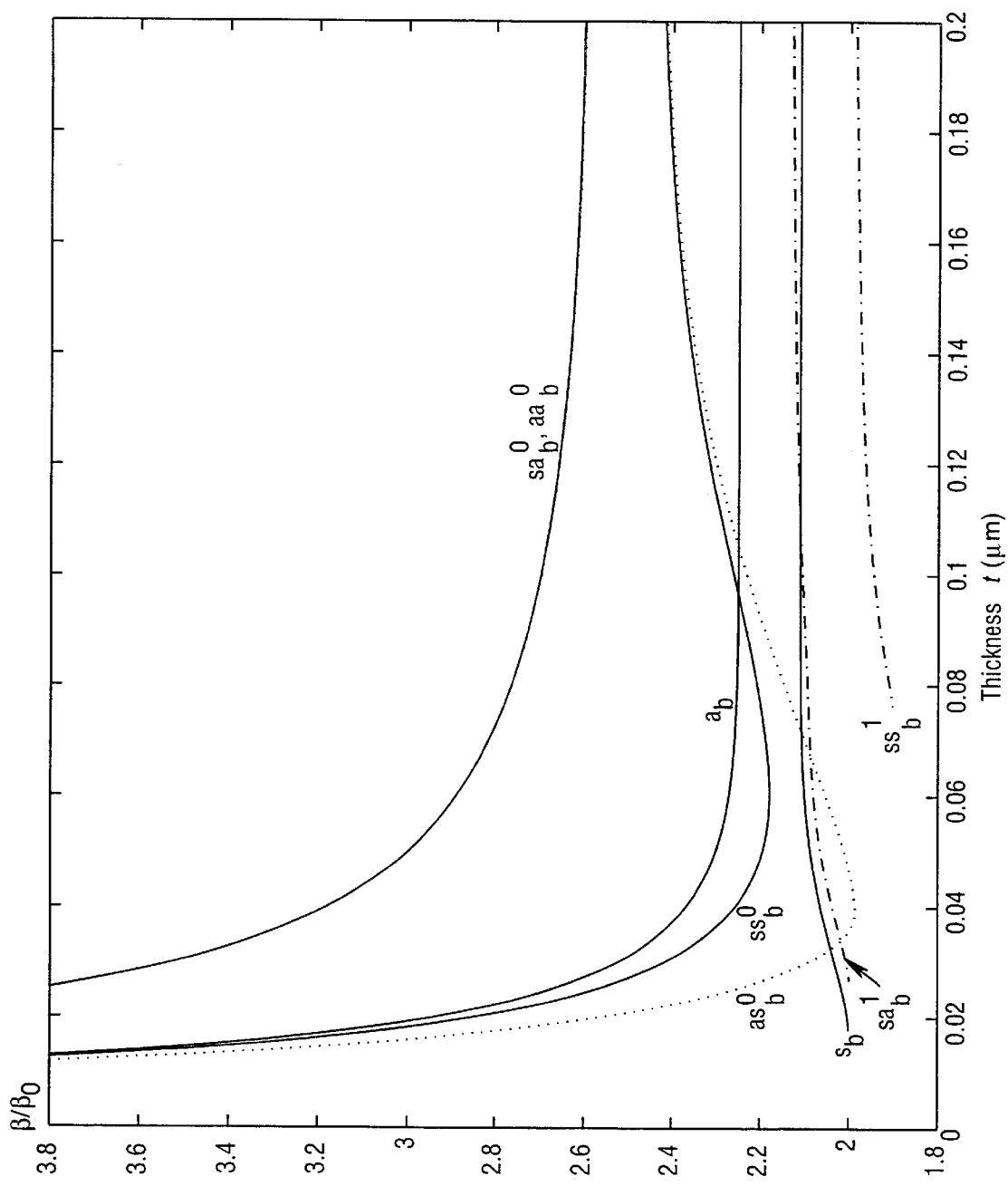
FIGS. 23(a) and 23(b) illustrate dispersion characteristics with thickness of the first six modes supported by an asymmetric metal film waveguide of width w=0.5 μm. The $a_b$ and $s_b$ modes supported for the case w=∞ are shown for comparison. (a) Normalized phase constant. (b) Normalized attenuation constant.
Figure 23:
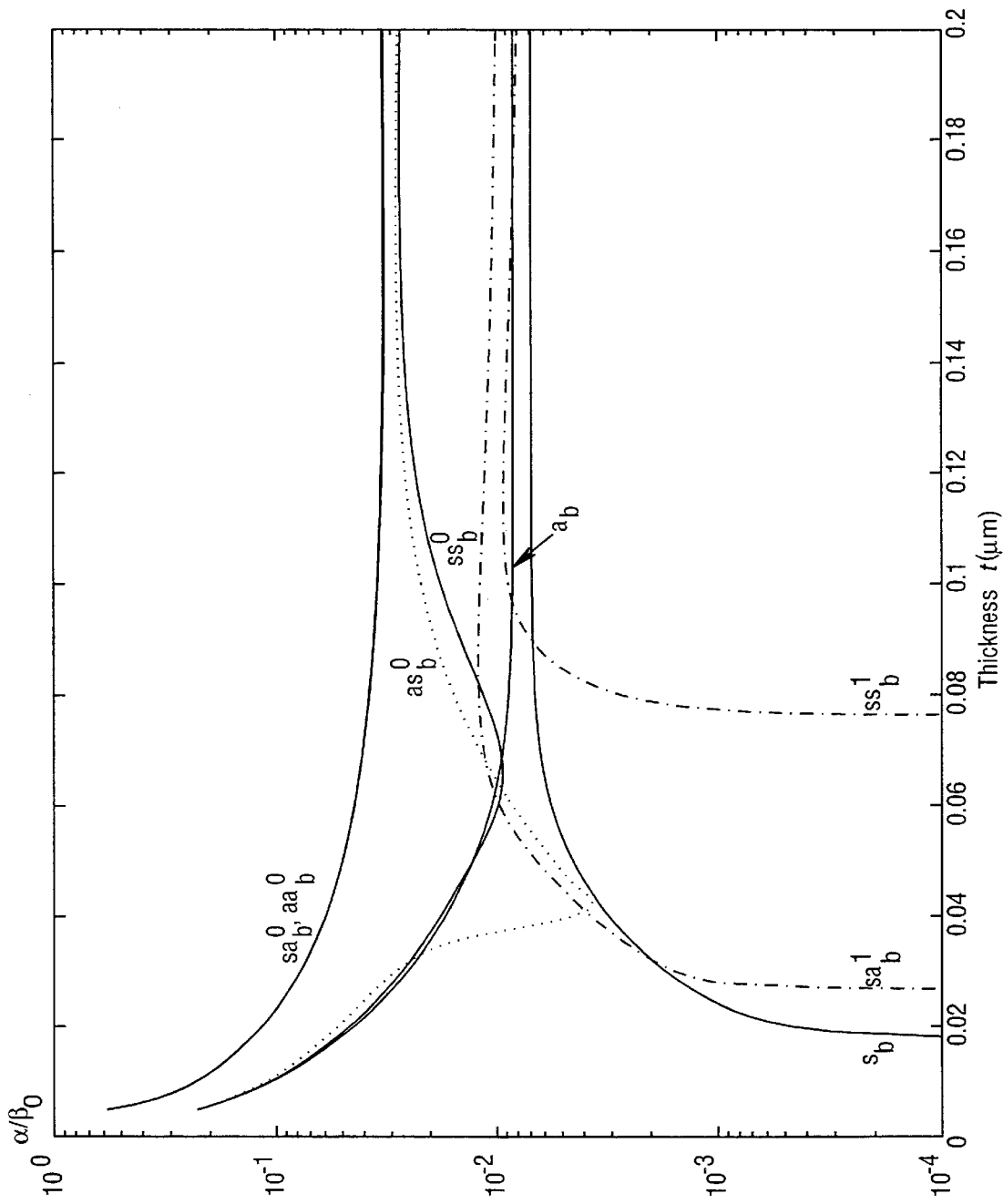

Comparing FIGS. 23($a$) and 23($b$) with FIGS. 18($a$) and 18($b$) reveals that reducing the width of the film does not cause major changes in the behaviour of the fundamental modes, but does have a major impact on the higher order modes. It is noted that reducing the film width increases the cutoff thickness of the $ss_b^1$ mode. This higher order mode is symmetric-like with respect to the horizontal dimension, and the cutoff thickness of the symmetric-like modes in general increases as the width of the film decreases due to a reduction in field confinement to the metal film. The $aa_b^2$ mode was sought but not found for this film width.

It is also noted by comparing FIGS. 23($a$) and 23($b$) with FIGS. 18($a$) and 18($b$) that the $sa_b^1$ mode evolves quite differently depending on the width of the film. For a film width of w=1 $\mu$m, the mode follows the general behaviour of an asymmetric-like mode whereas, for a film width of w=0.5 $\mu$m, the mode evolves as a symmetric-like mode, and has a cutoff thickness near t=27 nm. When the film is wide, it becomes possible for numerous higher order edge modes (having similar values of phase constant) to be supported by the substrate-metal or metal-superstrate interfaces, so edge modes comprising a supermode are likely to change or switch as the thickness of the film is reduced, as shown in FIGS. 20($c$) and 20($d$). For a narrow metal film, some of the higher order edge modes may be cutoff, thus rendering changes in edge modes impossible. In such a case, the supermode may be forced to evolve in a smooth manner with decreasing film thickness. A close inspection of the mode fields related to the $sa_b^1$ mode for a film width of w=0.5 $\mu$m reveals that there are no changes to the edge modes as the thickness decreases; rather the mode evolves smoothly from its field distribution at a large thickness (similar to that shown in FIG. 20($c$)) to having a symmetric-like distribution with only one extremum along the top and bottom edges of the film. A change in behaviour due to a change in the width of the metal film was observed only for the $sa_b^1$ mode in this study, but such changes are in general not limited to this mode.

The $sa_b^1$ and $ss_b^1$ modes could be made to propagate over useful distances in this structure, if they are excited near their cutoff thicknesses. However, the difficulties outlined in Section VII B regarding the excitation of modes near cutoff also hold here.

X. Evolution of the $ss_b^0$ and $sa_b^1$ Modes With Structure Asymmetry

The $ss_b^0$ and $sa_b^1$ modes are of practical interest. The $ss_b^0$ mode is the main long-ranging mode supported by symmetric finite-width metal film structures, and, as demonstrated in the previous section, the $sa_b^1$ mode can be the main long-ranging mode supported by asymmetric finite-width structures. In metal films of the right thickness, they are also the modes that are the most suitable to excitation in an end-fire arrangement.

Structures comprising a substrate dielectric having $n_1$=2, of a metal film of width w=0.5 $\mu$m, and of various superstrate dielectrics having $n_3$=2, 1.99, 1.95 and 1.9 were analyzed at the same free-space wavelength as in Section VII. The equivalent permittivity of the metal film was also set to the same value as in Section VII. These analyses were performed in order to investigate the effects on the propagation characteristics of the $ss_b^0$ and $sa_b^1$ modes caused by a slight decrease in the superstrate permittivity relative to the substrate permittivity. FIGS. 24($a$) and 24($b$) show the dispersion curves with film thickness, obtained for these modes in the four structures of interest.

As seen in FIG. 24($a$) and its inset, the dispersion curves of the modes intersect at a certain film thickness only for the symmetric case ($n_3$=$n_1$). As soon as some degree of asymmetry exists, the curves no longer intersect, though they may come quite close to each other if the asymmetry is small, as seen in the case of $n_3$=1.99. As the degree of asymmetry increases, the separation between the curves increases.

The evolution with film thickness of the $sa_b^1$ mode is shown in FIGS. 25($a$) to 25($d$) for the case $n_3$=1.99 and for thicknesses about t=59 nm (near the maximum in its phase dispersion curve). The evolution of this mode for the cases $n_3$=1.95 and 1.9 is similar to that shown. The evolution with film thickness of the $ss_b^0$ mode is similar in these structures to the evolution shown in FIGS. 19(a) to 19(d) for the case w=1 μm and $n_3$=1.9. Comparing FIGS. 25(a) to 25(d) and FIGS. 19(a) to 19(d), reveals that the modes "swap" character near t=59 nm. For film thicknesses a sufficiently above this value, the modes exhibit their defining character as shown in FIGS. 19(a) and 25(a), but for film thicknesses below it, each mode exhibits the other's character, as shown in FIGS. 19(d) and 25(d). This character swap is present for the three cases of asymmetry considered here ($n_3$=1.99, 1.95 and 1.9) and explains the behaviour of the dispersion curves shown in FIGS. 24(a) and 24(b).

Figure 24A:
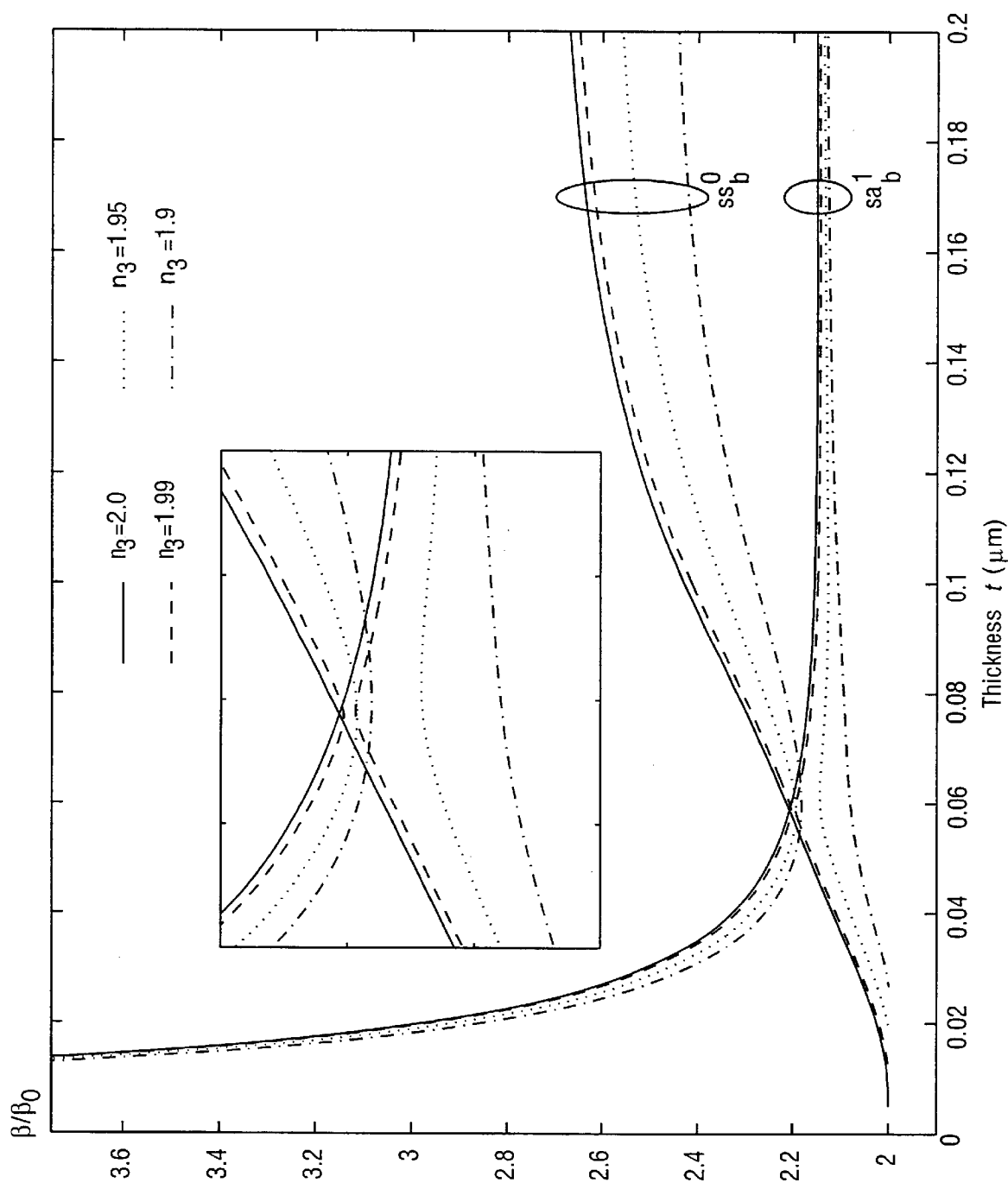
FIGS. 24(a) and 24(b) illustrate dispersion characteristics with thickness of the $ss_b^0$ and $sa_b^1$ modes supported by an asymmetric metal film waveguide of width w=0.5 μm for various cases of $\epsilon_3$. (a) Normalized phase constant; the inset shows an enlarged view of the region bounded by $0.04 \leq t \leq 0.08$ μm and $2.0 \leq \beta/\beta_0 \leq 2.3$. (b) Normalized attenuation constant; the inset shows an enlarged view of the region bounded by $0.05 \leq t \leq 0.08$ μm and $7.0\times10^{-3} \leq \alpha/\beta_0 \leq 2.0\times10^{-2}$.
Figure 24B:
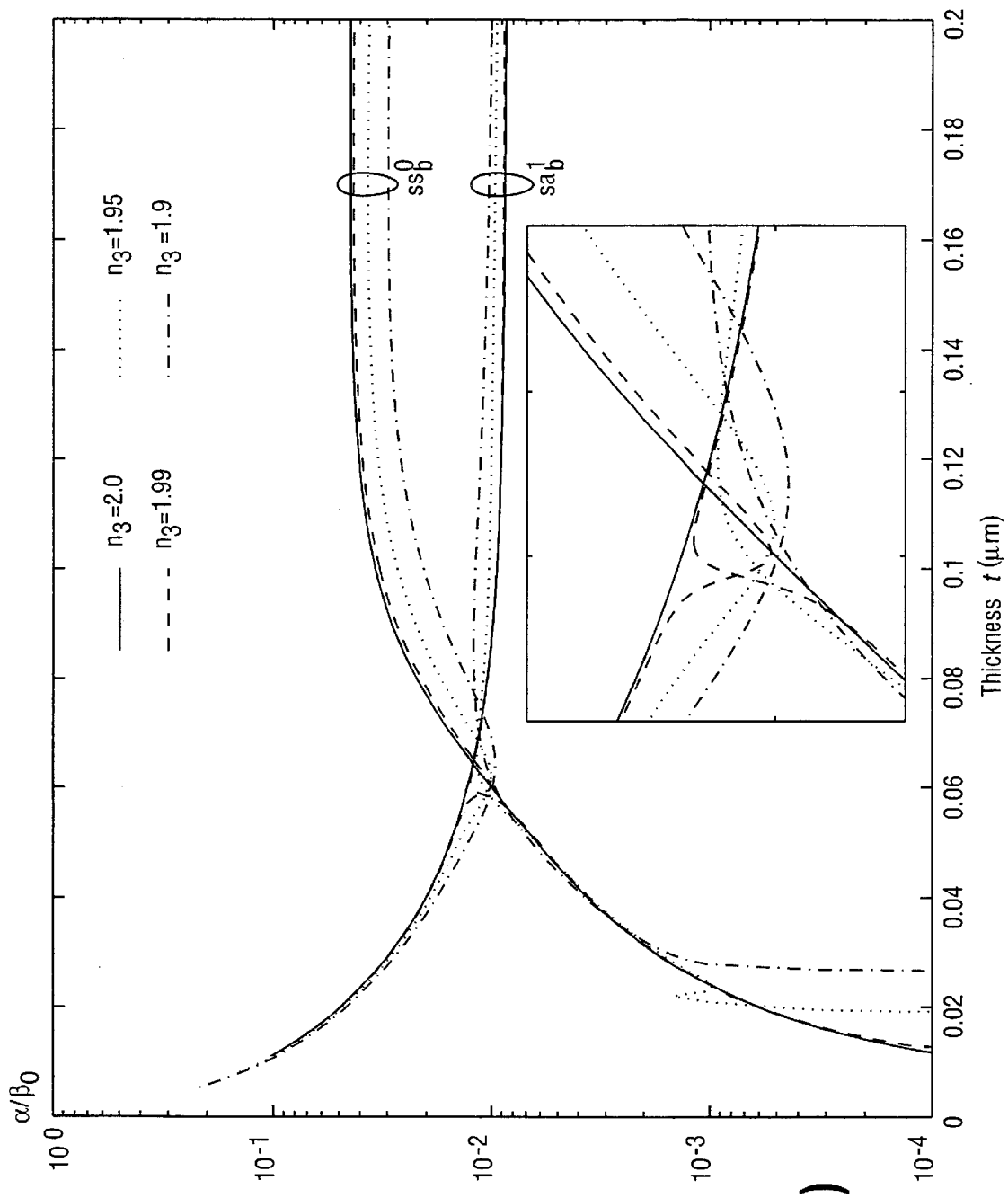
Figure 25A:
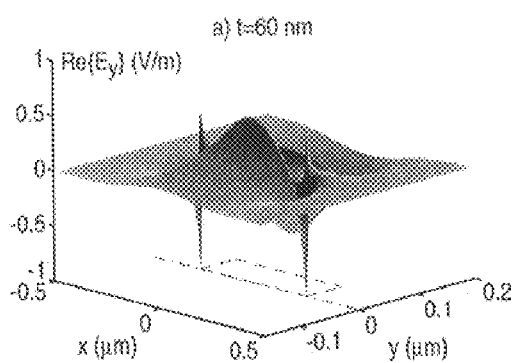
FIGS. 25(a),(b),(c) and (d) illustrate spatial distribution of the $E_y$ field component related to the $sa_b^1$ mode supported by an asymmetric metal film waveguide of width w=0.5 μm for four film thicknesses. The waveguide cross-section is located in the x-y plane and the metal region is outlined as the rectangular dashed contour. The field distributions are normalized such that $\max|\Re\{E_y\}|=1$.
Figure 25B:
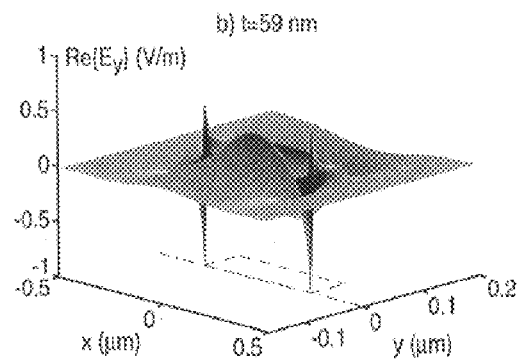
Figure 25C:
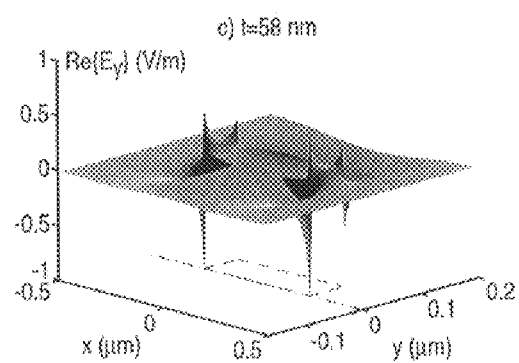
Figure 25D:
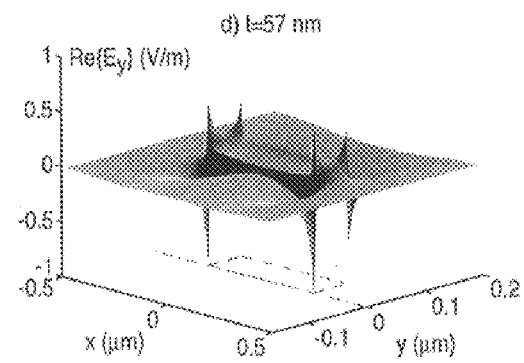

From FIGS. 24(a) and 24(b), it is noted that a cutoff thickness exists for the long-ranging mode as soon as an asymmetry is present in the structure. It is also observed that the cutoff thickness increases with increasing asymmetry. In the case of $n_3$=1.99, the cutoff thickness of the mode is near t=12 nm, while for $n_3$=1.9 the cutoff thickness is near t=27 nm. As the width of the metal film w increases, the cutoff thickness of the $sa_b^1$ mode decreases as long as the mode remains long-ranging (recall that the character of this mode may also change with film width such that its behaviour is similar to the $a_b$ mode in the corresponding slab structure, as shown in FIGS. 18(a) and 18(b)). Also, it is clear from FIGS. 23(a) and 23(b) that the cutoff thickness of the $sa_b^1$ mode is greater than the cutoff thickness of the $s_b$ mode supported by the corresponding slab structure. These results imply that the long-ranging mode supported by a thin narrow metal film is more sensitive to differences in the superstrate and substrate permittivities than the $s_b$ mode supported by the corresponding slab structure. This is reasonable in light of the fact that, in finite-width structures, the mode fields tunnel through the metal as in slab structures, but, in addition, the fields also wrap around the metal film.

FIG. 24(b) shows that near cutoff, the attenuation of the $sa_b^1$ mode supported by an asymmetric structure drops much more rapidly than the attenuation of the $ss_b^0$ mode supported by a symmetric structure. Thus, a means for range extension, similar to that observed in asymmetric slab structures [7], exists for metal films of finite width, though the difficulties related to the excitation of a mode near its cutoff thickness, as described in Section VII B, also apply here.

FIGS. 26(a) to 26(d) show contour plots of $\Re\{S_z\}$ associated with the long-ranging modes for the four cases of superstrate permittivity considered. $S_z$ is the z-directed component of the Poynting vector and its spatial distribution is computed from the spatial distribution of the mode fields using:

$$S_z = (E_x H_y^* - E_y H_x^*)/2 \tag{6}$$

where $H_{x,y}^*$ denotes the complex conjugate of $H_{x,y}$. FIG. 26(a) shows the contour plot associated with the $ss_b^0$ mode supported by a symmetric structure ($n_3$=$n_1$=2) of thickness t=20 nm. FIGS. 26(b),(c) and (d) show contours associated with the $sa_b^1$ mode for the three cases of structure asymmetry considered. The contour plots shown in FIGS. 26(b), (c) and (d) are computed for film thicknesses slightly above cutoff, representative of the thicknesses that would be used to observe these long-ranging modes experimentally. From those figures, it is noted that the contour plots become increasingly distorted and the fields increasingly localized at the metal-superstrate interface as the degree of asymmetry in the structure increases. It is also apparent by comparing FIGS. 26(a) and 26(d), that in an end-fire experiment, less power should be coupled into the $sa_b^1$ mode supported by the asymmetric structure with $n_3$=1.9, compared to the $ss_b^0$ mode supported by the symmetric structure. End-fire coupling losses seem to increase with increasing structure asymmetry.

The high sensitivity of the long-ranging mode supported by thin metal films of finite width, to structure asymmetry, is potentially useful. A small induced asymmetry (created via an electro-optic effect present in the dielectrics say) can evidently effect a large change in the propagation characteristics of the long-ranging mode. From FIGS. 24(a) and 24(b), it is apparent that a difference between the substrate and superstrate refractive indices as small as $n_1-n_3=\Delta n=0.01$ is sufficient to create an asymmetric structure where the long-ranging mode has a cutoff thickness of about t=12 nm. From FIG. 24(a), a slightly larger difference of $\Delta n=0.05$ changes the normalized phase constant of the long-ranging mode by $\Delta(\beta/\beta_0) \approx 0.025$ for a metal film thickness of t=20 nm. Both of these effects are potentially useful.

Asymmetric structures having superstrate dielectric constants that are slightly greater than that of the substrate were also analyzed. The substrate dielectric constant was set to $n_1$=2 and superstrate dielectrics having $n_3$=2.01, 2.05 and 2.1 were considered for the same metal, film width and operating wavelength. The results are similar to those presented in FIGS. 24 through 26 and the cut-off thicknesses are near those shown in FIG. 24(b). Though the results are not identical, there is no major difference between the behaviour of the $ss_b^0$ and $sa_b^1$ modes whether $\in_1 > \in_2$ or $\in_1 < \in_3$ as long as the permittivities are similar.

XI. Conclusion

The purely bound optical modes supported by thin lossy metal films of finite width, embedded in an "infinite" homogeneous dielectric have been characterized and described. The modes supported by these symmetric structures are divided into four families depending on the symmetry of their mode fields and none of the modes are TM in nature (as they are in the metal film slab waveguide). In addition to the four fundamental modes that exist, numerous higher order modes are supported as well. A proposed mode nomenclature suitable for identifying them has been discussed. The dispersion of the modes with film thickness has been assessed and the behaviour in general terms found to be consistent with that of the purely bound modes supported by the metal film slab waveguide. In addition, it has been found that one of the fundamental modes and some higher order modes have cut-off thicknesses. Mode dispersion with film width has also been investigated and it has been determined that the higher order modes have a cut-off width, below which they are no longer propagated. The effect of varying the background permittivity on the modes has been investigated as well, and the general behaviour found to be consistent with that of the modes supported by a metal film slab waveguide. In addition it was determined that the cut-off width of the higher order modes decreases with decreasing background permittivity and that all cut-off thicknesses are increased.

One of the fundamental modes supported by the symmetric structures, the $ss_b^0$ mode, exhibits very interesting characteristics and is potentially quite useful. This mode evolves with decreasing film thickness towards the TEM wave supported by the background, (an evolution similar to that exhibited by the $s_b$ mode in metal film slab waveguides), its losses and phase constant tending asymptotically towards those of the TEM wave. In addition, it has been found that decreasing the film width can reduce the losses well below those of the $s_b$ mode supported by the corresponding metal film slab waveguide. Reducing the background permittivity further reduces the losses. However, a reduction in losses is always accompanied by a reduction in field confinement to the waveguide core, which means that both of these parameters must be traded-off one against the other. Furthermore, carefully selecting the film's thickness and width can make the $ss_b^0$ mode the only long-ranging mode supported. It has also been demonstrated that mode power attenuation values in the range of 10 to 0.1 dB/cm are achievable at optical communications wavelengths, with even lower values possible. Finally, evolved into its most useful form, the $ss_b^0$ mode has a field distribution that renders it excitable using end-fire techniques.

The existence of the $ss_b^0$ mode in a symmetric structure, as well as its interesting characteristics, makes the finite-width metal film waveguide attractive for applications requiring short propagation distances. The waveguide offers two-dimensional field confinement in the transverse plane, rendering it useful as the basis of an integrated optics technology. Interconnects, power splitters, power couplers and interferometers could be built using the guides. Finally, the structures are quite simple and so should be inexpensive to fabricate.

The long-ranging modes supported by asymmetric structures of finite width have a rapidly diminishing attenuation near their cutoff thickness (like asymmetric slab structures). The rate of decrease of the attenuation with decreasing thickness near cutoff is greater than the rate related to the $ss_b^0$ mode in symmetric structures. However field confinement also diminishes rapidly near cutoff, implying that the structures ought to be fabricated to very tight tolerances and that all metal-dielectric interfaces should be of the highest quality. It has also been found that decreasing the width of the film increases the cutoff thickness of the main long-ranging mode. Below this cutoff thickness, no purely bound long-ranging mode exists. The long-ranging modes supported by metal films of finite-width are thus more sensitive to the asymmetry in the structure as compared to the $s_b$ mode supported by similar slab waveguides. This is a potentially useful result in that a small induced change in substrate or superstrate refractive index can have a greater impact on the long-ranging mode supported by a finite-width structure as compared to a similar slab waveguide.

Parts of the foregoing theoretical discussion have been published by the inventor in references [13] [20], [44] and [45], Specific Embodiments and Examples of Application Examples of practical waveguide structures, and integrated optics devices which can be implemented using the invention, will now be described with reference also to FIGS. 27 to 42. Unless otherwise stated, where a waveguide structure is shown, it will have a general construction similar to that shown in FIGS. 1(a) and 1(b) or that shown in FIGS. 17(a) and 17(b).

The waveguide structure 100 shown in FIGS. 1(a) and 1(b) comprises a strip of finite thickness t and width w of a first material having a high free (or almost free) charge carrier density, surrounded by a second material which has a very low free carrier density. The strip material can be a metal or a highly doped semiconductor and the background material can be a dielectric.

Suitable materials for the strip include (but are not limited to) gold, silver, copper, aluminium and highly n- or p-doped GaAs, InP or Si, while suitable materials for the surrounding material include (but are not limited to) glass, quartz, polymer and undoped or very lightly doped GaAs, InP or Si. Particularly suitable combinations of materials include Au for the strip and $SiO_2$ for the surrounding material.

The thickness t and the width w of the strip are selected such that the waveguide supports a long-ranging plasmon-polariton mode at the free-space operating wavelength of interest. Suitable dimensions for $Au/SiO_2$ waveguides at an operating free-space wavelength of 1550 nm are about 10 to 30 nm for the thickness t and about 2 to 12 $\mu$m for the width w; a thickness of 20 nm and a width of 4 $\mu$m are good dimensions.

Figure 51:
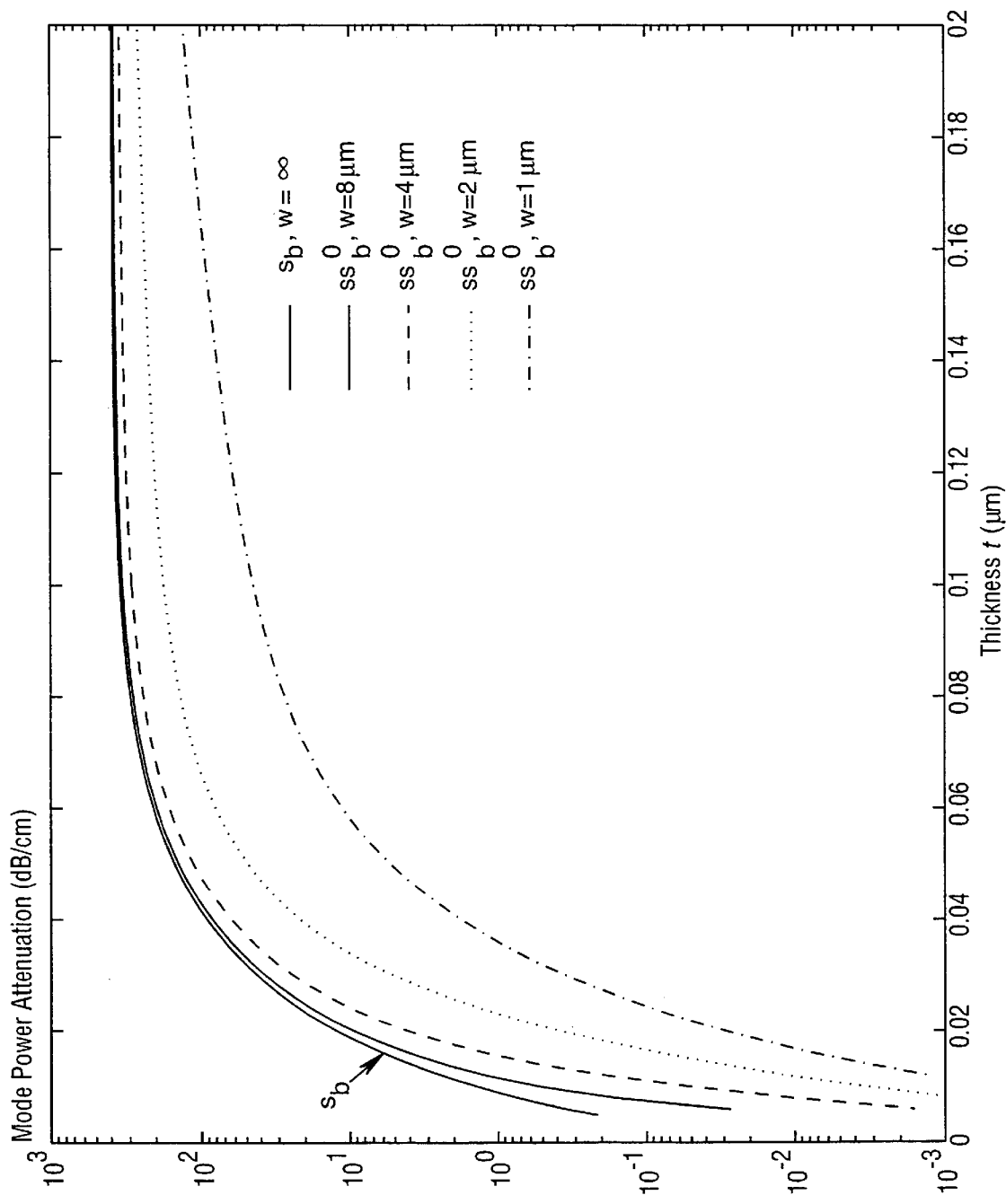
FIG. 51 gives the mode power attenuation for metal film waveguides of various widths and thicknesses. The metal used is Au and the background dielectric is $SiO_2$. The optical free-space wavelength of analysis is set to $\lambda_0=1.55$ μm.
Figure 52:
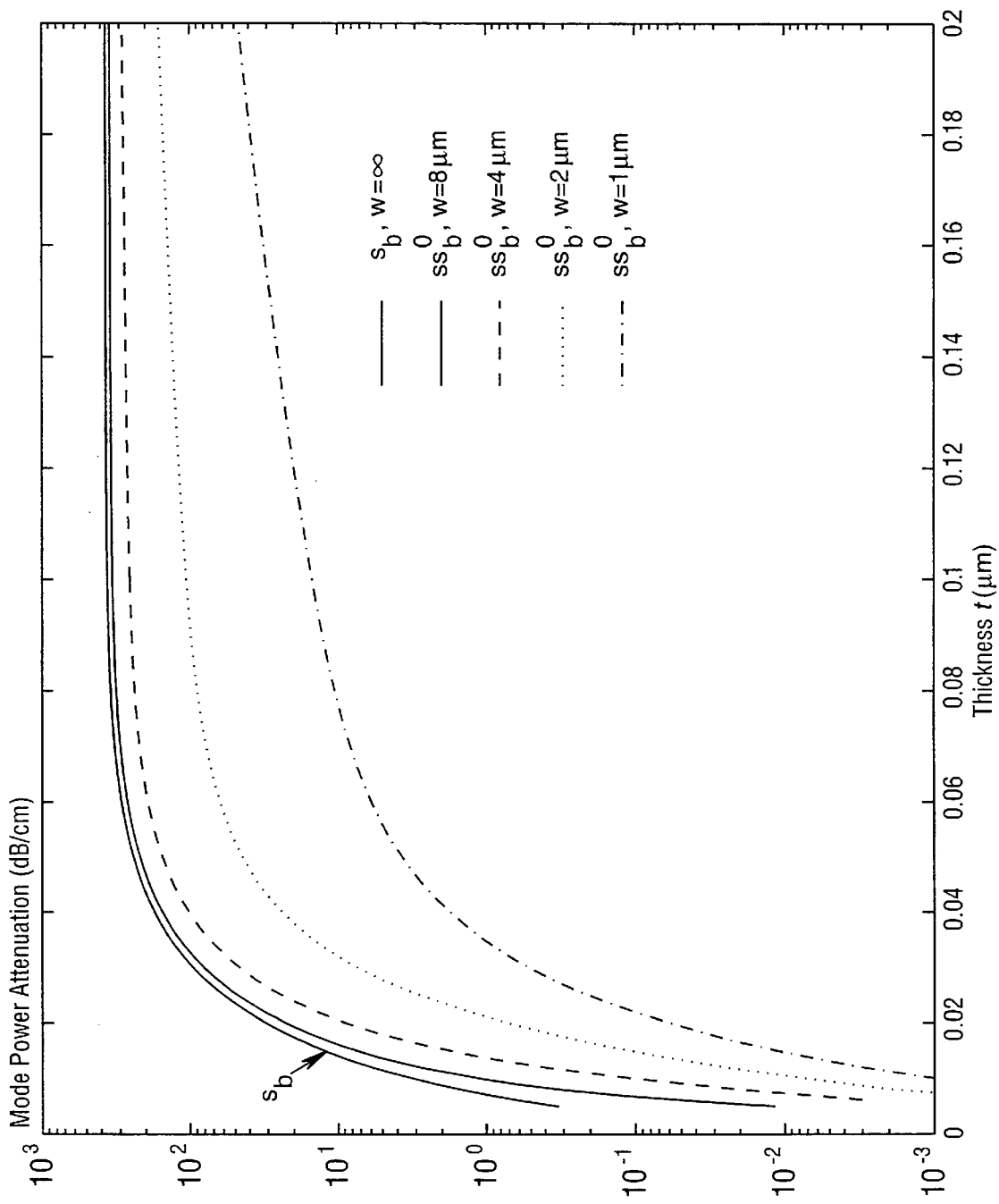
FIG. 52 gives the mode power attenuation for metal film waveguides of various widths and thicknesses. The metal used is Al and the background dielectric is $SiO_2$. The optical free-space wavelength of analysis is set to $\lambda_0=1.55$ μm.

FIGS. 51 and 52 illustrate mode power attenuation for waveguides constructed from strips of gold (Au) and aluminium (Al), respectively, each embedded in silicon dioxide ($SiO_2$) for various widths and thicknesses of the metal film. Analyses were carried out with an optical free space wavelength of 1.55 microns. The curves show that very low attenuation values can be obtained with metal strips of practical dimensions. Generally, the attenuation using the gold strip was about one half of that obtained with aluminium strip having similar dimensions. In both cases, thicknesses ranging from about 15 to 30 nm and widths ranging from about 1 to 8 microns gave particularly good results.

Unless otherwise stated when structure dimensions are mentioned from this point onward, they refer to the $Au/SiO_2$ material combination at an operating optical free-space wavelength of 1550 nm. Similar dimensions are needed for most material combinations.

The plasmon-polariton field may be excited by optical radiation coupled to the strip in an end-fire manner from a fiber butt-coupled to the input of the waveguide. The output of the waveguide can also be butt-coupled to a fibre. Alternatively, the waveguide could be excited at an intermediate position by an alternative means, for example using the so-called attenuated total reflection method (ATR).

The length l shown in FIG. 1(b) is arbitrary and will be selected to implement a desired interconnection.

It has been demonstrated that a straight waveguide 100 with the dimensions set out above is polarisation sensitive. The plasmon-polariton wave is highly linearly polarised in the vertical direction, i.e. perpendicular to the plane of the strip. Hence, it may serve as a polarisation filter, whereby substantially only a vertical polarised mode (aligned along the y-axis as defined in FIG. 1(a)) of the incident light is guided.

Figure 27:
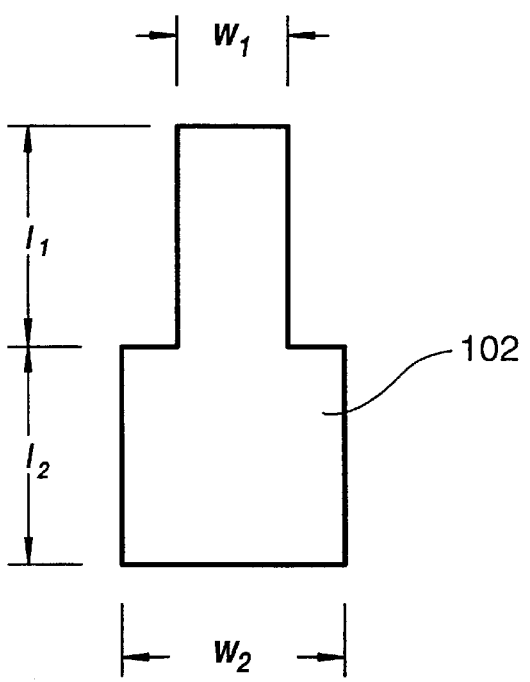
FIG. 27 is a plan view of a waveguide with opposite sides stepped to provide different widths.

FIG. 27 shows a transition waveguide section 102 having stepped sides which can be used to interconnect two sections of waveguide having different widths. The larger width can be used to more effectively couple the waveguide to the input/output fibres. The reduced width helps to reduce the insertion loss of the waveguide. Typical widths are about $W_2$=10 $\mu$m to couple to single mode fibre and $W_1$=4 $\mu$m for the waveguide width. Any symmetry of the structure shown can be used.

Figure 28:
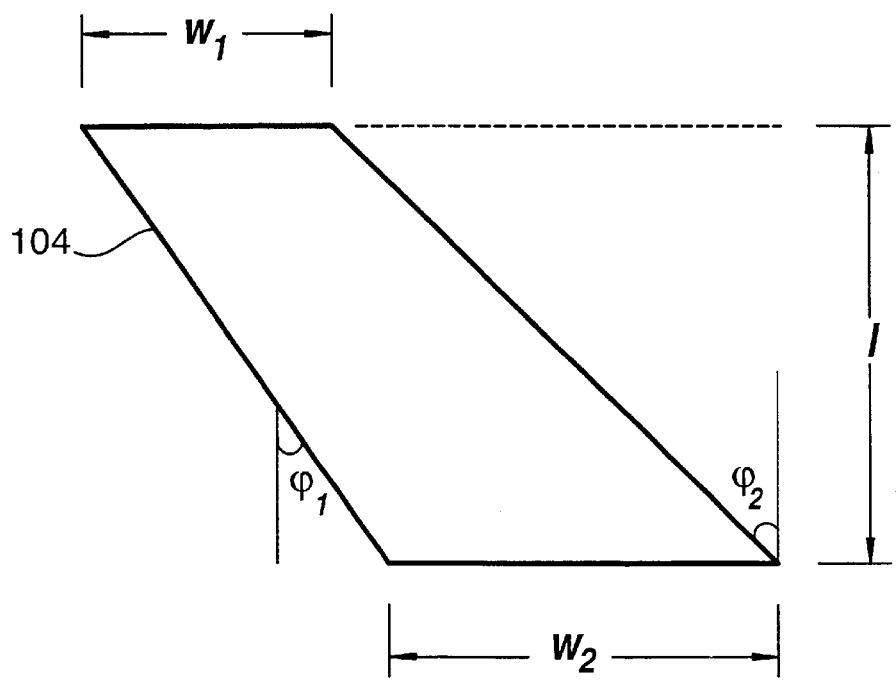
FIG. 28 is a plan view of a waveguide which is tapered and slanted.

FIG. 28 shows an angled section 104 which can be used as an interconnect. Its dimensions, $W_1$, $W_2$ and l and the angles $\phi_1$ and $\phi_2$, are adjusted for a particular application as needed. Usually the angles are kept small, in the range of 1 to 15 degrees and the input and output widths are usually similar, about 4 $\mu$m. Although the sides of the angled section 104 shown in FIG. 28 are tapered, they could be parallel. It should also be appreciated that the angle of the inclination could be reversed, i.e. the device could be symmetrical about the bottom right hand corner shown in FIG. 28 or transposed about that axis if not symmetrical about it.

Figure 29:
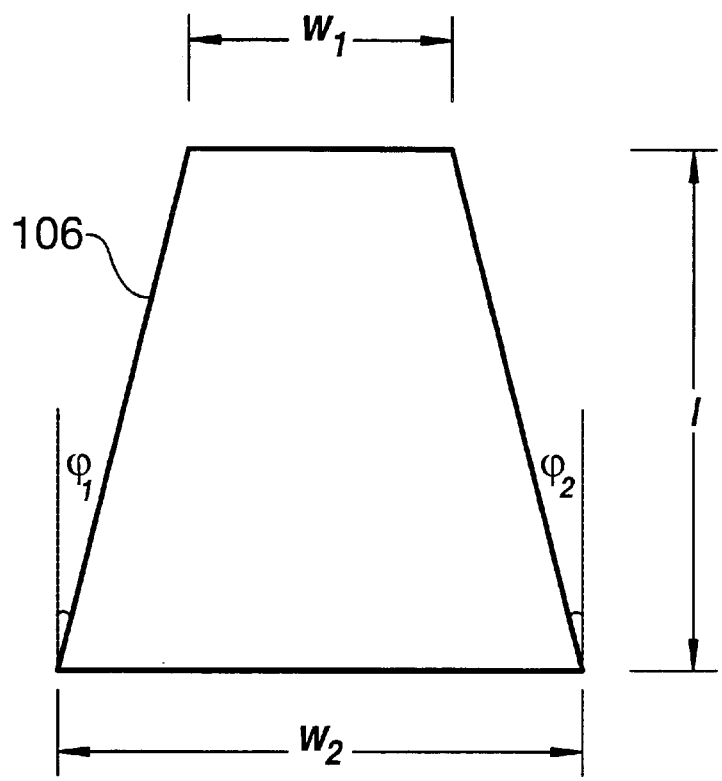
FIG. 29 is a plan view of a trapezoidal waveguide.

FIG. 29 shows a tapered waveguide section 106, which can be used to interconnect two waveguides of different widths. The length of the taper is usually adjusted such that the angles are small, usually in the range of 1 to 15 degrees. The taper angles at the two sides are not necessarily the same. Such a configuration might be used as an input port, perhaps as an alternative to the layout shown in FIG. 27, or as part of another device, such as a power splitter. Any symmetry of the structure shown can be used.

Figure 30:
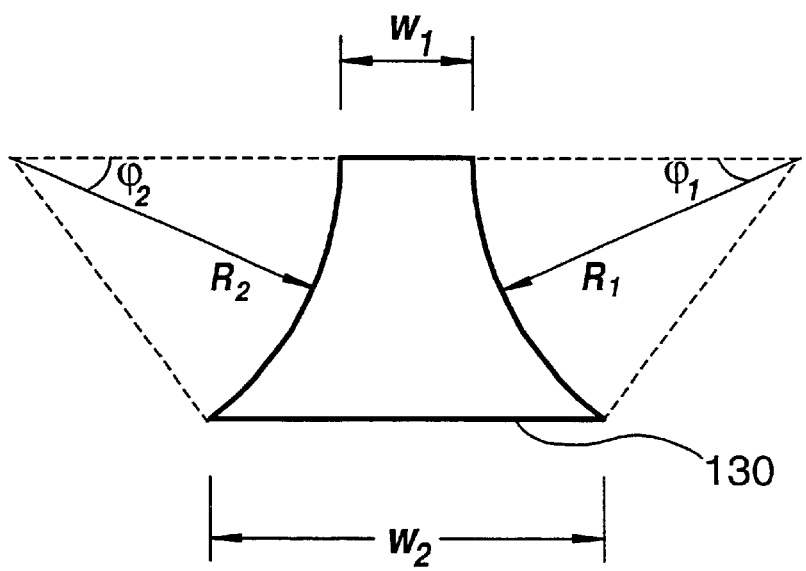
FIG. 30 is a plan view of a waveguide having curved side edges and suitable for use as a transition piece.

FIG. 30 illustrates an alternative transition waveguide section 130 which has curved sides, rather than straight as in the trapezoidal transition section disclosed in FIG. 29. In FIG. 30, the curved sides are shown as sections of circles of radius $R_1$ and $R_2$, subtending angles $\phi_1$ and $\phi_2$ respectively, but it should be appreciated that various functions can be implemented, such as exponential or parabolic, such that the input and output reflections are minimised.

Figure 31:
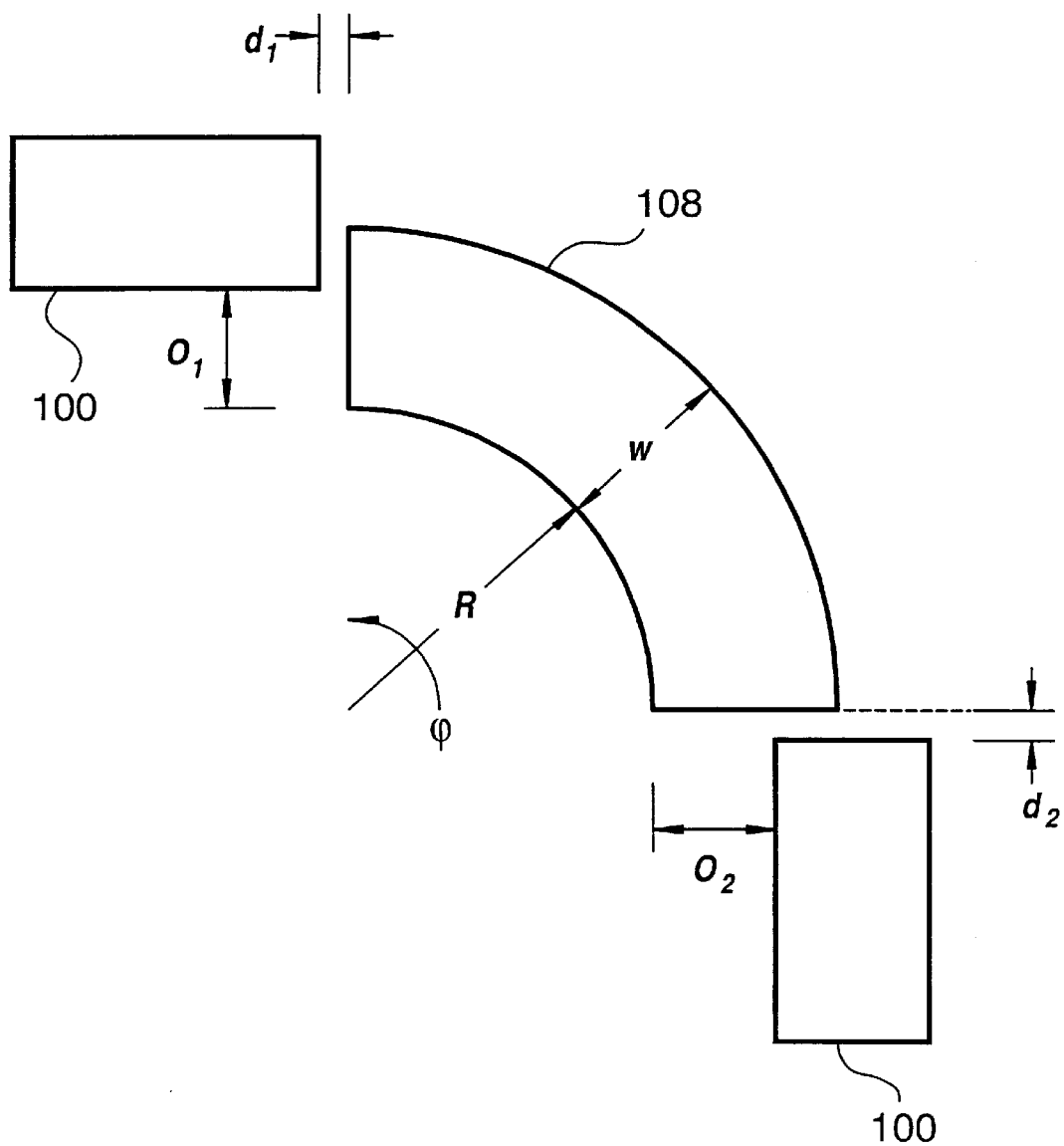
FIG. 31 is a plan view of a curved waveguide section suitable for interconnecting waveguides at a corner.

FIG. 31 shows a curved waveguide section 108 which can be used to redirect the plasmon-polariton wave. The angle $\phi$ of the bend can be in the range of 0 to 360 degrees and the bending radius R can be in the range of a few microns to a few centimetres. For a 45-degree bend, a radius of 0.5 to 2 cm is appropriate. The critical dimensions are the radius R and the positions of the input and output straight sections 100. Although the device will work, and the structure 108 will convey the plasmon-polariton wave around the bend, there is leakage out of the bend (from the exterior curve) and also reflection back in the direction from which the wave came. Reduced radiation and reflection is obtained when the input and output waveguides 100 are offset outwards relative to the ends of the bend. The reason for this is that the straight waveguide sections 100 have an optical field extremum that peaks aong the longitudinal centre line, and then decays towards the edges. In the bend, the extremum of the optical field distribution shifts towards the exterior of the curve. This results in increased radiation from the external edge of the curve and increased reflection back to the input waveguide 100 due to a mismatch in the field distributions. Offsetting the input and output waveguides 100 towards the outside of the curve aligns the extrema of their optical fields more closely with that of the optical field in the curved section 108, which helps to reduce, even minimise both the radiation and the reflection. The tighter the radius R, the greater the radiation from the exterior of the curve, so the offset $O_1$ is related to the radius R and the optimum values would have to be determined according to the specific application.

It should also be noted that it is not necessary to connect the input and output waveguides 100 directly to the curve. As shown in FIG. 31, it is possible to have a short spacing $d_1$ between the end of the input waveguide 100 and the adjacent end of the curved section 108. Generally speaking, that spacing $d_1$ should be minimised, even zero, and probably no more than a few optical wavelengths. A similar offset $O_2$ and spacing $d_2$ could be provided between the bend 108 and the output straight waveguide 100.

Although FIG. 31 shows no gradual transition between the straight waveguides 100 at the input and output and the ends of the curved section 108, it is envisaged that, in practice, a more gradual offset could be provided so as to reduce edge effects at the corners.

Figure 32:
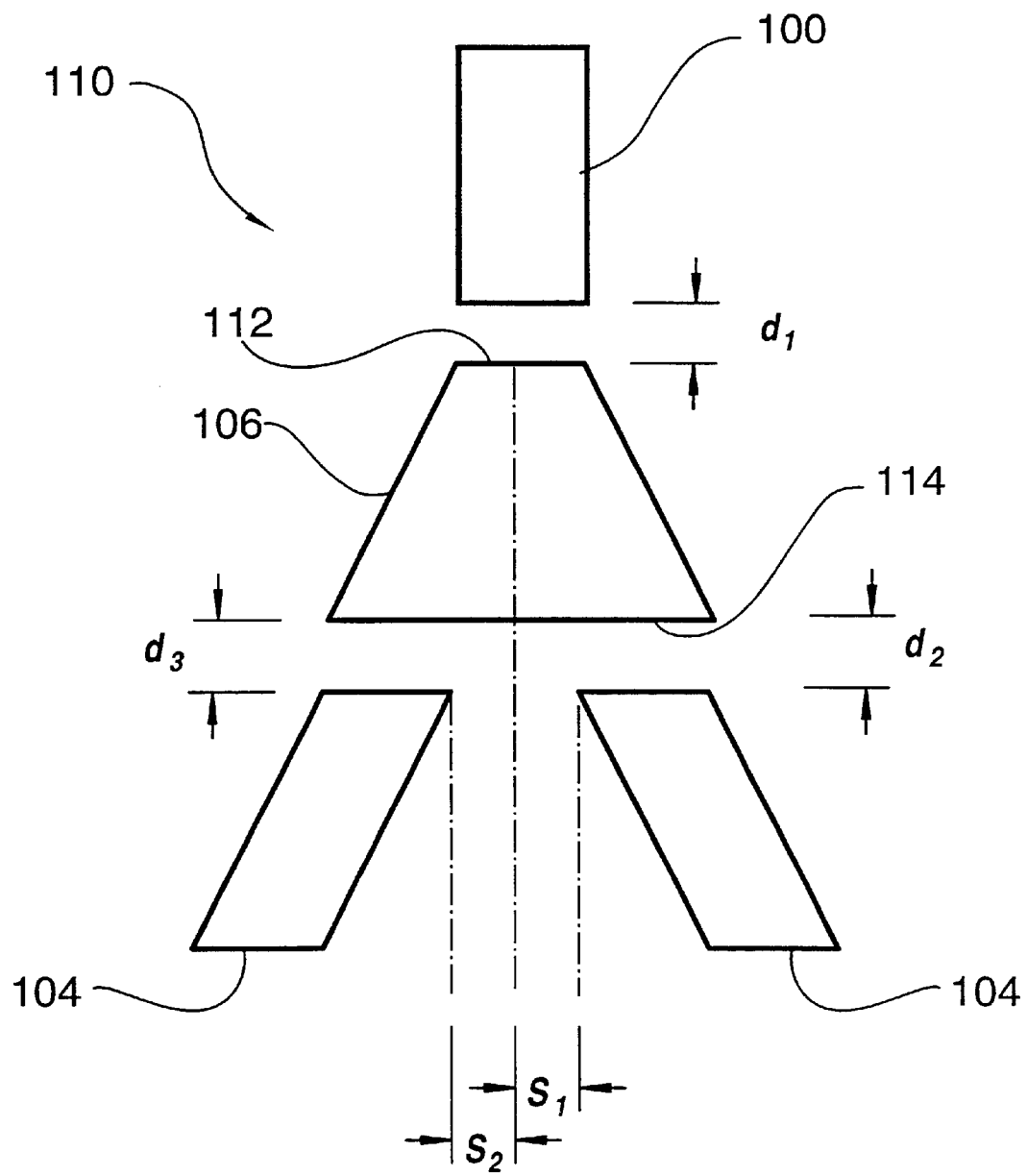
FIG. 32 is a plan view of a two-way splitter/combiner formed by a combination of three straight waveguide sections and one tapered waveguide section.

FIG. 32 shows a two-way power splitter 110 formed from a trapezoidal section 106 with a straight section 100 coupled to its narrower end 112 and two angled sections 104 coupled side-by-side to its wider end 114. The distances between the input waveguide 100 and the narrower end 112 of the tapered section 106, and between the output waveguides 104 and the wider end 114 of the tapered section 106, $d_1$, $d_2$ and $d_3$, respectively, should be minimised. The angle between the output waveguides 104 is usually in the range of 0.5 to 10 degrees and their widths are usually similar. The offsets $S_1$ and $S_2$ between the output waveguides and the longitudinal centre line of the trapezoidal section 106 preferably are set to zero, but could be non-zero, if desired, and vary in size. Ideally, however, the output sections 104 should together be equal in width to the wider end 114.

Offset $S_1$ need not be equal to offset $S_2$ but it is preferable that both are set to zero. The widths of the output sections 104 can be adjusted to vary the ratio of the output powers. The dimensions of the centre tapered section 106 are usually adjusted to minimise input and output reflections and radiation losses in the region between the output sections 104.

It should also be noted that the centre tapered section 106 could have angles that vary according to application and need not be symmetrical.

It is envisaged that the tapered section 106 could be replaced by a rectangular transition section having a width broader than the width of the input waveguide 100 so that the transition section favoured multimode propagation causing constructive/destructive interference patterns throughout its length. The length could be selected so that, at the output end of the rectangular transition section, the constructive portions of the interference pattern would be coupled into the different waveguides establishing, in effect, a 1-to-N power split. Such a splitter then would be termed a multimode interferometer-based power divider.

It should be appreciated that the device shown in FIG. 32 could also be used as a combiner. In this usage, the light would be injected into the waveguide sections 104 and combined by the tapered centre section 106 to form the output wave which would emerge from the straight waveguide section 100.

In either the Y splitter or the interferometer-based power divider, the number of arms or limbs 104 at the output could be far more than the two that are shown in FIG. 32.

It is also feasible to have a plurality of input waveguides. This would enable an N×N divider to be constructed. The dimensions of the transition section 106 then would be controlled according to the type of splitting/combining required.

Figure 33:
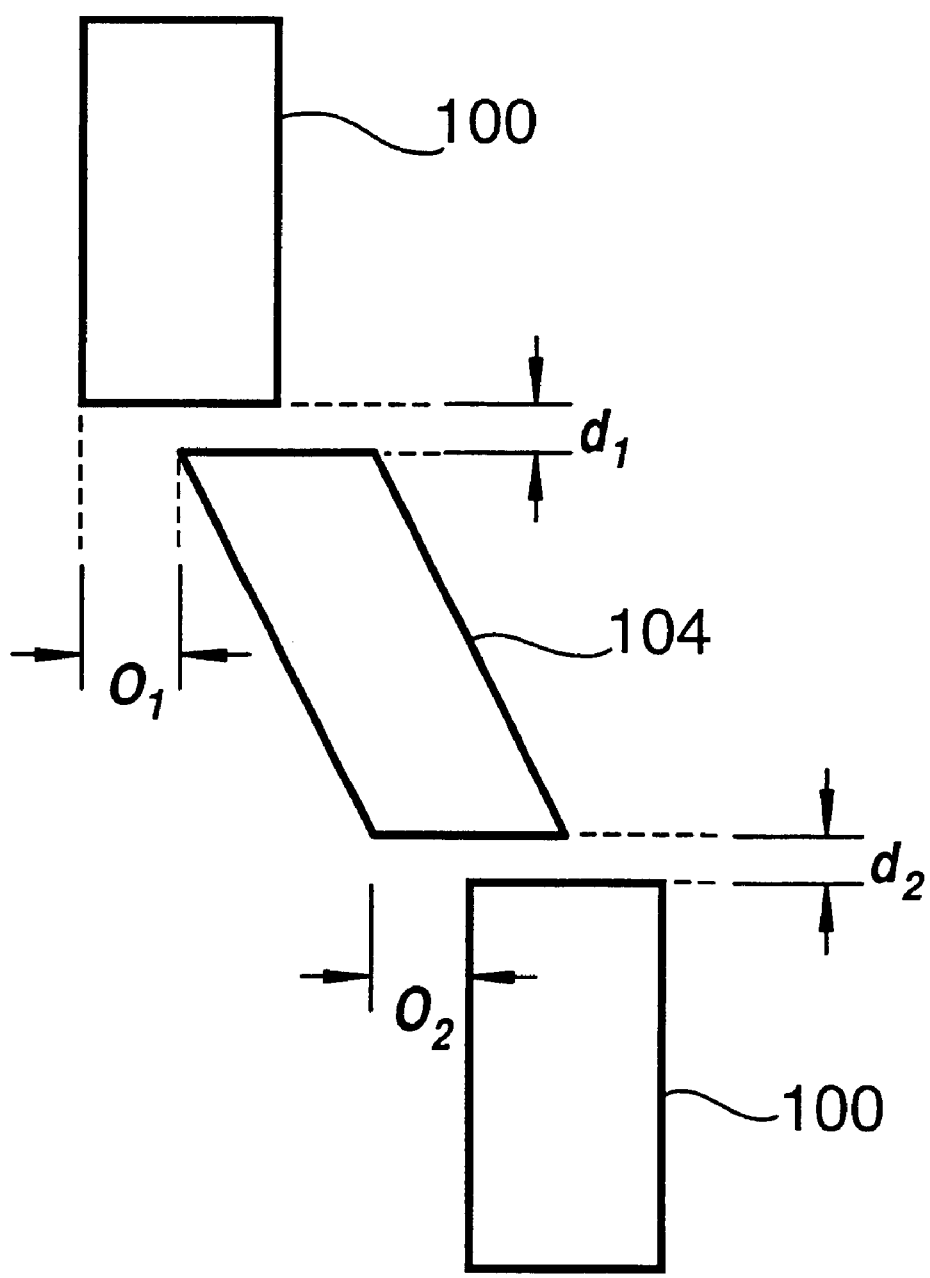
FIG. 33 is a plan view of an angled junction using a slanted section.

As shown in FIG. 33, an angled waveguide section 104 may be used to form an intersection between two straight waveguide section 100, with the dimensions adjusted for the particular application. It should be noted that, as shown in FIG. 32, the two straight sections 100 are offset laterally away from each other by the distances $O_1$ and $O_2$, respectively, which would be selected to optimise the couplings by reducing radiation and reflection losses, in the manner discussed with reference to FIG. 31. The angle of the trapezoidal section 104 will be a factor in determining the best values for the offsets $O_1$ and $O_2$. The sections 100 and 104 need not be connected directly together, but could be spaced by the distances $d_1$ and $d_2$ and/or coupled by a suitable transition piece that would make the junction more gradual (i.e., the change of direction would be more gradual).

The embodiments of FIGS. 31 and 32 illustrate a general principle of aligning optical fields, conveniently by offsets, wherever there is a transition or change of direction of the optical wave and an inclination relative to the original path, which can cause radiation and reflection if field extrema are misaligned. Such offsets would be applied whether the direction-changing sections were straight or curved.

Figure 34:
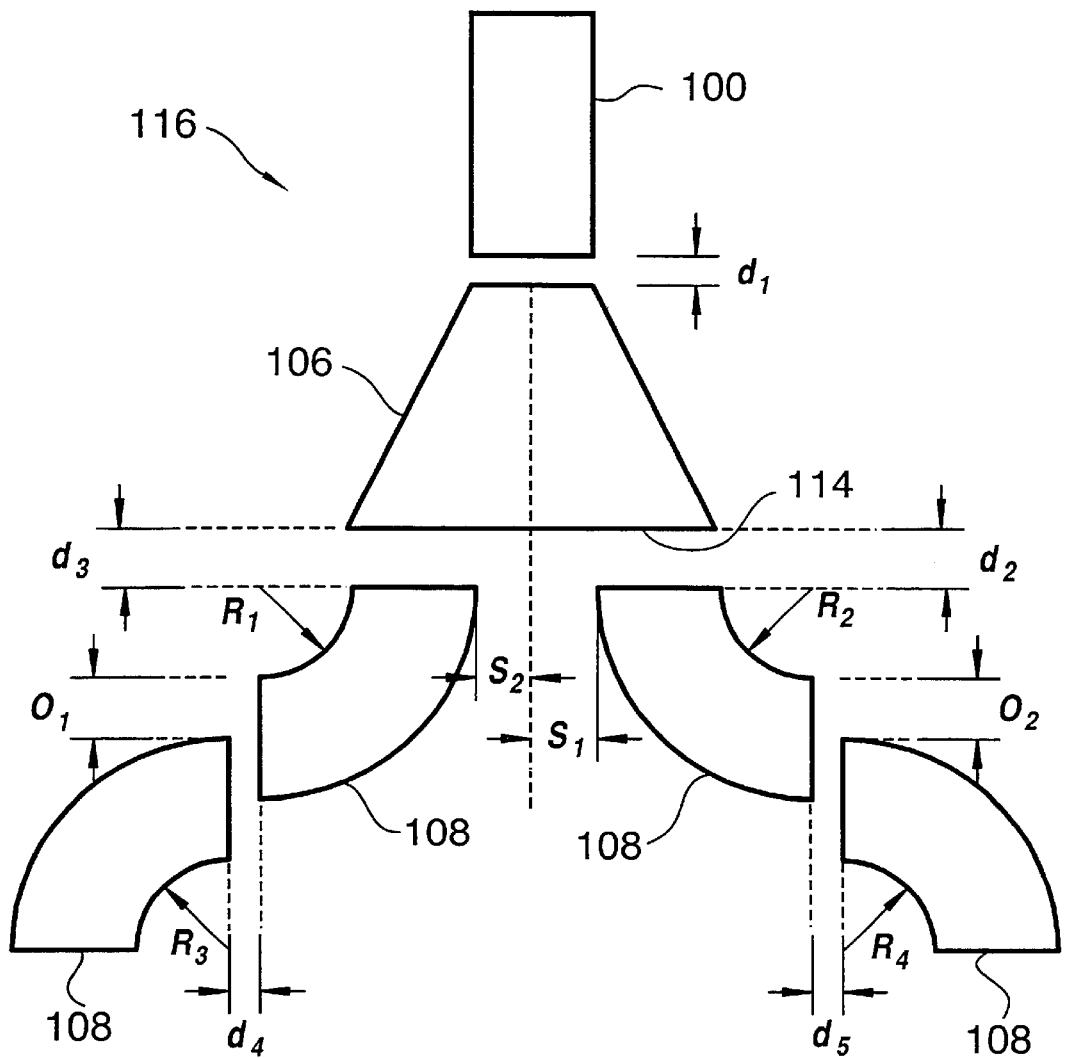
FIG. 34 is a plan view of a power divider formed by a trapezoidal section and pairs of concatenated bends.

As illustrated in FIG. 34, a power divider 116 can also be implemented using a pair of concatenated curved sections 108 instead of each of the angled sections 104 in the splitter 110 shown in FIG. 32. As shown in FIG. 34, in each pair, the curved section nearest to the wider end 114 of the tapered section 106 curves outwards from the longitudinal centre line of the tapered section 106 while the other curved section curves oppositely so that they form an "S" bend. Also, the curved sections in each pair are offset by distance $O_1$ or $O_2$ one relative to the other for the reasons discussed with respect to the bend 108 shown in FIG. 31. Other observations made regarding the power divider and the curved section disclosed in FIGS. 31 and 32 respectively, also hold in this case.

Figure 35:
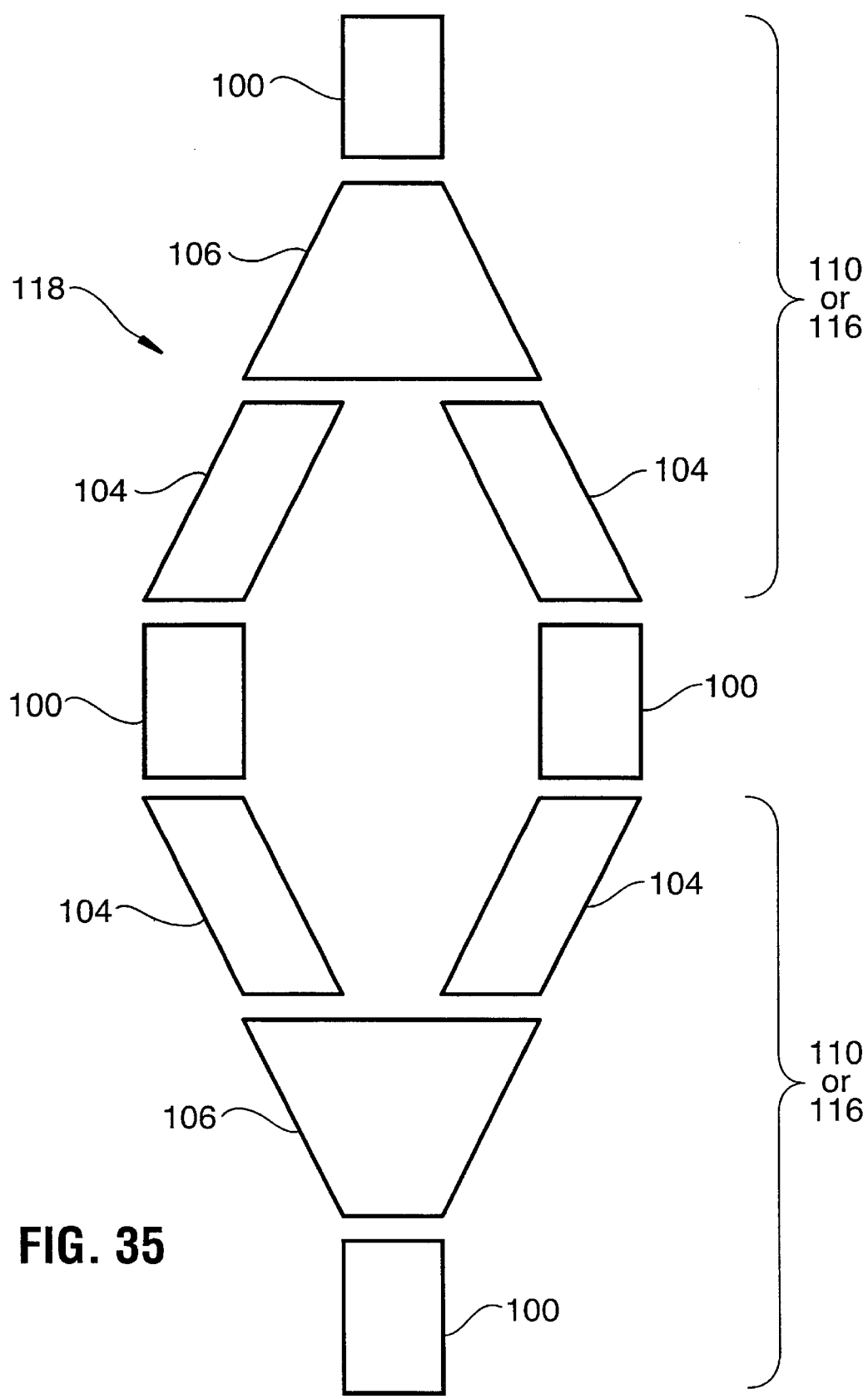
FIG. 35 is a plan view of a Mach-Zehnder interferometer formed using a combination of the waveguide sections.

FIG. 35 illustrates a Mach-Zehnder interferometer 118 created by interconnecting two power splitters 110 as disclosed in FIG. 32. Of course, either or both of them could be replaced by the power splitter 116 shown in FIG. 34. Light injected into one of the ports, i.e. the straight section 100 of one power splitter 110/116, is split into equal amplitude and phase components that travel along the angled arms 104 of the splitter, are coupled by straight sections 100 into the corresponding arms of the other splitter, and then are recombined to form the output wave.

If the insertion phase along one or both arms of the device is modified, then destructive interference between the re-combined waves can be induced. This induced destructive interference is the basis of a device that can be used to modulate the intensity of an input optical wave. The lengths of the arms 100 are usually adjusted such that the phase difference in the recombined waves is 180 degrees for a particular relative change in insertion phase per unit length along the arms. The structure will thus be optically long if the mechanism used to modify the per unit length insertion phase is weak (or optically short if the mechanism is strong).

FIG. 36(a) illustrates a modulator 120 based on the Mach-Zehnder 118 disclosed in FIG. 35. As illustrated also in FIG. 36(b), parallel plate electrodes 122 and 124 are disposed above and below, respectively, each of the strips 100 which interconnects two angled sections 104, and spaced from it, by the dielectric material, at a distance large enough that optical coupling to the electrodes is negligible. The electrodes are connected in common to one terminal of a voltage source 126, and the intervening strip 100 is connected using a minimally invasive contact to the other terminal. Variation of the voltage V applied by source 126 effects the modulating action. According to the plasma model for the strip 100, a change in the carrier density of the latter (due to charging +2Q or −2Q) causes a change in its permittivity, which in turn causes a change in the insertion phase of the arm. (The change induced in the permittivity is described by the plasma model representing the guiding strip 100 at the operating wavelength of interest. Such model is well known to those of ordinary skill in the art and so will not be described further herein. For more information the reader is directed to reference [21], for example.) This change is sufficient to induce destructive interference when the waves in both arms re-combine at the output combiner.

FIG. 36(c) illustrates an alternative connection arrangement in which the two plate electrodes 122 and 124 are connected to respective ones of the terminals of the voltage source 126. In this case, the dielectric material used as the background of the waveguide is electro-optic (LiNbO$_3$, a polymer, . . . ). In this instance, the applied voltage V effects a change in the permittivity of the background dielectric, thus changing the insertion phase along the arm. This change is sufficient to induce destructive interference when the waves in both arms re-combine at the output combiner.

It will be noted that, in FIG. 36(a), one voltage source supplies the voltage $V_1$ while the other supplies the voltage $V_2$. $V_1$ and $V_2$ may or may not be equal.

For both cases described above, it is possible to apply voltages in opposite polarity to both arms of the structure. This effects an increase in the insertion phase of one arm and a decrease in the insertion phase of the other arm of the Mach-Zehnder (or vice versa), thus reducing the magnitude of the voltage or the length of the structure required to achieve a desirable degree of destructive interference at the output.

Also, it is possible to provide electrodes 122 and 124 and a source 126 for only one of the intervening strips 100 in order to provide the required interference.

It should be appreciated that other electrode structures could be used to apply the necessary voltages. For example, the electrodes 122 and 124 could be coplanar with the intervening strip 100, one on each side of it. By carefully laying out the electrodes as a microwave waveguide, a high frequency modulator (capable of modulation rates in excess of 10 Gbit/s) can be achieved.

Figure 37:
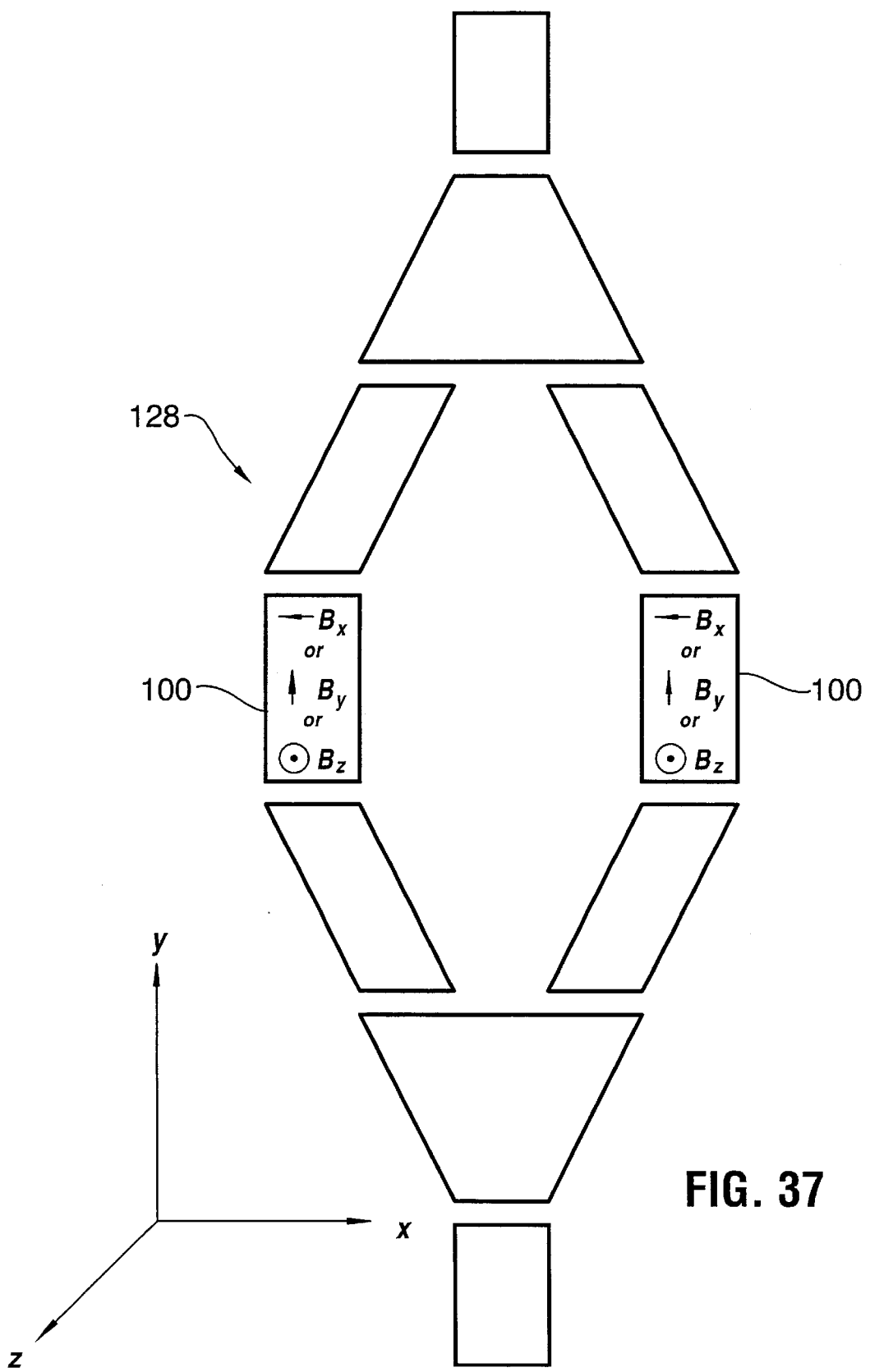
FIG. 37 is a plan view of a modulator using the Mach-Zehnder waveguide structure of FIG. 35 and illustrating magnetic field control.

FIG. 37 illustrates an alternative implementation of a Mach-Zehnder 128 which has the same set of waveguides as that shown in FIG. 35 but which makes use of magnetic fields B applied to either or both of the middle straight section arms to induce a change in the permittivity tensor describing the strips. (The change induced in the tensor is described by the plasma model representing the guiding strip at the operating wavelength of interest. Such model is well known to those of ordinary skill in the art and so will not be described further herein. For more information the reader is directed to reference [21], for example.) The change induced in the permittivity tensor will induce a change in the insertion phase of either or both arms thus inducing a relative phase difference between the light passing in the arms and generating destructive interference when the waves recombine at the output combiner. Modulating the magnetic field thus modulates the intensity of the light transmitted through the device. The magnetic field B can be made to originate from current-carrying wires or coils disposed around the arms 100 in such a manner as to create the magnetic field in the desired orientation and intensity in the optical waveguides. The magnetic field may have one or all of the orientations shown, $B_x$, $B_y$, or $B_z$ or their opposites. The wires or coils could be fabricated using plated via holes and printed lines or other conductors in known manner. Alternatively, the field could be provided by an external source, such as a solenoid or toroid having poles on one or both sides of the strip.

Figure 38:
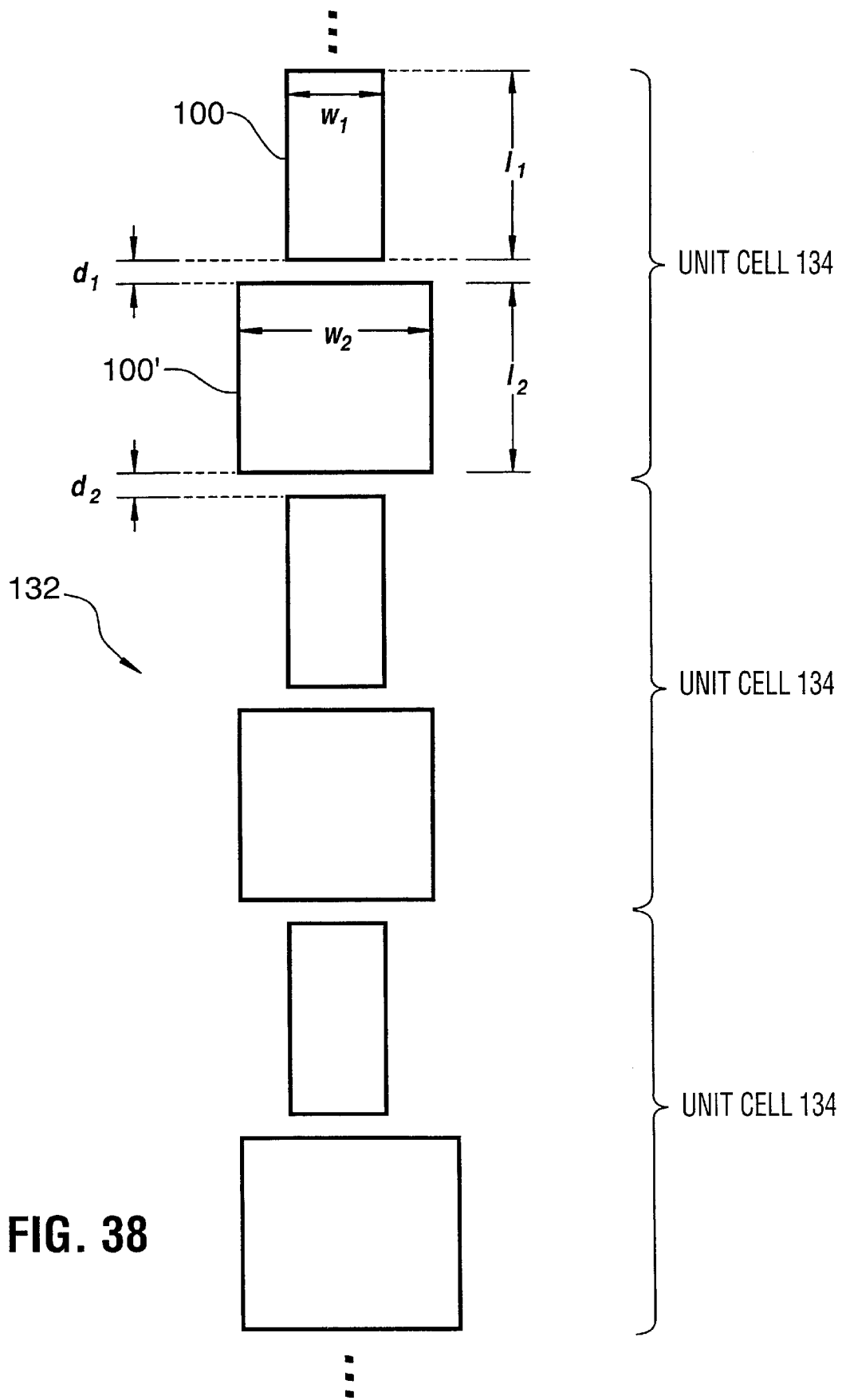
FIG. 38 is a plan view of a periodic structure formed by a series of unit cells each comprising two waveguide sections having different widths and lengths.

FIG. 38 illustrates a periodic waveguide structure 132 comprising a series of unit cells 134, where each cell 134 comprises two rectangular waveguides 100 and 100' having different lengths $l_1$ and $l_2$ and widths $w_1$ and $w_2$, respectively. The dimensions of the waveguides in each unit cell 134, the spacing $d_1$ therebetween, the number of unit cells, and the spacings $d_2$ between cells are adjusted such that reflection occurs at a desired operating wavelength or over a desired operating bandwidth for an optical signal propagating along the grating axis, i.e. the longitudinal axis of the array of cells 134. The period of the periodic structure, i.e. the length of each unit cell, $l_1+l_2+d_1+d_2$, can be made optically long, such that a long-period periodic structure is obtained. The dimensions of the elements 100, 100' in each unit cell 134 can also be made to change along the direction of the periodic structure in order to implement a prescribed transfer function (like in a chirped periodic structure).

Figure 39:
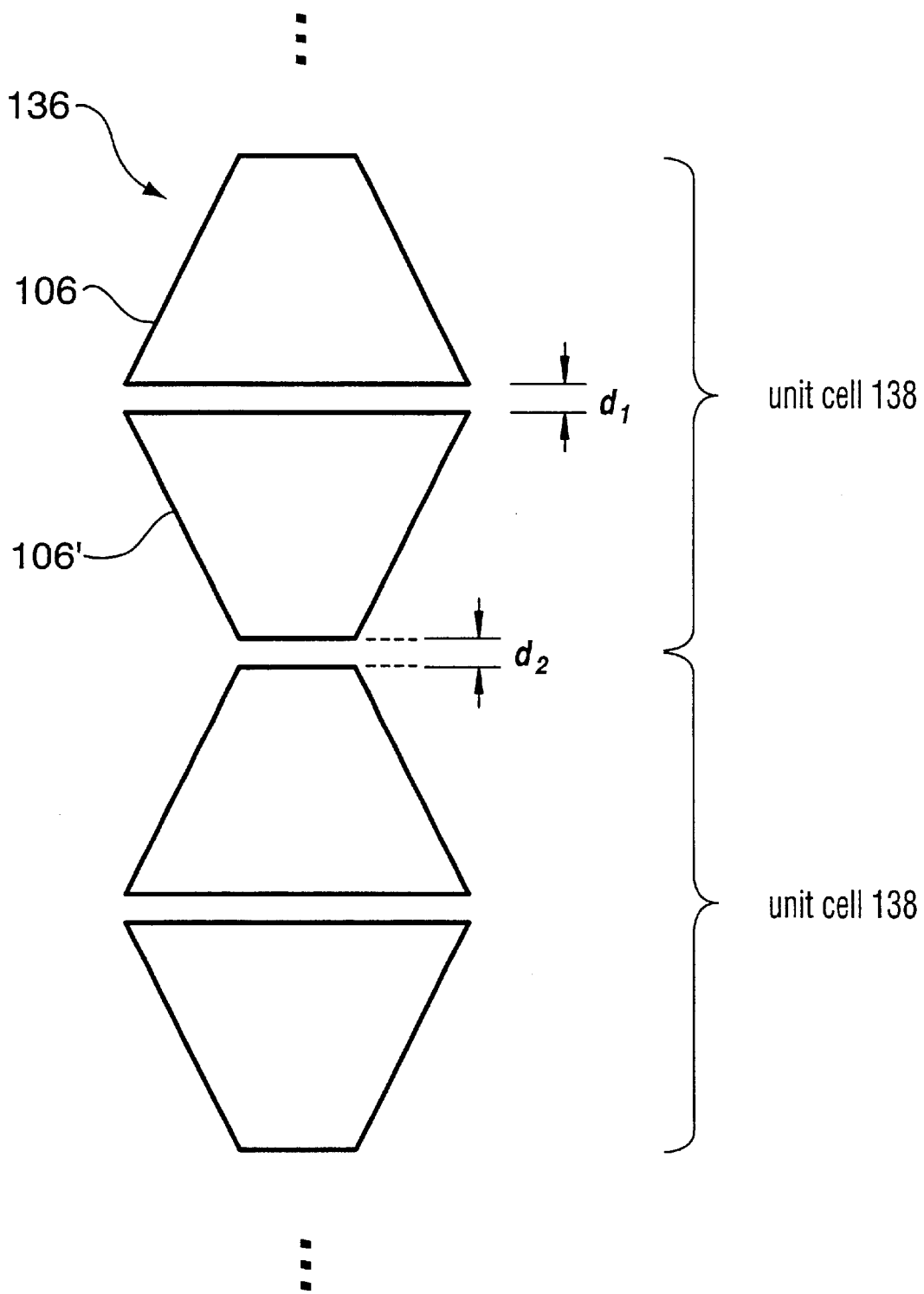
FIG. 39 is a plan view of a periodic waveguide structure formed by a series of unit cells each comprising two opposed trapezoidal waveguide sections.
Figure 40:
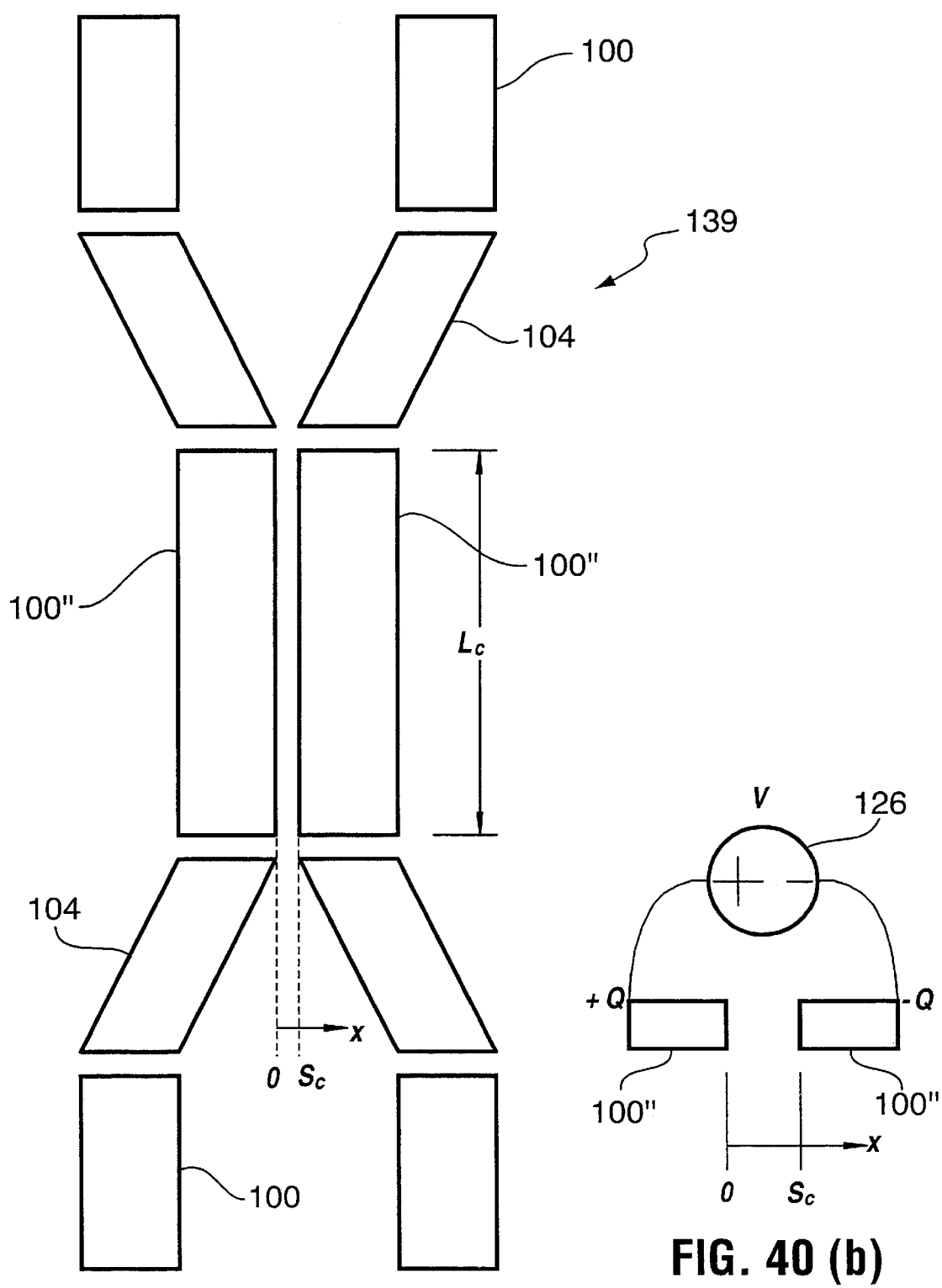
FIG. 40(a) is a plan view of an edge coupler formed by two parallel strips of straight waveguide with various other waveguides for coupling signals to and from them.
FIG. 40(b) is an inset diagram illustrating a way of applying a modulation control voltage.
Figure 41:
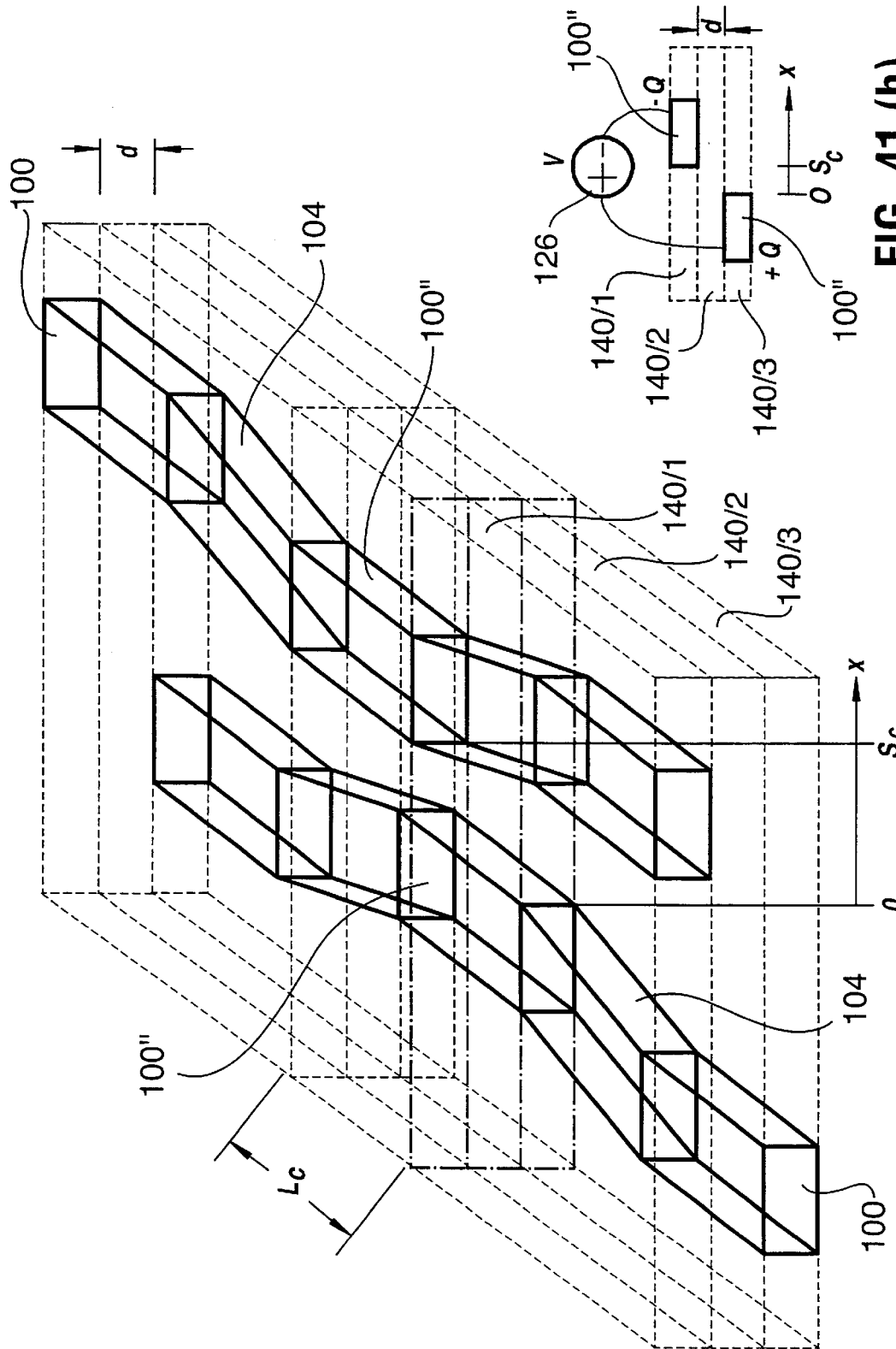
FIG. 41(a) is a perspective view of an edge coupler in which the parallel strips are not co-planar.
FIG. 41(b) is an inset diagram illustrating a way of applying a modulation control voltage.

It should be noted that the waveguides 100, 100' in each cell need not be rectangular, but a variety of other shapes could be used. For example, FIG. 39 illustrates a portion, specifically two unit cells 138 only, of an alternative periodic structure 136 in which each unit cell 138 comprises two of the trapezoidal waveguide sections 106, 106' like that described with reference to FIG. 30, with their wider edges opposed.

As another alternative, the trapezoidal waveguides 106/106' could be replaced by the transition sections 130, shown in FIG. 30, with or without spacings $d_1$ and $d_2$, to form a periodic structure having sinusoidally-varying sides. It should be noted that these periodic structures are merely examples and not intended to provide an exhaustive detailing of all possibilities; various other periodic structures could be formed from unit cells comprised of all sorts of different shapes and sizes of elements.

It should be noted that voltages can be applied to some or all of the strips in order to establish charges on the strips of the unit cells, which would change their permittivity and thus vary the optical transfer function of the periodic structures. If the dielectric material surrounding the strip is electro-optic, then the applied voltages would also change the permittivity of the dielectric, which also contributes to changing of the optical transfer function of the periodic structure.

Photonic bandgap structures can be created by placing two-dimensional arrays of unit cells (comprised of strips of various shapes and sizes) over numerous planes separated by dielectric material. The size and shape of the strips are determined such that stop bands in the optical spectrum appear at desired spectral locations.

FIG. 40(a) illustrates an edge coupler 139 created by placing two strips 100" parallel to each other and in close proximity over a certain length. The separation $S_t$ between the strips 100" could be from 1 $\mu$m (or less) to 20 $\mu$m and the coupling length $L_c$ could be in the range of a few microns to a few dozen millimeters depending on the separation $S_c$, width and thickness of the strips 100", the materials used, the operating wavelength, and the level of coupling desired. Such a positioning of the strips 100" is termed "edge coupling".

The gaps between the input and output of the waveguide sections shown would ideally be set to zero and a lateral offset provided between sections where a change of direction is involved. Curved sections could be used instead of the sections 104, 100 and 100" shown in FIG. 40(a).

Although only two strips 100" are shown in the coupled section, it should be understood that more than two strips can be coupled together to create an N×N coupler.

As illustrated in FIG. 40(b) a voltage can be applied to the two edge-coupled sections 100" via minimally invasive electrical contacts. FIG. 40(b) shows a voltage source 126 connected directly to the sections 100" but, if the sections 100, 104 and 100" in each arm are connected together electrically, the source 126 could be connected to one of the other sections in the same arm. Applying a voltage in such a manner charges the arms of the coupler, which, according to the plasma model for the waveguide, changes its permittivity. If, in addition, the dielectric material placed between the two waveguides 100 is electro-optic, then a change in the background permittivity will also be effected as a result of the applied voltage. The first effect is sufficient to change the coupling characteristics of the structure but, if an electro-optic dielectric is also used, as suggested, then both effects will be present, allowing the coupling characteristics to be modified by applying a lower voltage.

FIGS. 41(a) and 41(b) illustrate coupled waveguides similar to those shown in FIG. 40(a) but placed on separate layers in a substrate having several layers 140/1, 140/2 and 140/3. The strips could be placed one directly above the other with a thin region of dielectric of thickness d placed between them. Such positioning of the strips is termed "broadside coupling". The coupled guides can also be offset from broadside a distance $S_c$, as shown in FIGS. 41(a) and 41(b). The strips could be separated by d=1 $\mu$m (or less) to 20 $\mu$m, the coupling length could be in the range of a few microns to a few dozens millimeters and the separation $S_c$ could be in the range of −20 to +20 $\mu$m, depending on the width and thickness of the strips, the materials used and the level of coupling desired. (The negative indicates an overlap condition).

As before, curved sections could be used instead of the straight and angled sections shown in FIG. 41(a).

Gaps can be introduced longitudinally between the segments of strip if desired and a lateral offset between the straight and angled (or curved) sections could be introduced.

Though only two strips are shown in the coupled section, it should be understood that a plurality of strips can be coupled together on a layer and/or over many layers to create an N×N coupler.

As shown in FIG. 41(b), a voltage source 126 could be connected directly or indirectly to the middle (coupled) sections 100" in a similar manner to that shown in FIG. 40(b).

Figure 42:
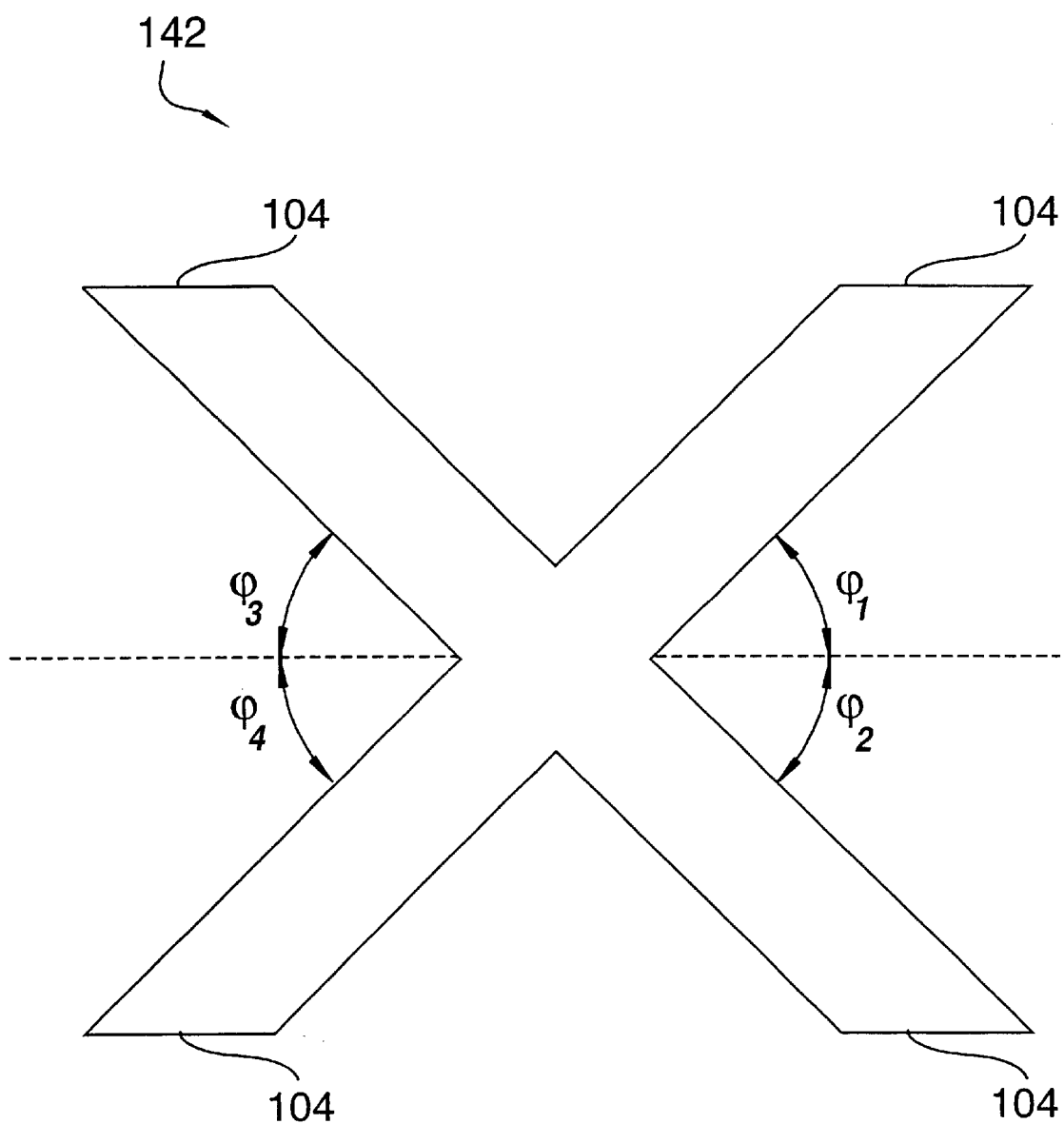
FIG. 42 is a plan view of an intersection formed by four sections of waveguide.

As illustrated in FIG. 42, an intersection 142 can be created by connecting together respective ends of four of the angled waveguide sections 104, their distal ends providing input and output ports for the device. When light is applied to one of the ports, a prescribed ratio of optical power emerges from the output ports at the opposite side of the intersection. The angles $\phi_1 \ldots \phi_4$ can be set such that optical power input into one of the ports emerges from the port directly opposite, with negligible power transmitted out of the other ports. Any symmetry of the structure shown is appropriate.

Various other modifications and substitutions are possible without departing from the scope of the present invention. For example, although the waveguide structure shown in FIGS. 1(a) and 1(b), and implicitly those shown in other Figures, have a single homogeneous dielectric surrounding a thin metal film, it would be possible to sandwich the metal film between two slabs of different dielectric material; or at the junction between four slabs of different dielectric material. Moreover, the multilayer dielectric material(s) illustrated in FIG. 41(a) could be used for other devices too. Also, the thin metal film could be replaced by some other conductive material or a highly n- or p-doped semiconductor. It is also envisaged that the conductive film, whether metal or other material, could be multi-layered.

Specific Embodiments of Modulation and Switching Devices

Modulation and switching devices will now be described which make use of the fact that an asymmetry induced in optical waveguiding structures having as a guiding element a thin narrow metal film may inhibit propagation of the main long-ranging purely bound plasmon-polariton mode supported.

The asymmetry in the structure can be in the dielectrics surrounding the metal film. In this case the permittivity, permeability or the dimensions of the dielectrics surrounding the strip can be different. A noteworthy case is where the dielectrics above and below the metal strip have different permittivities, in a manner similar to that shown in FIG. 17(a).

A dielectric material exhibiting an electro-optic, magneto-optic, thermo-optic, or piezo-optic effect can be used as the surrounding dielectric medium. The modulation and switching devices make use of an external stimulus to induce or enhance the asymmetry in the dielectrics of the structure.

Figure 43:
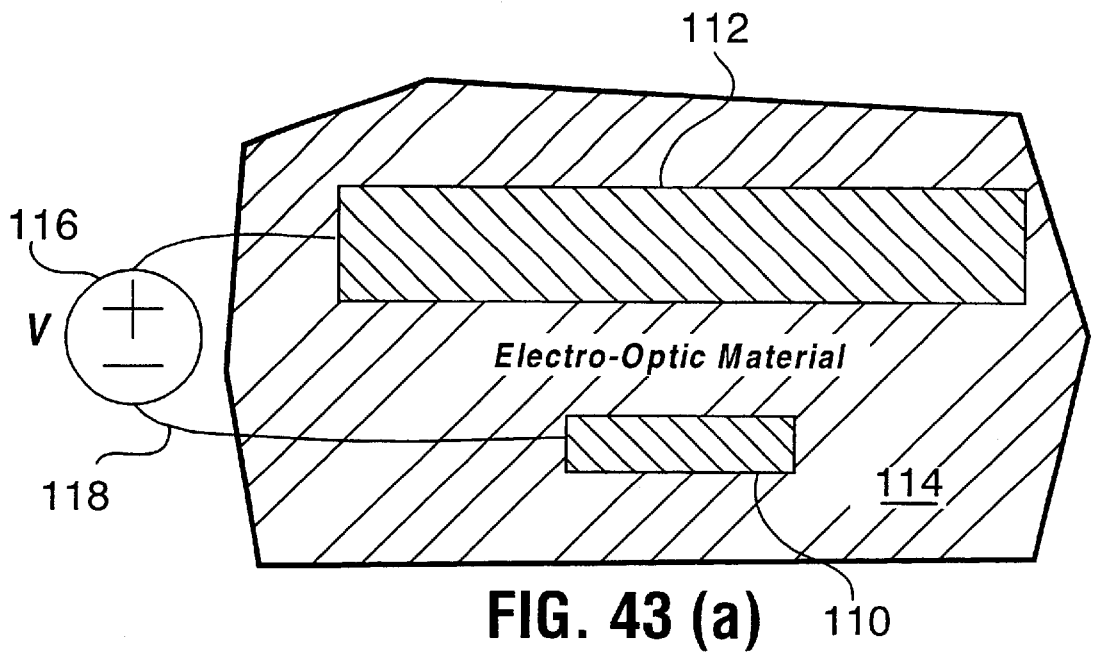
FIGS. 43(a) and 43(b) are a schematic front view and corresponding top plan view of an electro-optic modulator employing the waveguide structure of FIG. 17(a)
Figure 43:
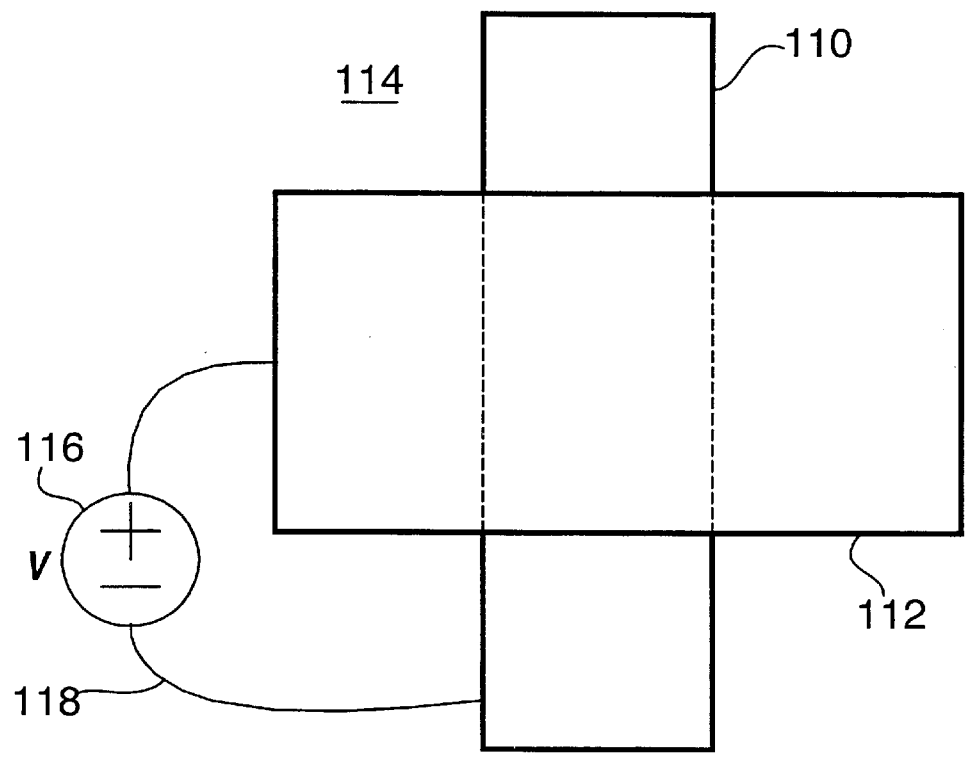

FIGS. 43(a) and 43(b) depict an electro-optic modulator comprising two metal strips 110 and 112 surrounded by a dielectric 114 exhibiting an electro-optic effect. Such a dielectric has a permittivity that varies with the strength of an applied electric field. The effect can be first order in the electric field, in which case it is termed the Pockels effect, or second order in the electric field (Kerr effect), or higher order. FIG. 43(a) shows the structure in cross-sectional view and FIG. 43(b) shows the structure in top view. The lower metal strip 110 and the surrounding dielectric 114 form the optical waveguide. The lower metal strip 110 is dimensioned such that a purely bound long-ranging plasmon-polariton wave is guided by the structure at the optical wavelength of interest, Since the "guiding" lower metal strip 110 comprises a metal, it is also used as an electrode and is connected to a voltage source 116 via a minimally invasive electrical contact 118 as shown. The second metal strip 112 is positioned above the lower metal strip 110 at a distance large enough that optical coupling between the strips is negligible. It is noted that the second strip also be placed below the waveguiding strip instead of above. The second strip acts as a second electrode.

The intensity of the optical signal output from the waveguide can be varied or modulated by varying the intensity of the voltage V applied by the source 116. When no voltage is applied, the waveguiding structure is symmetrical and supports a plasmon-polariton wave. When a voltage is applied, an asymmetry in the waveguiding structure is induced via the electro-optic effect present in the dielectric 114, and the propagation of the plasmon-polariton wave is inhibited. The degree of asymmetry induced may be large enough to completely cut-off the main purely bound long-ranging mode, thus enabling a very high modulation depth to be achieved. By carefully laying out the electrodes as a microwave waveguide, a high frequency modulator (capable of modulation rates in excess of 10 G bit/s) can be achieved.

Figure 44:
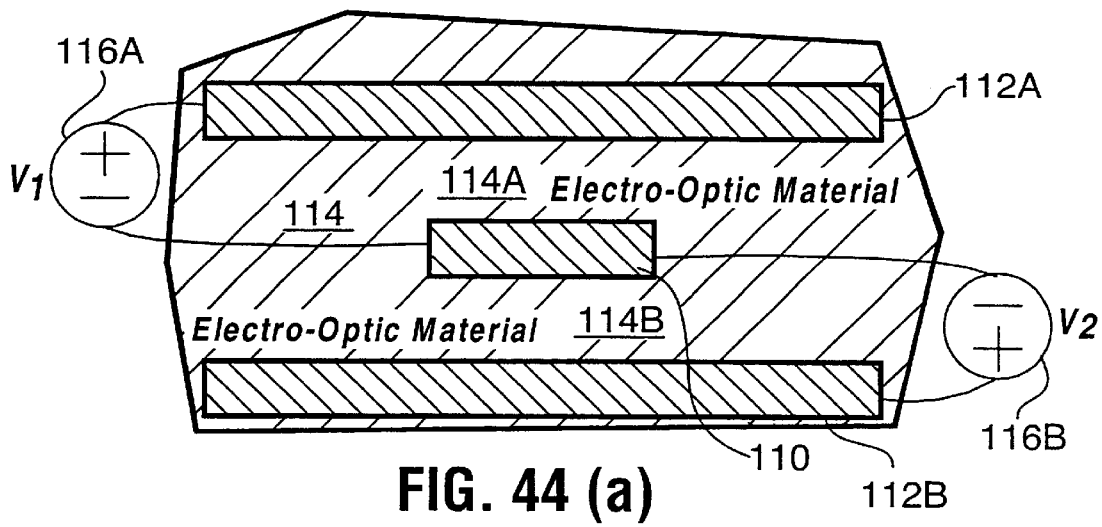
FIGS. 44(a) and 44(b) are a schematic front view and corresponding top view of an alternative electro-optic modulator also using the waveguide structure of FIG. 17(a)
FIG. 44(c) illustrates an alternative connection arrangement of the modulator of FIG. 44(a)
Figure 44:
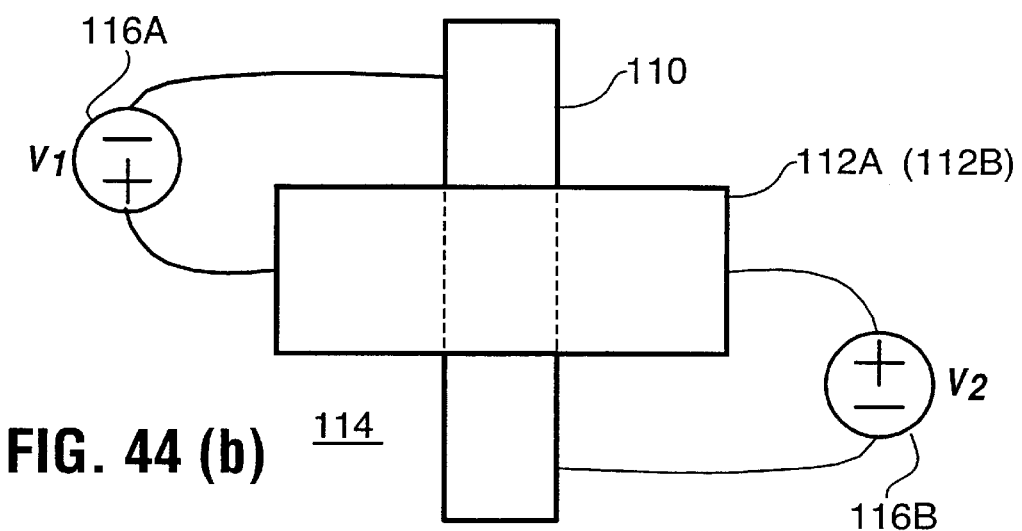
Figure 44:
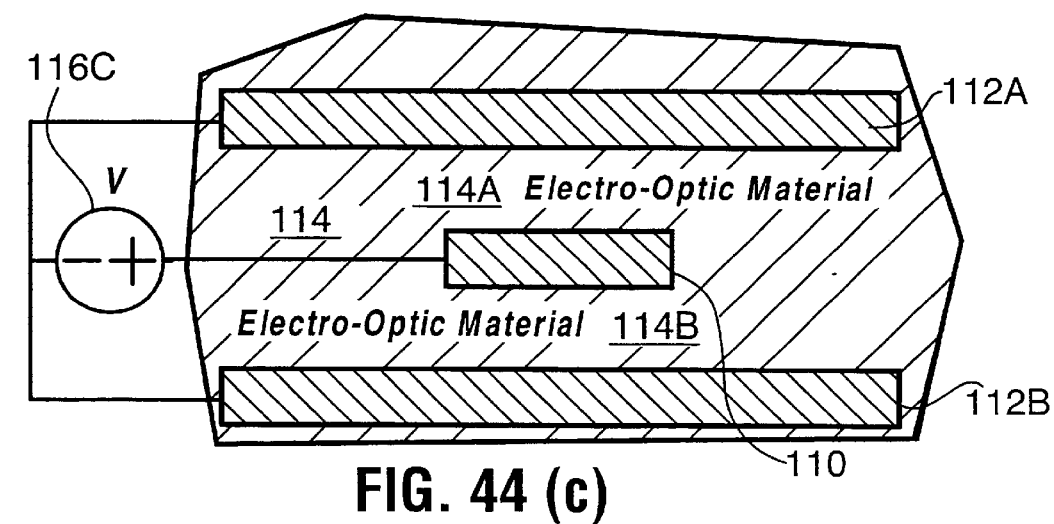

FIGS. 44(a) and 44(b) show an alternative design for an electro-optic modulator which is similar to that shown in FIG. 43(a) but comprises electrodes 112A and 112B placed above and below, respectively, the metal film 110 of the optical waveguide at such a distance that optical coupling between the strips is negligible. FIG. 44(a) shows the structure in cross-sectional view and FIG. 44(b) shows the structure in top view. A first voltage source 116A connected to the metal film 110 and the upper electrode 112A applies a first voltage $V_1$ between them. A second voltage source 116B connected to metal film 110 and lower electrode 112B applies a voltage $V_2$ between them. The voltages $V_1$ and $V_2$, which are variable, produce electric fields $E_1$ and $E_2$ in portions 114A and 114B of the dielectric material. The dielectric material used exhibits an electro-optic effect. The waveguide structure shown in FIG. 44(c) is similar in construction to that shown in FIG. 44(a) but only one voltage source 116C is used. The positive terminal (+) of the voltage source 116C is shown connected to metal film 110 while its negative terminal (−) is shown connected to both the upper electrode 112A and the lower electrode 112B. With this configuration, the electric fields $E_1$ and $E_2$ produced in the dielectric portions 114A and 114B, respectively, are in opposite directions. Thus, whereas, in the waveguide structure of FIG. 44(a), selecting appropriate values for the voltages $V_1$ and $V_2$ induces the desired asymmetry in the waveguide structure of FIG. 44(c), the asymmetry is induced by the relative direction of the electric field above and below the waveguiding strip 110, since the voltage V applied to the electrodes 112A and 112B produces electric fields acting in opposite directions in the portions 114A and 114B of the dielectric material.

The structures shown in FIGS. 44(a),(b) and (c) can operate to very high frequencies since a microwave transmission line (a stripline) is in effect created by the three metals.

Figure 45:
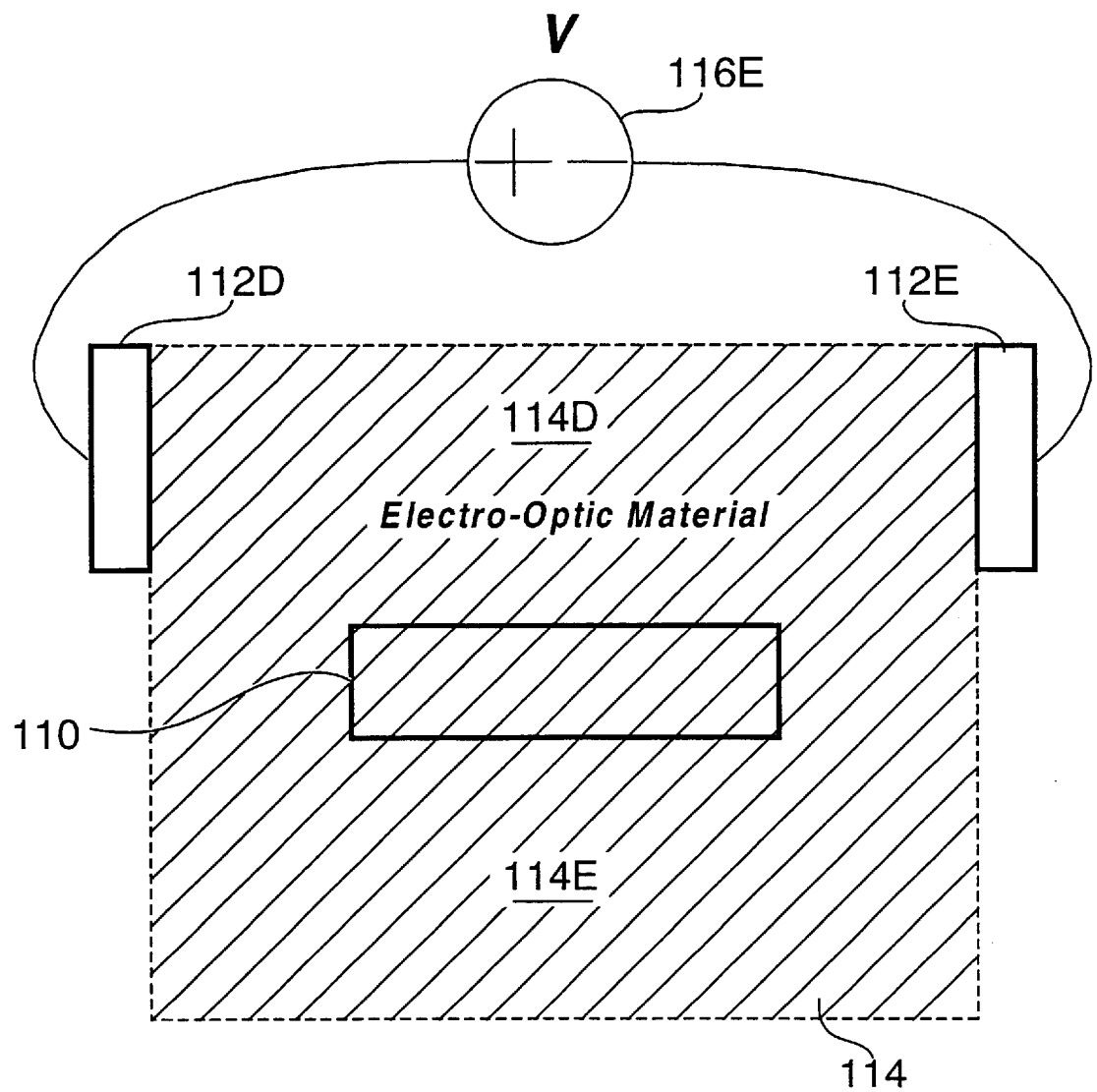
FIG. 45 is a schematic front view of a third embodiment of electro-optic modulator also using the waveguide structure of FIG. 17(a)

FIG. 45 shows in cross-sectional view yet another design for an electro-optic modulator. In this case, the metal film 110 is embedded in the middle of dielectric material 114 with first portion 114D above it and second portion 114E below it, Electrodes 112D and 112E are placed opposite lateral along opposite lateral edges, respectively, of the upper portion 114D of the dielectric 114 as shown and connected to voltage source 116E which applies a voltage between them to induce the desired asymmetry in the structure. Alternatively, the electrodes 112D, 112E could be placed laterally along the bottom portion 114E of the dielectric 114, the distinct portions of the dielectric material still providing the asymmetry being above and below the strip.

Figure 46:
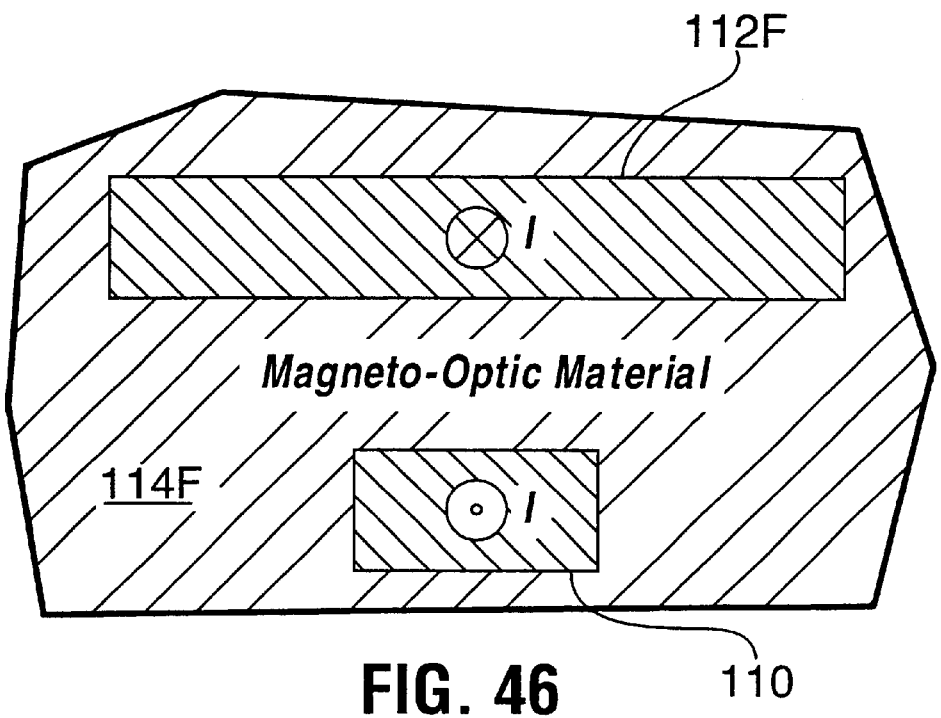
FIG. 46 is a schematic front view of a magneto-optic modulator also using the waveguide structure of FIG. 17(a)

FIG. 46 shows an example of a magneto-optic modulator wherein the waveguiding strip 110 and overlying electrode 112F are used to carry a current I in the opposite directions shown. The dielectric material surrounding the metal waveguide strip 110 exhibits a magneto-optic effect or is a ferrite. The magnetic fields generated by the current I add in the dielectric portion between the electrodes 110 and 112F and essentially cancel in the portions above the top electrode 112F and below the waveguide 110. The applied magnetic field thus induces the desired asymmetry in the waveguiding structure. The electrode 112F is placed far enough from the guiding strip 110 that optical coupling between the strips is negligible.

Figure 47:
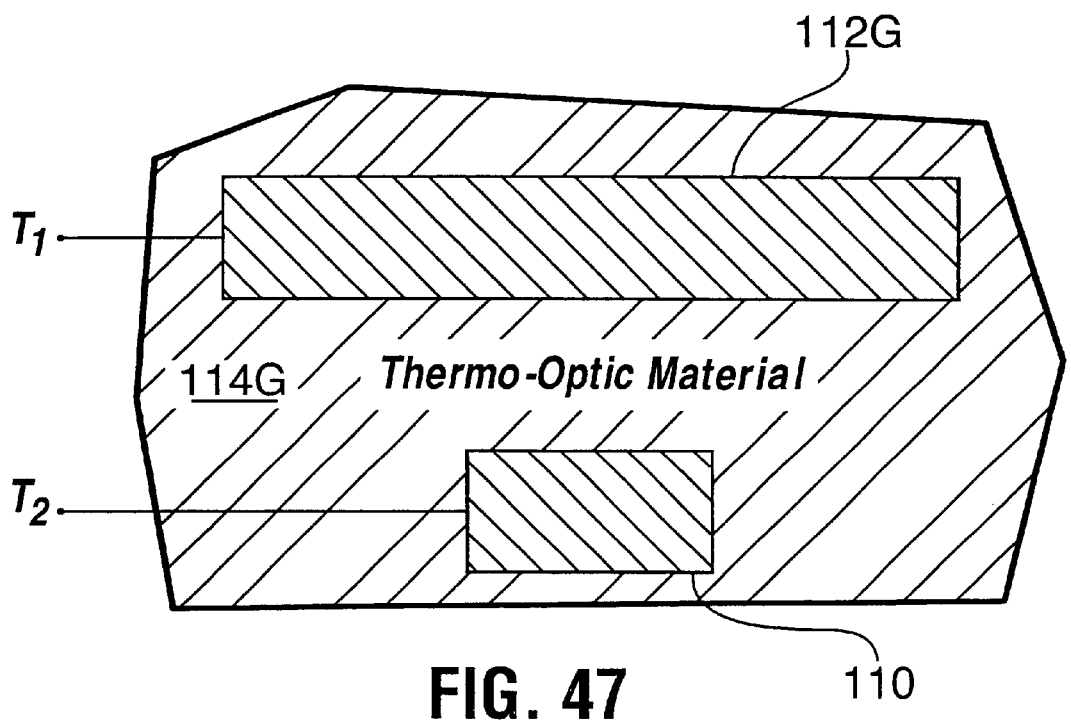
FIG. 47 is a schematic front view of a thermo-optic modulator also using the waveguide structure of FIG. 17(a)

FIG. 47 depicts a thermo-optic modulator wherein the waveguiding strip 110 and the overlying electrode 112G are maintained at temperatures $T_2$ and $T_3$ respectively. The dielectric material 114 surrounding the metal waveguide exhibits a thermo-optic effect. The temperature difference creates a thermal gradient in the dielectric portion 114G between the electrode 112G and the strip 110. The variation in the applied temperature thus induce the desired asymmetry in the waveguiding structure. The electrode 112G is placed far enough from the guiding strip 110 that optical coupling between the strips is negligible.

It should be appreciated that the modulator devices described above with reference to FIGS. 43(a) to 47 may also serve as variable optical attenuators with the attenuation being controlled via the external stimulus, i.e. voltage, current, temperature, which varies the electromagnetic property.

Figure 48:
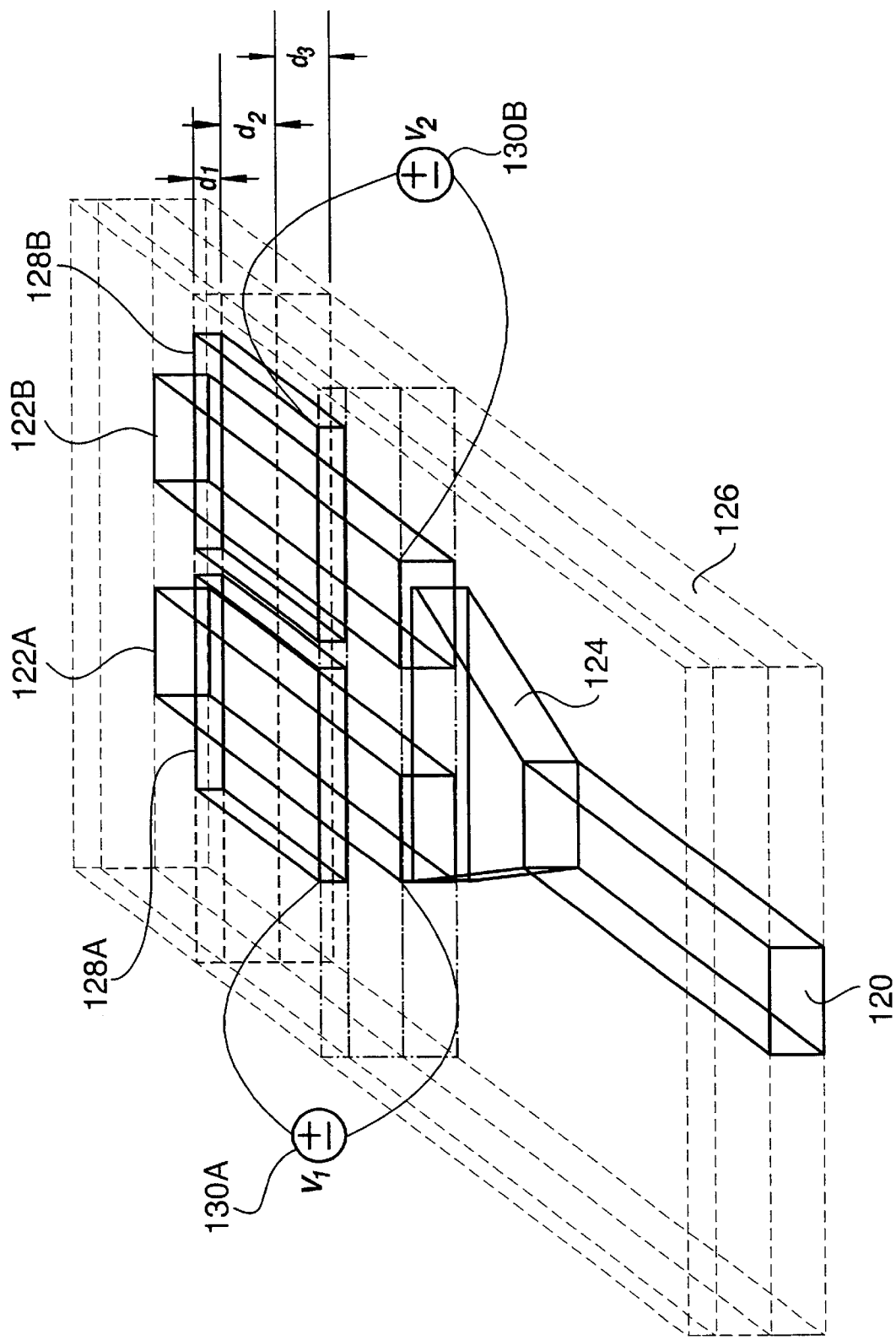
FIG. 48 is a schematic perspective view of an electro-optic switch also using the waveguide structure of FIG. 17(a)
Figure 49:
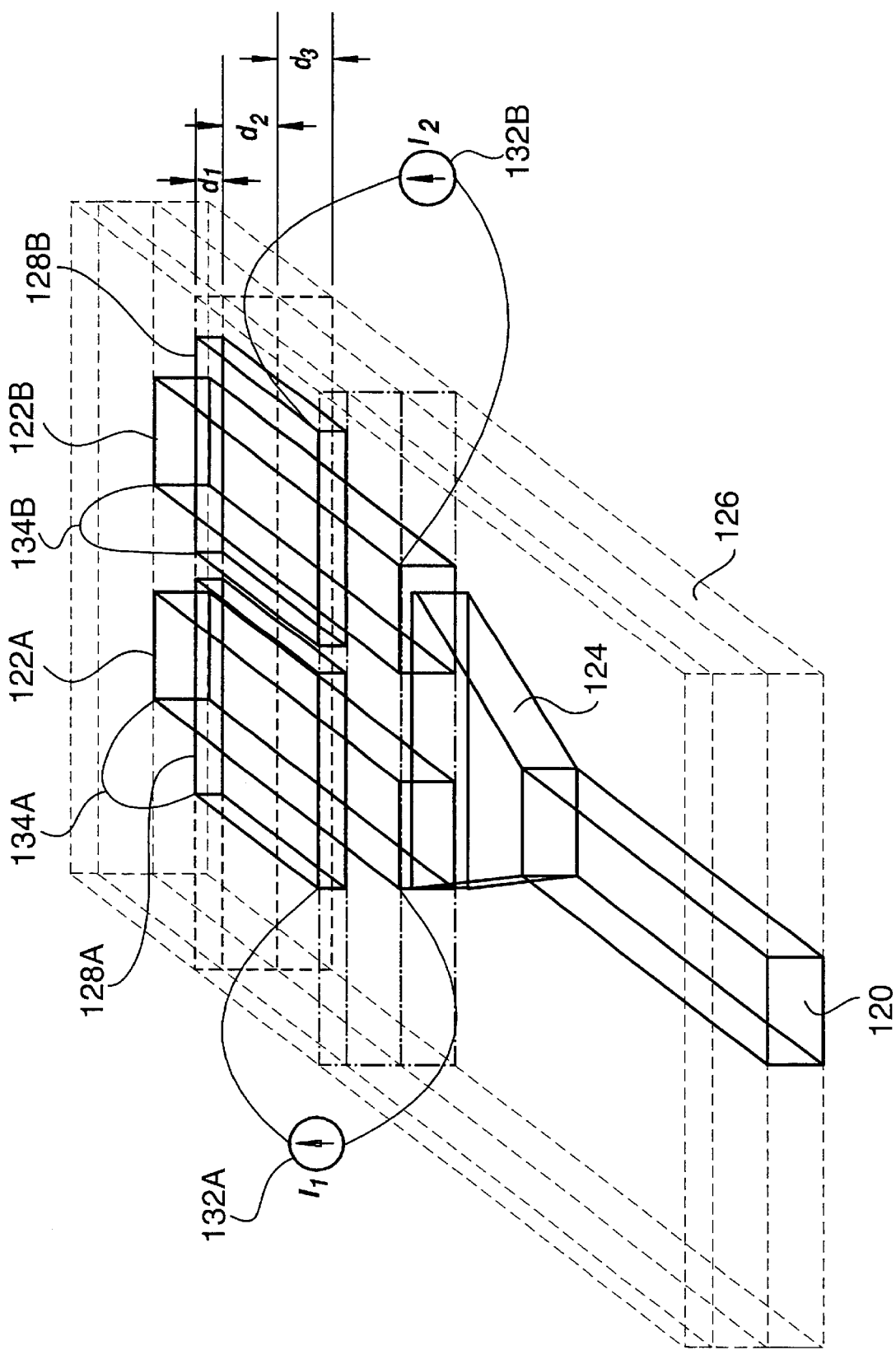
FIG. 49 is a schematic perspective view of a magneto-optic switch also using the waveguide structure of FIG. 17(a)
Figure 50:
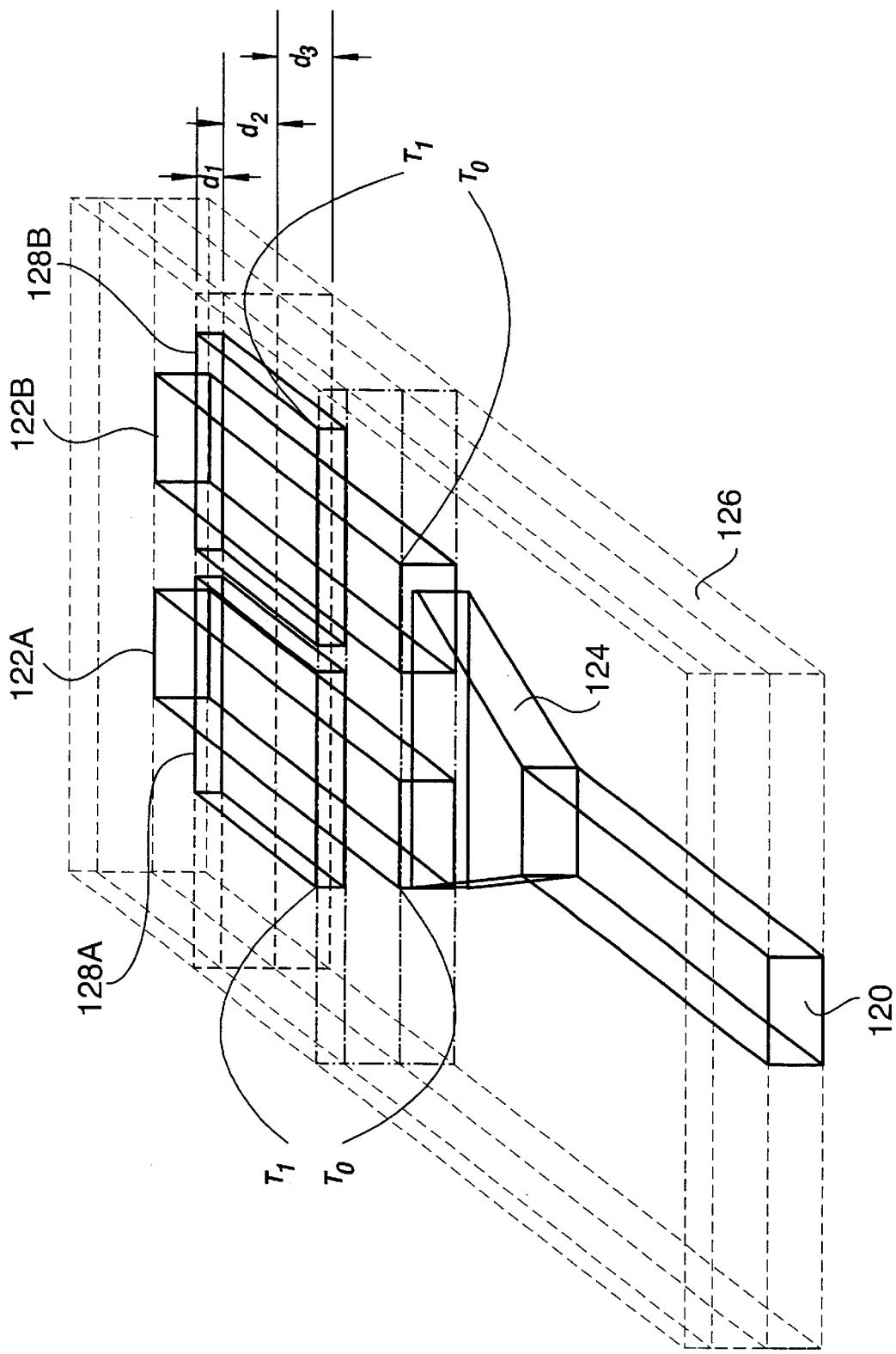
FIG. 50 is a schematic perspective view of a thermo-optic switch also using the waveguide structure of FIG. 17(a)

FIGS. 48, 49 and 50 depict optical switches that operate on the principle of "split and attenuate". In each case, the input optical signal is first split into N outputs using a power divider; a one-to-two power split being shown in FIGS. 48, 49 and 50. The undesired outputs are then "switched off" or highly attenuated by inducing a large asymmetry in the corresponding output waveguides. The asymmetry must be large enough to completely cut-off the main purely bound long-ranging mode supported by the waveguides. The asymmetry is induced by means of overlying electrodes as in the waveguide structures of FIGS. 43, 46 or 47, respectively.

In the switches shown in FIGS. 48, 49 and 50, the basic waveguide configuration is the same and comprises an input waveguide section 120 coupled to two parallel branch sections 122A and 122B by a wedge-shaped splitter 124. All four sections 120, 122A, 122B and 124 are co-planar and embedded in dielectric material 126. The thickness of the metal film is $d_3$. Two rectangular electrodes 128A and 128B, each of thickness $d_1$, are disposed above branch sections 122A and 122B, respectively, and spaced from them by a thickness $d_2$ of the dielectric material 126 at a distance large enough that optical coupling between the strips is negligible. Each of the electrodes 128A and 128B is wider and shorter than the underlying metal film 122A or 122B, respectively.

In the switch shown in FIG. 48, the asymmetry is induced electro-optically by means of a first voltage source 130A connected between metal film 122A and electrode 128A for applying voltage $V_1$ therebetween, and a second voltage source 130B connected between metal film 122B and electrode 128B, for applying a second voltage $V_2$ therebetween. In the switch shown in FIG. 49, the asymmetry is induced magneto-optically by a first current source 132A connected between metal film 122A and electrode 128A, which are connected together by connector 134A to complete the circuit, and a second current source 132B connected between metal film 122B and electrode 128B, which are connected together by connector 134B to complete that circuit.

In the switch shown in FIG. 50, the asymmetry is induced thermo-optically by maintaining the metal strips 122A and 122B at temperature $T_0$ and the overlying electrodes 128A and 128B at temperatures $T_1$ and $T_2$, respectively.

It will be appreciated that, in the structures shown in FIGS. 48, 49 and 50, the dielectric surrounding the metal strip will be electro-optic, magneto-optic, or thermo-optic, or a magnetic material such as a ferrite, as appropriate.

In general, any of the sources, whether of voltage, current or temperature, may be variable.

Although the switches shown in FIGS. 48, 49 and 50 are 1×2 switches, the invention embraces 1×N switches which can be created by adding more branch sections and associated electrodes, etc.

It will be appreciated that, where the surrounding material is acousto-optic, the external stimulus used to induce or enhance the asymmetry could be determined by analogy. For example, a structure similar to that shown in FIG. 45 could be used with the electro-optic material replaced by acousto-optic material and the electrodes 112D and 112E used to apply compression or tension to the upper portion 114D.

To facilitate description, the various devices embodying the invention have been shown and described as comprising several separate sections of the novel waveguide structure. While it would be feasible to construct devices in this way, in practice, the devices are likely to comprise continuous strips of metal or other high charge carrier density material, i.e. integral strip sections, fabricated on the same substrate.

The foregoing examples are not meant to be an exhaustive listing of all that is possible but rather to demonstrate the breadth of application of the invention. The inventive concept can be applied to various other elements suitable for integrated optics devices. It is also envisaged that waveguide structures embodying the invention could be applied to multiplexers and demultiplexers.

Although embodiments of the invention have been described and illustrated in detail, it is to be clearly understood that the same is by way of illustration and example only and not to be taken by way of the limitation, the spirit and scope of the present invention being limited only by the appended claims.

REFERENCES

1. *American Institute of Physics Handbook*, third edition. McGraw-Hill Book Company, 1972.
2. *Handbook of Optics*. McGraw-Hill Book Company, 1978.
3. NASH, D. J., SAMBLES, J. R. "Surface Plasmon-Polariton Study of the Optical Dielectric Function of Silver", *Journal of Modern Optics*, Vol. 43, No. 1 (1996), pp. 81–91.
4. BOARDMAN, A. D., Editor. *Electromagnetic Surface Modes*. Wiley Interscience, 1982.
5. ECONOMOU, E. N. "Surface Plasmons in Thin Films", *Physical Review*, Vol. 182, No. 2 (June 1969), pp. 539–554.
6. BURKE, J. J., STEGEMAN, G. I., TAMIR, T. "Surface-Polariton-Like Waves Guided by Thin, Lossy Metal Films", *Physical Review B*, Vol. 33, No. 8 (April 1986), pp. 5186–5201.
7. WENDLER, L., HAUPT, R. "Long-Range Surface Plasmon-Polaritons in Asymmetric Layer Structures", *Journal of Applied Physics*, Vol. 59, No. 9 (May 1986), pp. 3289–3291.
8. BURTON, F. A., CASSIDY, S. A, "A Complete Description of the Dispersion Relation for Thin Metal Film Plasmon-Polaritons", *Journal of Lightwave Technology*, Vol. 8, No. 12 (December 1990), pp. 1843–1849.
9. PRADE, B., VINET, J. Y., MYSYROWICZ, A. "Guided Optical Waves in Planar Heterostructures With Negative Dielectric Constant", *Physical Review B*, Vol. 44, No. 24 (December 1991), pp. 13556–13572.
10. TOURNOIS, P., LAUDE, V. "Negative Group Velocities in Metal-Film Optical Waveguides", *Optics Communications*, April 1997, pp. 41–45.
11. JOHNSTONE, W., STEWART, G., HART, T., CULSHAW B. "Surface Plasmon Polaritons in Thin Metal Films and Their Role in Fiber Optic Poarizing Devices", *Journal of Lightwave Technology*, Vol. 8, No. 4 (April 1990), pp. 538–544.
12. RAJARAJAN, M., THEMISTOS, C., RAHMAN, B. M. A., GRATTAN, K. T. V. "Characterization of Metal-Clad TE/TM Mode Splitters Using the Finite Element Method", *Journal of Lightwave Technology*, Vol. 15, No. 12 (December 1997), pp. 2264–2269.
13. BERINI, P. "Plasmon-Polariton Modes Guided by a Metal Film of Finite Width", *Optics Letters*, Vol. 24, No. 15 (August 1999), pp. 1011–1013.
14. PREGLA, R., PASCHER, W. "The Method of Lines", *Numerical Techniques for Microwave and Millimeter-Wave Passive Structures*. Wiley Interscience, 1989. T. ITOH, Editor.
15. BERINI, P., WU, K. "Modeling Lossy Anisotropic Dielectric Waveguides With the Method of Lines", *IEEE Transactions on Microwave Theory and Techniques*, Vol. MTT-44, No. 5 (May 1996), pp. 749–759.
16. BERINI, P., STÖHR, A., WU, K., JÄGER, D. "Normal Mode Analysis and Characterization of an InGaAs/GaAs MQW Field-Induced Optical Waveguide Including Electrode Effects", *Journal of Lightwave Technology*, Vol. 14, No. 10 (October 1996), pp. 2422–2435.
17. CULVER, R. "The Use of Extrapolation Techniques With Electrical Network Analogue Solutions", *Brtish Journal of Applied Physics*, Vol. 3 (December 1952), pp. 376–378.
18. BOONTON, R. C. *Computational Methods for Electromagnetics and Microwaves*. Wiley lnterscience, 1992.
19. STEGEMAN, G. I., WALLIS, R. F., MARADUDIN, A. A. "Excitation of Surface Polaritons by End-Fire Coupling", *Optics Letters*, Vol. 8, No. 7 (July 1983), pp. 386–388.
20. BERINI, P. "Plasmon-Polariton Waves Guided by Thin Lossy Metal Films of Finite Width: Bound Modes of Symmetric Structures", *Physical Review B*, Vol. 61, No. 15, (2000), pp. 10484–10503.
21. KRAUS, et al., *Electromagnetics*, second edition. McGraw Hill.
22. CHARBONNEAU, R., BERINI, P., BEROLO, E., LISICKA-SKRZEK, E., "Experimental Observation of Plasmon-Polariton Waves Supported by a Thin Metal Film of Finite Width", *Optics Letters*, Vol. 25, No. 11, pp. 844–846, June 2000.
23. EVANS, A. F., HALL, D. G., "Measurement of the electrically induced refractive index change in silicon for wavelength λ=1.3 µm using a Schottky diode" *Applied Physics Letters,* Vol. 56, No. 3, pp. 212–214, January 1990.
24. JUNG, C., YEE, S., KUHN, K,, "Integrated Optics Waveguide Modulator Based on Surface Plasmons", *Journal of Lightwave Technology,* Vol. 12, No. 10, pp. 1802–1806, October 1994.
25. SOLGAARD, O., HO, F., THACKARA, J. I., BLOOM, D. M., "High frequency attenuated total internal reflection light modulator", *Applied Physics Letters,* Vol. 61, No. 21, pp. 2500–2502, November 1992.
26. SOLGAARD, O., et al., "Electro-optic Attenuated Total Internal Reflection Modulator and Method", U.S. Pat. No. 5,155,617, 1992.
27. SCHILDKRAUT, J. S., "Long-range surface plasmon electro-optic modulator", *Applied Optics,* Vol. 27, No. 21, pp. 4587–4590, November 1988.
28. SCHILDKRAUT, J. S., et al., "Optical Article for Reflection Modulation", U.S. Pat. No. 5,157,541, 1992.
29. SCHILDKRAUT, J. S., et al., "Optical Article for Multicolor Imaging", U.S. Pat. No. 5,075,796, 1991.
30. SCHILDKRAUT, J. S., et al., "Optical Article for Reflection Modulation", U.S. Pat. No. 4,971,426, 1990.
31. RIDER, C. B., et al., "Nonlinear Optical Article for Modulating Polarized Light", U.S. Pat. No. 4,948,225, 1990.
32. COLLINS, R. T., et al., "Optical Modulator", U.S. Pat. No. 4,915,482, 1990.
33. McNEILL, W. H., et al., "High Frequency Light Modulation Device", U.S. Pat. No. 4,451,123, 1984.
34. McNEILL, W. H., et al., "High Frequency Light Modulator", U.S. Pat. No. 4,432,614, 1984.
35. SINCERBOX, G. T., et al., "Projection Display Device", U.S. Pat. No. 4,249,796, 1981.
36. BROWN, T. G., "Optoelectronic Device for Coupling Between an External Optical Wave and a Local Optical Wave for Optical Modulators and Detectors", U.S. Pat. No. 5,625,729, 1997.
37. JANSSON, T. P., et al., "High Modulation Rate Optical Plasmon Waveguide Modulator", U.S. Pat. No. 5,067,788, 1991.
38. DRIESSEN, A., KLEIN KOERKAMP, H. M. M., POPMA, TH. J. A., "Novel Integrated Optic Intensity Modulator Based on Mode Coupling", *Fibre and Inregrated Optics,* Vol. 13, pp. 445–461, 1994.
39. HOEKSTRA, H. J. W. M., LAMBECK, P. V., KRUNEN, G. J. M., CTYROKY, J., De MINICIS, M., SIBILIA, C., CONRADI, O., HELFERT, S., PREGLA, R., "A COST 240 Benchmark Test for Beam Propagation Methods Applied to an Electrooptical Modulator Based on Surface Plasmons", *Journal of Lightwave Technology,* Vol. 16, No. 10, pp. 1921–1926, October 1998.
40. ANEMOGIANNIS, E., "Optical Plasmon Wave Structures" U.S. Pat. No. 6,034,809, 2000.
41. BERINI, P., "The Proximity Effect of Conductors in Optical Waveguide Devices: Coupling to Plasmon-Polariton Modes", *SPIE SD-25 Millimeter-Wave Materials Devices and Components,* in print, July 2000.
42. CHEN, Y.-J., et al., "Optical Device With Surface Plasmons" U.S. Pat. No. 4,583,818, 1986.
43. BERINI, P., "Optical Waveguide Structures", Copending Canadian and U.S. patent applications.
44. BERINI, P., "Plasmon-Polariton Modes Guided by a Metal Film of Finite Width Bounded by Different Dielectrics", *Optics Express,* Vol. 7, No. 10, pp. 329–335.
45. BERINI, P., "Plasmon-Polariton waves guided by thin lossy metal films of finite width: Bound Modes of Asymmetric Structures", Physical Review B, in Press. Not yet published.

What is claimed is:

1. An optical device comprising a waveguide structure formed by a thin strip of material having a relatively high free charge carrier density surrounded by material having a relatively low free charge carrier density, the strip having finite width and thickness with dimensions such that optical radiation having a wavelength in a predetermined range couples to the strip and propagates along the length of the strip as a plasmon-polariton wave, wherein said surrounding material comprises two distinct portions with the strip extending therebetween, at least one of the two distinct portions having at least one variable electromagnetic property, and the device further comprises adjusting means for varying the value of said electromagnetic property of said at least one of the portions so as to vary the characteristics of the waveguide structure and thereby the propagation characteristics of the plasmon-polariton wave.

2. A device according to claim 1, wherein said means for varying the electromagnetic property does so by changing the size of at least one of said portions.

3. A device according to claim 1, wherein one of said portions is a fluid.

4. A device according to claim 1, wherein said electromagnetic property is permittivity and the varying means varies the permittivity by inducing a change in one or more of an electrical field in material of said portion, magnetic field in material of said portion, mechanical strain in material of said portion, and temperature in the material of said portion.

5. A device according to claim 1, wherein said electromagnetic property is permeability and the varying means varies the permeability by inducing a change in one or more of a magnetic field in material of said portion, mechanical strain in the material of said portion, and temperature in the material of said portion.

6. An optical device according to claim 1, wherein each of said two distinct portions of said surrounding material has a free charge carrier density that is substantially negligible.

7. A device according to claim 1, for optical radiation having a free-space wavelength near 1550 nm, wherein the strip comprises a metal and has thickness less than about 0.1 microns and width of a few microns.

8. A device according to claim 1, wherein the strip is straight, curved, bent, or tapered.

9. A device according to claim 1, wherein at least one of the two distinct portions is electro-optic and the varying means comprises an electrode overlying said one of the two distinct portions and means for applying a potential difference between the electrode and the strip.

10. A device according to claim 1, wherein at least one of the two distinct portions is electro-optic and the varying means comprises first and second electrodes disposed one at each side of the strip, said one of the two distinct portions being between the first electrode and the strip and the other of said portions being between the second electrode and the strip, and means for applying a potential difference between the strip and at least one of the first and second electrodes.

11. A device according to claim 10, wherein the applying means comprises a first voltage source for applying a first potential difference between the strip and the first electrode and a second voltage source for applying a second potential difference between the strip and the second electrode.

12. A device according to claim 10, wherein the applying means comprises means for coupling one terminal of a voltage source to the strip and a second terminal of the voltage source in common to the first and second electrodes.

13. A device according to claim 1, wherein at least one of the two distinct portions is electro-optic, and the varying means comprises first and second electrodes disposed laterally one at each side of the strip and at opposite sides of said one of said portions and means of applying a potential difference between the electrodes.

14. A device according to claim 1, wherein at least one of the two distinct portions is magneto-optic and the varying means comprises means for establishing a current flowing in at least one of the strip and an adjacent electrode, the said one of the two distinct portions being between the electrode and the strip.

15. A device according to claim 1, wherein at least one of the two distinct portions is thermo-optic, at least one electrode is provided adjacent to the strip with said one of the two distinct portions therebetween, and the varying means comprises means for establishing a temperature difference between the strip and the electrode.

16. A device according to claim 1, in combination with at least two additional waveguide structures similar in construction to the first-mentioned waveguide structure and having, respectively, at least two additional said strips, the additional waveguide structures having respective proximal ends juxtaposed to one end of the first-mentioned waveguide structure to form a combiner/splitter, the arrangement being such that said optical radiation leaving said first-mentioned strip via said one end will be split between said additional strips and conversely said optical radiation coupled to said one end by said additional strips will be combined to leave said first-mentioned strip by an opposite end, wherein the adjusting means is operable to vary said characteristics of at least one of the first-mentioned and additional waveguide structures.

17. A device according to claim 16, wherein at least one of the two distinct portions of said material is electro-optic and the waveguide structures comprise an input strip for receiving said optical radiation at one end thereof and end-coupled to a splitter at an opposite end thereof, first and second branch strips each having a proximal end coupled to the splitter for receiving a portion of the radiation, the varying means comprising an electrode adjacent a respective one of the branch strips with said one of the portions therebetween and means for applying a potential difference between the electrode and said one of the branch strips.

18. A device according to claim 17, wherein the varying means further comprises a second electrode adjacent the other branch strip with a second one of said portions therebetween and means for applying a second potential difference between the second electrode and the second branch strip.

19. A device according to claim 16, wherein at least one of the two distinct portions is magneto-optic and the waveguide structures comprise an input strip for receiving said optical radiation at one end thereof and end-coupled to a splitter at an opposite end thereof, first and second branch strips each having a proximal end coupled to the splitter for receiving a portion of the radiation, the varying means comprising an electrode adjacent a respective one of the branch strips with said one of the two distinct portions therebetween and means for establishing a current flowing in said electrode and said one of the branch strips.

20. A device according to claim 19, wherein the varying means further comprises a second electrode adjacent the other branch strip with a second one of said portions therebetween and means for establishing a second current flowing in the second electrode and the second branch strip.

21. A device according to claim 16, wherein at least one of the two distinct portions is thermo-optic and the waveguide structures comprise an input strip for receiving said optical radiation at one end thereof and end-coupled to a splitter at an opposite end thereof, first and second branch strips each having a proximal end coupled to the splitter for receiving a portion of the radiation, the varying means comprising an electrode adjacent a respective one of the branch strips with said one of the portions therebetween and means for establishing a temperature difference between said electrode and said one of the branch strips.

22. A device according to claim 21, wherein the varying means further comprises a second electrode adjacent the other branch strip with a second one of said portions therebetween and means for establishing a second temperature difference between the second electrode and the second branch strip.

23. A device according to claim 1, wherein the varying means comprises a coil formed by metal-plated via holes and surface conductors.

24. A device according to claim 1, wherein the varying means comprises a solenoid having magnetic poles either side of the strip.

25. A device according to claim 7, wherein the strip is about 20 nm thick.

26. A device according to claim 7, wherein the strip has a thickness of about 20 nm and width of about 4 microns.

27. A device according to claim 1, further comprising at least one additional said waveguide structure comprising a second said strip, wherein the first-mentioned strip is curved and the second strip is offset outwardly relative to an axis of curvature of the first-mentioned strip.

28. A device according to claim 27, wherein the first and second strips are separate and juxtaposed with one end of the first strip adjacent an end of the second strip that is offset outwardly relative to the end of the first strip.

29. A device according to claim 27, wherein said first and second strips are integral with each other.

30. A device according to claim 16, wherein the branch strips are integral with the first strip.

31. A device according to claim 16, wherein the branch strips are distinct from the first strip.

32. A device according to claim 1, further comprising two branch waveguide structures each similar in construction to the first waveguide structure and having their respective strips connected in common to the first strip to form a splitter, and three branch waveguide structures each similar to the first waveguide structure and having their respective strips interconnected to form a combiner, the splitter and combiner being connected together to form a Mach-Zender interferometer, the arrangement being such that optical radiation input via said first strip produces two plasmon-polariton wave portions which propagate along, respectively, the two branch waveguides of the splitter, and are recombined in the combiner.

33. A device according to claim 32, wherein the adjusting means is arranged to vary the value of said electromagnetic property of said at least one of the two distinct portions near at least one of the branch strips to vary the propagation characteristics of the plasmon-polariton wave as it propagates along the branch strip.

34. A device according to claim 33, wherein the adjusting means is arranged to modulate said propagation characteristics so as to obtain destructive interference upon recombination and thereby modulate the intensity of said optical radiation.

35. A device according to claim 33, wherein said at least one of the two distinct portions that is near at least one of the branch strips is electro-optic and the adjusting means comprises at least one electrode adjacent said at least one of the branch strips and a voltage source for providing a potential difference between the electrode and said at least one of the branch strips.

36. A device according to claim 33, wherein said at least one of the two distinct portions that is near the branch strip is electro-optic and the adjusting means comprises a pair of electrodes one each side of the strip and a voltage source connected to the electrodes for providing a potential difference therebetween.

37. A device according to claim 34, wherein the adjusting means is arranged to induce a magnetic field in the strip.

38. A device according to claim 37, wherein the adjusting means comprises a coil formed by metal-plated via holes and surface conductors.

39. A device according to claim 37, wherein the adjusting means comprises a coil solenoid having magnetic poles either side of the strip.

40. A device according to claim 1, comprising a plurality of said waveguide structures comprising a corresponding plurality of strips and arranged to form a periodic structure comprising a plurality of unit cells, each unit cell comprising a first strip and a second strip, the first and second strips being dissimilar in one or both of shape and size.

41. A device according to claim 40, wherein the plurality of strips are integral with each other.

42. A device according to claim 40, wherein the strips are separated from each other by a predetermined distance.

43. A device according to claim 40, wherein the adjusting means is operable to modify an optical transfer function of the device.

44. A device according to claim 42, wherein the adjusting means is operable to modify an optical transfer function of the device and comprises a voltage source for providing a potential difference between the first and second strips in each unit cell.

45. A device according to claim 44, wherein the material between the first and second strips is an electro-optic material and the voltage source provides a potential gradient therein.

46. A device according to claim 43, wherein the adjusting means comprises at least one electrode positioned near the periodic structure and connected to one terminal of a voltage source, a second terminal of the voltage source being connected to at least one of the first and second strips of each unit cell, the material between said at least one of the first and second strips and said at least one electrode being electro-optic.

47. A device according to claim 1, for use as an edge coupler and comprising a plurality of said waveguide structures, two of said plurality of waveguide structures having their respective strips disposed with their adjacent edges in close proximity such that at least some of said plasmon- polariton wave propagating along one of said two strips will couple onto the other of the two strips.

48. A device according to claim 47, wherein the adjusting means is operable to adjust the propagation characteristics of said plasmon-polariton waves propagating along the coupled strips so as to control the degree of coupling between the strips.

49. A device according to claim 48, wherein the material between the coupled strips is electro-optic and the adjusting means is ranged to vary a potential gradient therein in varying said propagation characteristics.

50. A device according to claim 1, suitable for use as a coupler, comprising at least two of said waveguide structures having their respective strips disposed in close proximity such that at least some of said plasmon-polariton wave propagating along one of said strips will couple onto the other of the strips, and wherein the first and second strips are not coplanar.

51. A device according to claim 1, in combination with at least two additional waveguide structures similar to the first-mentioned waveguide structure, the three waveguide structures being arranged to form a waveguide intersection, their respective strips each having one end connected to the other strips to form said intersection, distal ends of the three strips constituting ports such that optical radiation input via the distal end of one of the strips will be conveyed across the intersection to emerge from one or both of the other strips.

52. A device according to claim 1, wherein at least one of said two distinct portions of the surrounding material is inhomogeneous.

53. A device acceding to claim 1, wherein at least one of said two distinct portions of the surrounding material comprises a combination of slabs, strips, laminae, or continuously variable material composition.

54. A device according to claim 52, wherein the strip is inhomogeneous.

55. A device according to claim 53, wherein the strip is inhomogeneous.

56. A device according to claim 1, wherein the strip is inhomogeneous.

57. A device according to claim 40, comprising an array of said periodic structures disposed adjacent each other and having strips sized and shaped so as to form stop bands at desired locations in the optical spectrum.

58. A device according to claim 57, wherein the array is two-dimensional.

59. A device according to claim 57, wherein the array is three-dimensional.

60. A device according to claim 7, wherein the strip has a width of about 4 microns.

61. A device according to claim 44, wherein said at least one of the two distinct portions is electro-optic and the voltage source is arranged to vary said value of said electromagnetic property by varying said potential difference between said first and second strips.

62. A device according to claim 48, wherein said at least one of the two distinct portions is electro-optic and the adjusting means is arranged to vary a potential gradient therein.

63. A device according to claim 1, wherein the two distinct portions are not made of the same material.

64. A device according to claim 50, wherein the adjusting means is operable to vary the propagation characteristics of said plasmon-polariton waves propagating along the coupled strips so as to control the degree of coupling between the coupled strips.

65. A device according to claim 64, wherein the material between the coupled strips is electro-optic and the adjusting means is arranged to vary a potential gradient therein in varying said propagation characteristic.

66. A device according to any one of the preceding claims, wherein, for one said value of the electromagnetic property for said one of the portions, propagation of the plasmon-polariton wave is supported and, for another value of said electromagnetic property of said one of said portions, propagation of the plasmon-polariton wave is not supported.

* * * * *

UNITED STATES PATENT AND TRADEMARK OFFICE
CERTIFICATE OF CORRECTION

PATENT NO. : 6,614,960 B2  Page 1 of 1
DATED : September 2, 2003
INVENTOR(S) : Pierre Simon Joseph Berini It is certified that error appears in the above-identified patent and that said Letters Patent is hereby corrected as shown below:

<u>Title page,</u>
Item [73], Assignee, please change the name to -- Spectalis Corp. --.

Signed and Sealed this

Second Day of March, 2004

JON W. DUDAS
*Acting Director of the United States Patent and Trademark Office*